(12) United States Patent
Backhaus-Ricoult et al.

(10) Patent No.: US 9,908,260 B2
(45) Date of Patent: Mar. 6, 2018

(54) POROUS CERAMIC ARTICLE AND METHOD OF MANUFACTURING THE SAME

(71) Applicant: Corning Incorporated, Corning, NY (US)

(72) Inventors: Monika Backhaus-Ricoult, Horseheads, NY (US); Christopher Raymond Glose, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 45 days.

(21) Appl. No.: 14/250,524

(22) Filed: Apr. 11, 2014

(65) Prior Publication Data

US 2014/0339744 A1    Nov. 20, 2014

Related U.S. Application Data

(60) Provisional application No. 61/825,211, filed on May 20, 2013.

(51) Int. Cl.
*C04B 35/626* (2006.01)
*C04B 38/00* (2006.01)
(Continued)

(52) U.S. Cl.
CPC .......... *B28B 11/243* (2013.01); *C04B 35/195* (2013.01); *C04B 35/478* (2013.01);
(Continued)

(58) Field of Classification Search
CPC ................ C04B 35/195; C04B 35/478; C04B 35/62655; C04B 2235/528;
(Continued)

(56) References Cited

U.S. PATENT DOCUMENTS 4,295,892 A   10/1981 Matsuhisa et al.
4,327,188 A    4/1982 Endo et al.
(Continued)

FOREIGN PATENT DOCUMENTS

CN    1942413    4/2007
CN    101053719   10/2007
(Continued)

OTHER PUBLICATIONS

U.S. Non-Final Office Action Communication, dated Apr. 24, 2015, U.S. Appl. No. 14/250,495, filed Apr. 11, 2014, Confirmation No. 1738, Group Art Unit 1731, pp. 1-14.
(Continued)

*Primary Examiner* — Erin Snelting
(74) *Attorney, Agent, or Firm* — Jakub M. Michna

(57) ABSTRACT

The present disclosure relates to porous ceramic articles and a method of making the same. The porous ceramic articles have microstructure of sinter bonded or reaction bonded large pre-reacted particles and pore network structure exhibiting large pore necks. The method of making the porous ceramic articles involves using pre-reacted particles having one or more phases. A plastic ceramic precursor composition is also disclosed. The composition includes a mixture of at least one of dense, porous, or hollow spheroidal pre-reacted particles and a liquid vehicle.

23 Claims, 37 Drawing Sheets

(51) Int. Cl.
*B28B 11/24* (2006.01)
*C04B 35/195* (2006.01)
*C04B 35/478* (2006.01)

(52) U.S. Cl.
CPC ...... *C04B 35/626* (2013.01); *C04B 35/62655* (2013.01); *C04B 35/62675* (2013.01); *C04B 38/0006* (2013.01); *C04B 2235/3206* (2013.01); *C04B 2235/3208* (2013.01); *C04B 2235/3213* (2013.01); *C04B 2235/3217* (2013.01); *C04B 2235/3227* (2013.01); *C04B 2235/3232* (2013.01); *C04B 2235/3236* (2013.01); *C04B 2235/3286* (2013.01); *C04B 2235/349* (2013.01); *C04B 2235/3418* (2013.01); *C04B 2235/3463* (2013.01); *C04B 2235/528* (2013.01); *C04B 2235/5436* (2013.01); *C04B 2235/5472* (2013.01); *C04B 2235/80* (2013.01); *C04B 2235/96* (2013.01); *C04B 2235/9607* (2013.01)

(58) Field of Classification Search
CPC ...... C04B 38/0006–38/0019; C04B 35/62645; C04B 38/009
See application file for complete search history.

(56) References Cited

U.S. PATENT DOCUMENTS

| | | |
|---|---|---|
| 4,789,501 A | 12/1988 | Day et al. |
| 5,545,243 A | 8/1996 | Kotani et al. |
| 5,863,491 A | 1/1999 | Wang |
| 5,976,478 A | 11/1999 | Swanson et al. |
| 6,413,895 B1 | 7/2002 | Merkel .................. 501/106 |
| 6,589,465 B2 | 7/2003 | Kumazawa et al. |
| 6,849,181 B2 | 2/2005 | Ogunwumi et al. ....... 210/510.1 |
| 6,932,959 B2 | 8/2005 | Sterte et al. |
| 7,166,552 B2 | 1/2007 | Fukuda et al. ................ 501/136 |
| 7,294,164 B2 | 11/2007 | Merkel ............................ 55/523 |
| 7,727,613 B2 | 6/2010 | Suwabe et al. |
| 7,754,638 B2 | 7/2010 | Ogunwumi et al. ............ 502/67 |
| 7,964,262 B2 | 6/2011 | Brocheton et al. |
| 8,038,956 B2 | 10/2011 | Li ................................ 422/180 |
| 8,101,117 B2 | 1/2012 | Addiego et al. .............. 264/630 |
| 8,114,354 B2 | 2/2012 | Li ................................ 422/180 |
| 8,119,234 B2 | 2/2012 | Backhaus-Ricoult et al. ............................ 428/338 |
| 8,138,108 B2 | 3/2012 | Tepesh et al. .................. 501/80 |
| 8,591,623 B2 | 11/2013 | Beall et al. |
| 8,715,807 B2 | 5/2014 | Boussant-Roux et al. ... 428/116 |
| 8,920,705 B2 | 12/2014 | Suzuki et al. |
| 2003/0007990 A1 | 1/2003 | Blankenship et al. |
| 2004/0029707 A1 | 2/2004 | Beall et al. |
| 2005/0161849 A1 | 7/2005 | Ohno et al. |
| 2005/0191480 A1 | 9/2005 | Tao et al. |
| 2008/0125305 A1 | 5/2008 | Day et al. |
| 2008/0237942 A1 | 10/2008 | Takamatsu |
| 2009/0137382 A1 | 5/2009 | Merkel ............................ 502/60 |
| 2009/0143221 A1 | 6/2009 | Ogunwumi et al. ............ 502/67 |
| 2010/0298114 A1 | 11/2010 | Maki et al. .................... 501/136 |
| 2010/0317508 A1 | 12/2010 | Maki et al. .................... 501/136 |
| 2011/0052906 A1 | 3/2011 | Itoi et al. ...................... 428/332 |
| 2011/0077143 A1 | 3/2011 | Tohma et al. ................. 501/136 |
| 2011/0097582 A1 | 4/2011 | Tohma et al. ................. 428/402 |
| 2011/0105318 A1 | 5/2011 | Raffy et al. .................... 502/439 |
| 2011/0124484 A1 | 5/2011 | Maki et al. ...................... 501/32 |
| 2011/0124486 A1 | 5/2011 | Gallaher et al. ................ 501/80 |
| 2011/0130276 A1 | 6/2011 | Backhaus-Ricoult et al. |
| 2011/0152075 A1 | 6/2011 | Raffy et al. .................... 502/439 |
| 2011/0156323 A1 | 6/2011 | Maki et al. .................... 264/681 |
| 2011/0236688 A1 | 9/2011 | Suzuki et al. ................. 428/402 |
| 2011/0248106 A1 | 10/2011 | Maki et al. ...................... 241/25 |
| 2012/0096821 A1 | 4/2012 | Nemoto et al. ................. 55/523 |
| 2012/0124953 A1 | 5/2012 | Raffy ............................... 55/523 |
| 2012/0134891 A1 | 5/2012 | Boger et al. |
| 2012/0198805 A1 | 8/2012 | Iwasaki et al. ................. 55/523 |
| 2012/0297830 A1 | 11/2012 | Backhaus-Ricoult et al. |
| 2013/0310247 A1 | 11/2013 | Linhart et al. ................ 502/242 |

FOREIGN PATENT DOCUMENTS

| | | | |
|---|---|---|---|
| CN | 101343174 | 1/2009 | |
| CN | 101343175 | 1/2009 | |
| CN | 101977871 | 2/2011 | |
| EP | 0506475 | 9/1992 | |
| EP | 1207143 | 5/2002 | |
| EP | 2043964 | 6/2007 | ............ C04B 38/00 |
| EP | 2319816 A1 | 8/2009 | |
| EP | 2402295 | 2/2010 | ............ C04B 35/46 |
| EP | 2402295 A1 | 2/2010 | |
| EP | 2266932 | 12/2010 | |
| EP | 2266932 A1 | 12/2010 | |
| EP | 2335797 | 6/2011 | ............ C04B 38/00 |
| EP | 2402295 A1 | 1/2012 | |
| IN | 201105914 P4 | 11/2012 | |
| IN | 201107355 P4 | 11/2012 | |
| IN | 2011005417 | 11/2012 | |
| IN | 201107802 P4 | 12/2012 | |
| IN | 201202094 P4 | 4/2013 | |
| JP | 8072038 | 3/1996 | |
| JP | 9085030 A | 3/1997 | |
| JP | 11-009925 | 1/1999 | |
| JP | 03274027 B2 | 4/2002 | |
| JP | 2003040691 | 2/2003 | |
| JP | 2006096634 | 4/2006 | |
| JP | 2009006262 | 1/2009 | |
| JP | 2010228935 A | 3/2009 | |
| JP | 2009190968 | 8/2009 | |
| JP | 2009227580 | 10/2009 | |
| JP | 2010001184 | 1/2010 | |
| JP | 2010013293 | 1/2010 | |
| JP | 2010111551 | 5/2010 | |
| JP | 2010111552 | 5/2010 | |
| JP | 2010150054 | 7/2010 | |
| JP | 2010159172 | 7/2010 | |
| JP | 2010189204 | 9/2010 | |
| JP | 2011005408 | 1/2011 | |
| JP | 2011005417 | 1/2011 | |
| JP | 04824769 | 11/2011 | |
| JP | 2012188346 A | 10/2012 | |
| KR | 931755 | 12/2009 | |
| WO | 2008/027219 | 3/2008 | |
| WO | 2009122538 | 10/2009 | |
| WO | 2011/150145 | 12/2011 | ............ C04B 35/195 |
| WO | 2012/166222 | 12/2012 | |

OTHER PUBLICATIONS

U.S. Final Office Action Communication, dated Sep. 16, 2015, U.S. Appl. No. 14/250,495, filed Apr. 11, 2014, Confirmation No. 1738, Group Art Unit 1731, pp. 1-10.

Yong Yang et al., "In situ porous alumina/aluminum titanate ceramic prepared by spark plasma sintering from nanostructured powders", Scripta Materialia, 60 (2009), pp. 578-581.

H.J.Alves et al., "Spray-dried Powder Granulometry: Influence on the Porous Microstructure of Polished Porcelain Tile", Bol. Soc. Esp. Ceram. V. 49, 4, 239-246 (2010).

Michiko Sakamoto et al, "Development and Evaluation of Superporous Ceramics Bone Tissue Scaffold Materials with Triple Pore Structure A) Hydroxyapatite, B) Beta-Tricalcium Phosphate", Prof. Haim Tal (Ed.), ISBN: 978-953-51-0487-2, InTech, Available from: http://www.intechopen.com/books/bone-regeneration/development-and-evaluation-of-superporous-ceramicsbone-tissue-scaffold-materials-with-triple-pore-s (2012).

Feb. 10, 2015 International Search Report PCT US/2014/038,050.

International Search Report of the International Searching Authority; PCT/US2014/038050 Mailed Feb. 10, 2015.

Wall-Flow Monoliths, Dieselnet Technology Guide Jul. 1, 2004 (Jul. 1, 2004) pp. 1/16.

Nov. 5, 2014 International Search Report PCT US2014/038,534.

(56) References Cited

OTHER PUBLICATIONS

English Translation of CN201480041192.9 First Office Action Dated Sep. 7, 2016; 12 Pages; Chinese Patent Office.

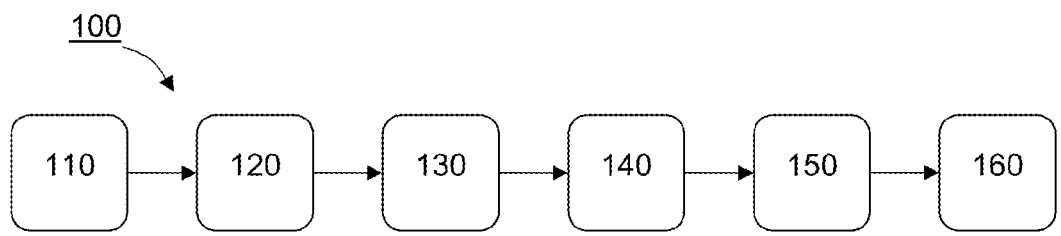
FIG. 1
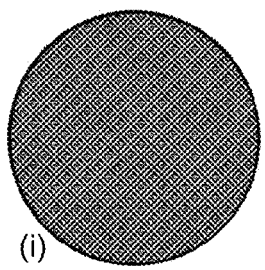
(i)
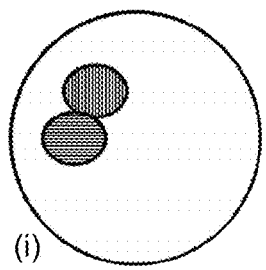
(i)
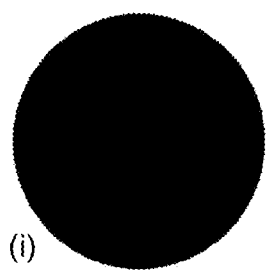
(i)
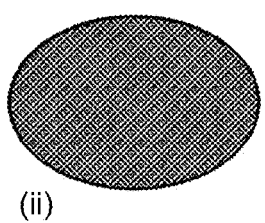
(ii)
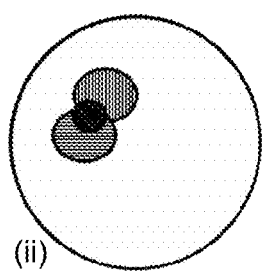
(ii)
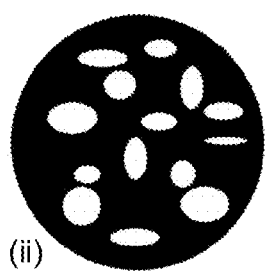
(ii)
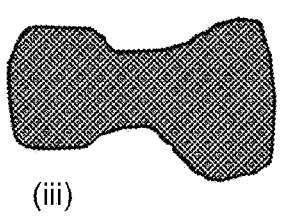
(iii)
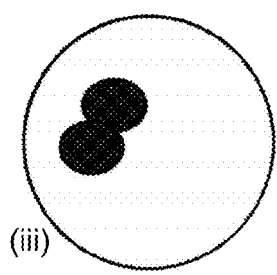
(iii)
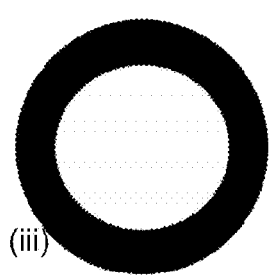
(iii)
FIG. 2A     FIG. 2B     FIG. 2C

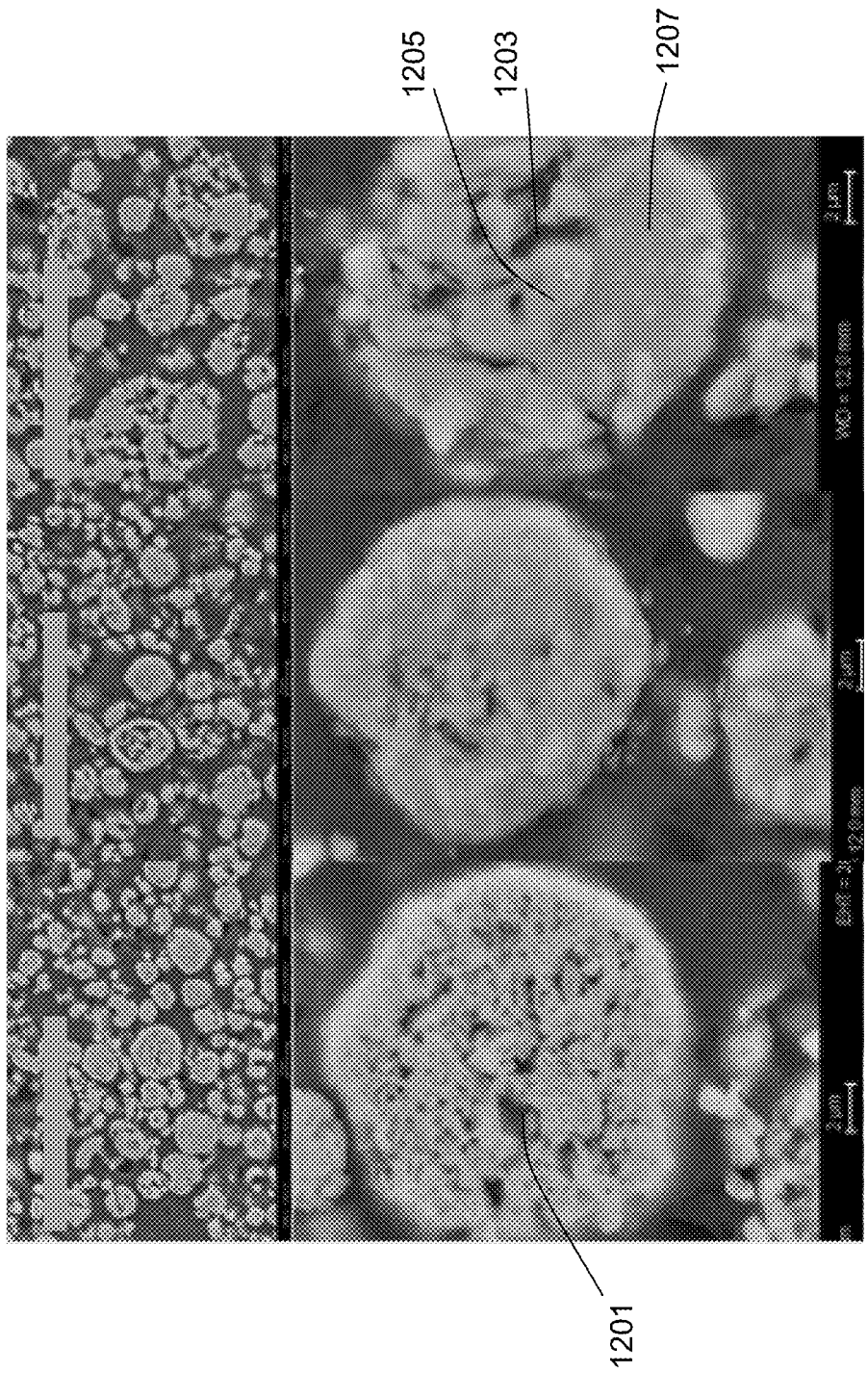

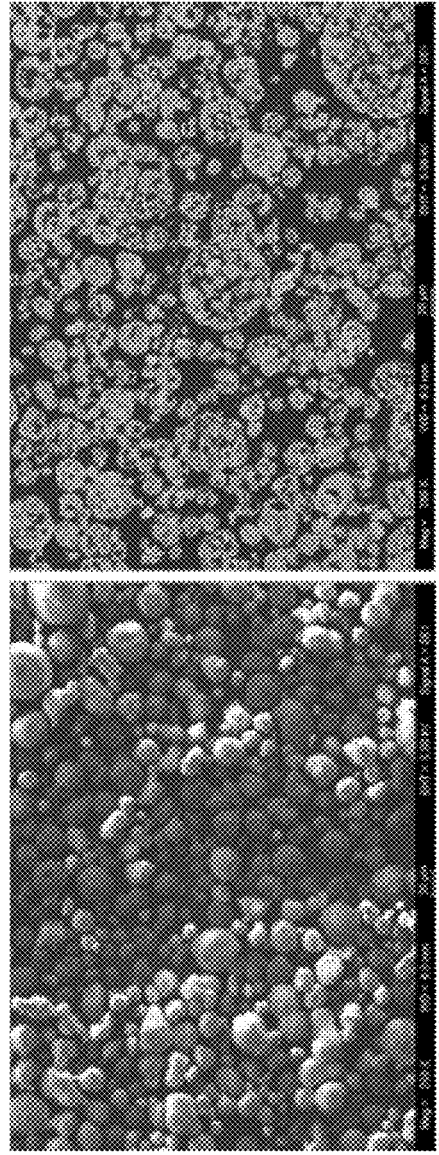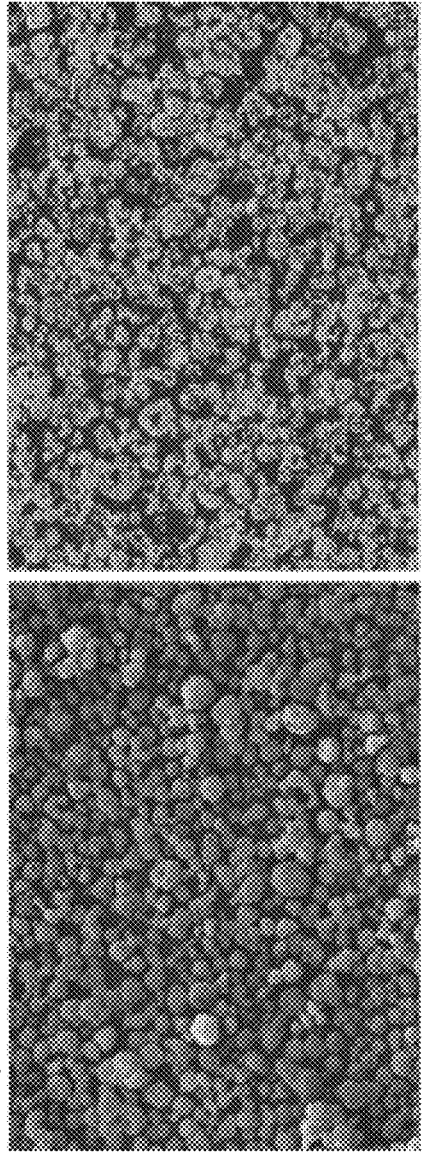
FIG. 14A  FIG. 14B  FIG. 14C  FIG. 14D

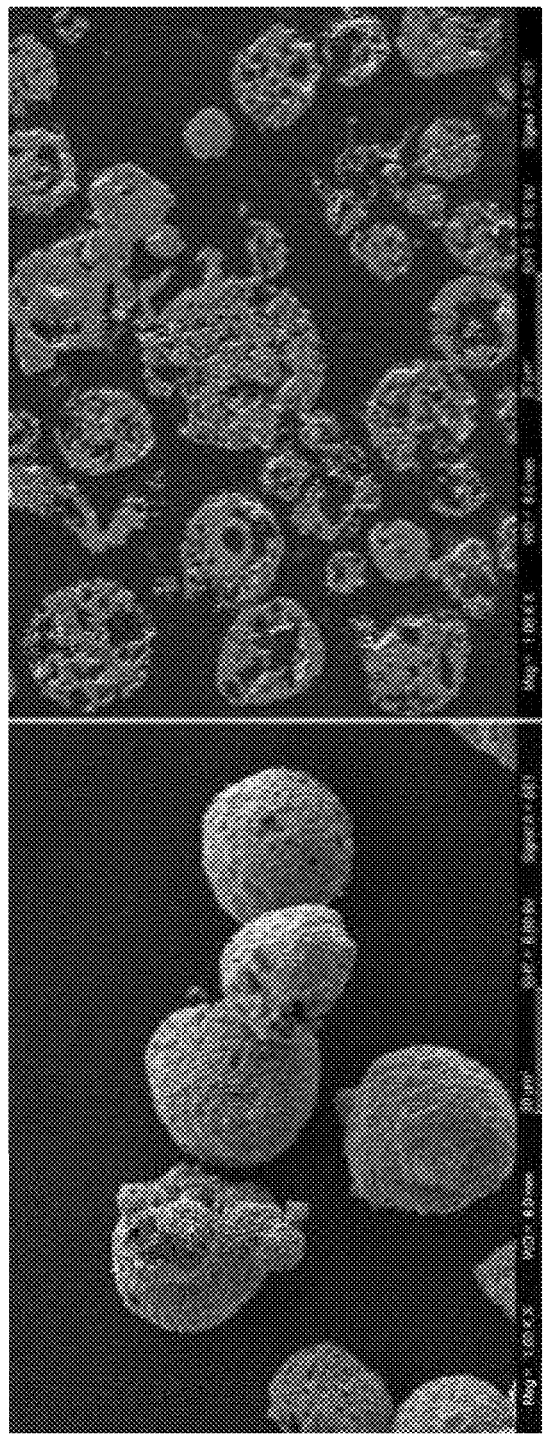

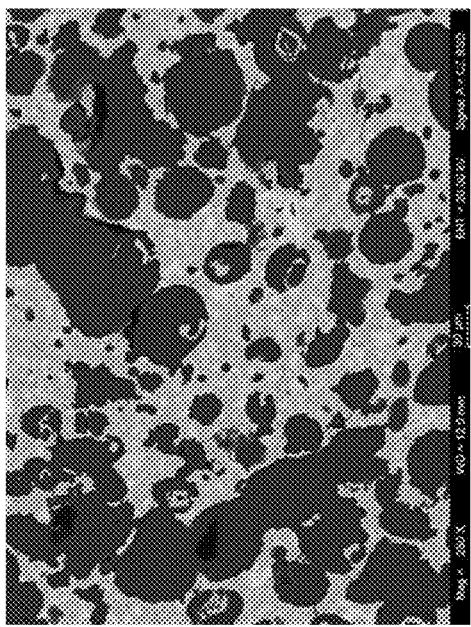

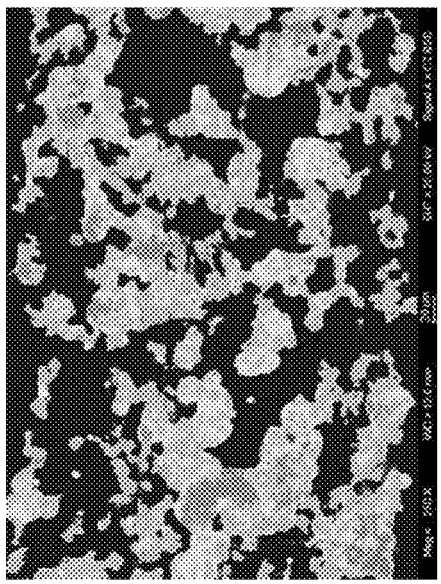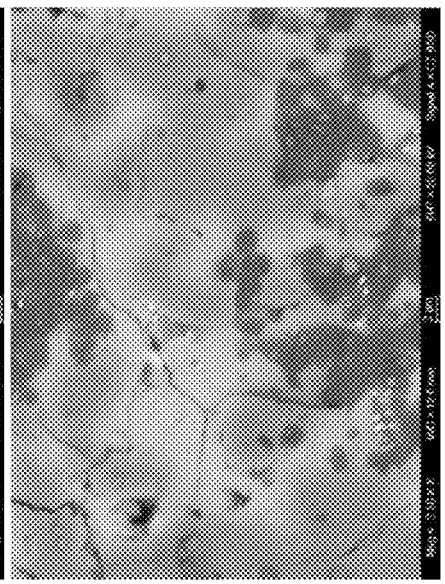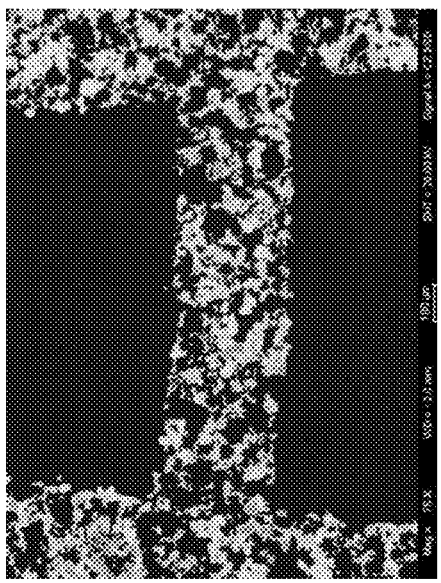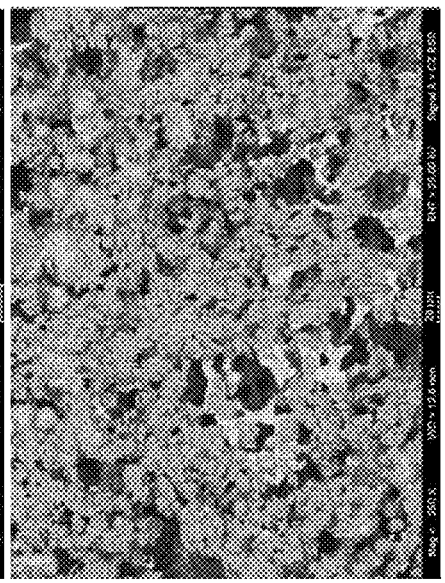
FIG. 20B
FIG. 20D
FIG. 20A
FIG. 20C

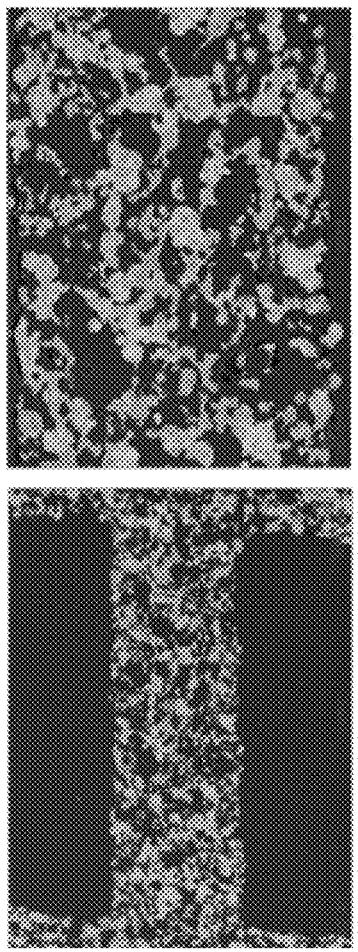
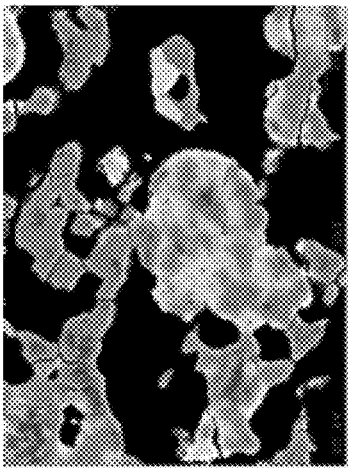
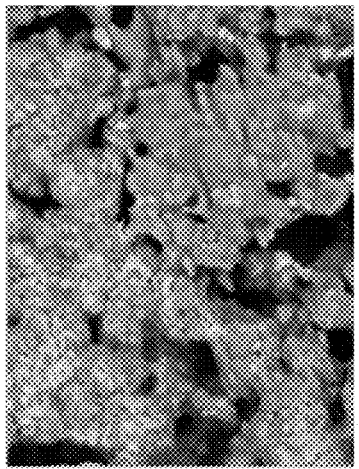
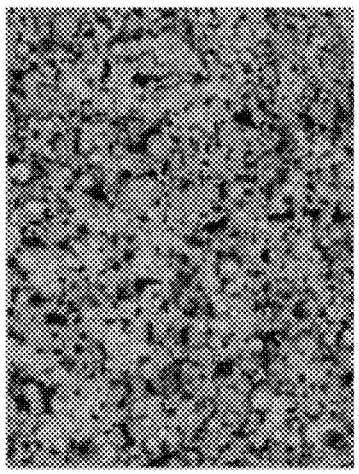
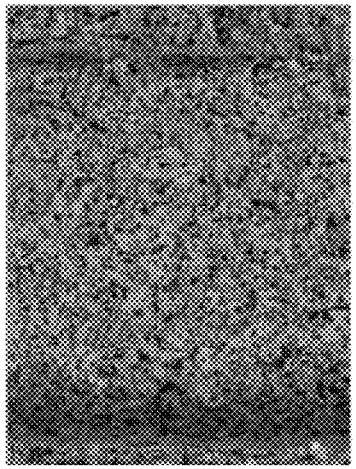

Example No. H4 made using Particle Example Nos. 78 and 111

Example No.H5

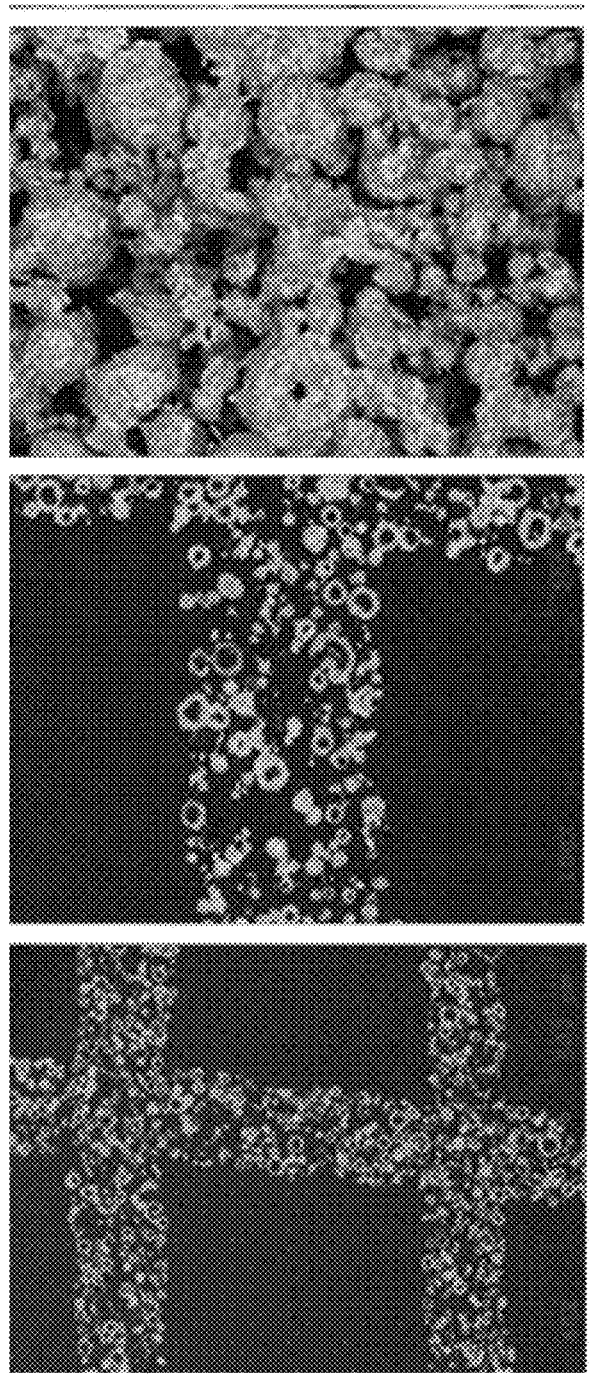

FIG. 34A
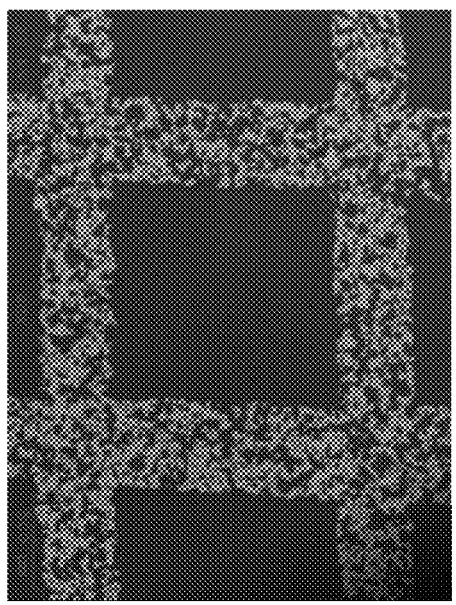
FIG. 34C
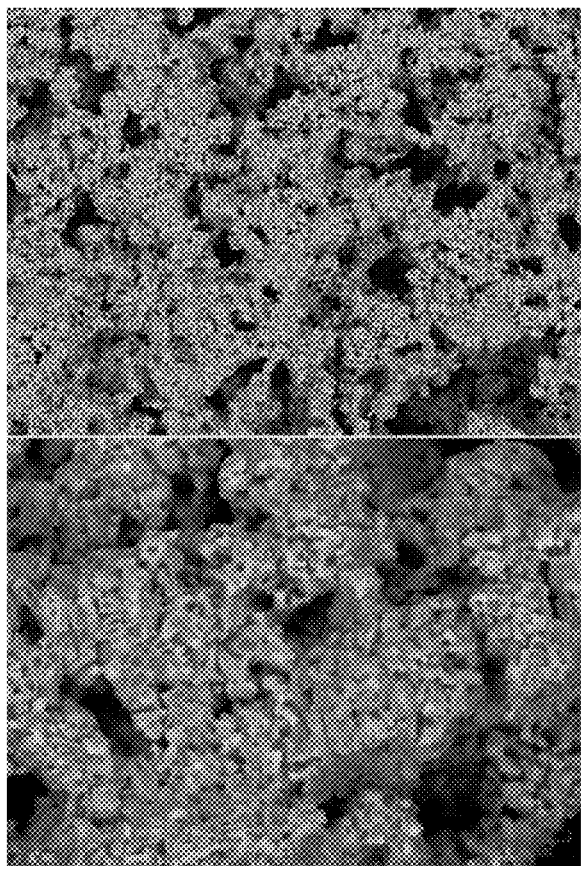
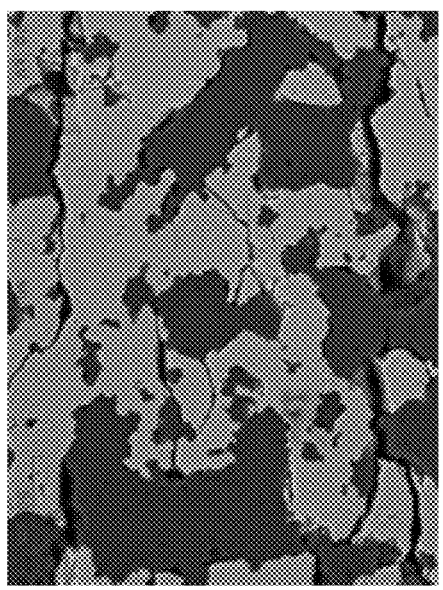
FIG. 34B
FIG. 34D

POROUS CERAMIC ARTICLE AND METHOD OF MANUFACTURING THE SAME

This application claims the benefit of priority under 35 U.S.C. § 119 of U.S. Provisional Application Ser. No. 61/825,211 filed on May 20, 2013, the content of which is relied upon and incorporated herein by reference in its entirety.

BACKGROUND

Field

Exemplary embodiments of the present disclosure relate to porous ceramic articles and a method of making the same. Exemplary embodiments of the present disclosure relate to porous ceramic articles having microstructure including sinter bonded or reaction bonded large pre-reacted particles and pore network structure and a method of making porous ceramic articles using pre-reacted particles.

Discussion of the Background

Cordierite, silicon carbide, and aluminum titanate-based honeycombs have been widely used for a variety of applications including catalytic substrates and filters for diesel and gasoline engine exhaust after treatment.

To meet increasingly stringent emission regulations for light and heavy duty vehicles, the substrate and filter materials have to be highly porous to allow gas flow through the walls without restricting the engine power, have to show high filtration efficiency for emitted particles, and, at the same time, are expected to demonstrate low back pressure. The substrates and filters also have to be able to withstand the erosive/corrosive exhaust environment and bear thermal shock during rapid heating and cooling. Regulation of $CO_2$ emission and raising fuel cost drive miniaturization and integrated functionality in the exhaust gas after-treatment system. It may be desirable to reduce the number of components in the after-treatment system, decrease their size and implement multi-functionality of the different components. For example, integrating de-NOx catalyst and diesel oxidation catalyst (DOC) into diesel particulate filters may be desired. To reach high de-NOx efficiency, rather high loading of de-NOx catalyst is required together with a high catalyst activity at low temperature, such as can be found for Cu-zeolites. Trends and Original Equipment Manufacturers (OEMs) desires may drive zeolite catalyst loading to high levels of 200 g/l. In order to meet this loading target and preserve low pressure drop, the filter substrate may need high porosity and large pore size, for example, around 60% porosity with a median pore size of 18 μm or larger.

High porosity and large pore size that enables high de-NOx efficiency are expected to not degrade the particulate filtration efficiency. They should also not decrease the thermo-mechanical properties of the filter. Cordierite and aluminum titanate may both have low thermal expansion and are therefore suited for applications where high thermal shock resistance is required. Both materials show anisotropy in their thermal expansion with different crystallographic directions exhibiting positive and negative expansion. Due to the anisotropy in thermal expansion, mismatch strains build up between grains with different crystallographic orientation; such strains can lead to microcracking. Polycrystalline cordierite or aluminum titanate ceramics may undergo extensive microcracking during thermal cycling. Microcracks open during cooling and close, sometimes even heal during heating. This creates a hysteresis response to thermal cycling with differences between heating and cooling that can be attributed to the reversible microcrack formation and closure. As a consequence of microcracking, the overall coefficient of thermal expansion (CTE) of the ceramics may be lower than the crystallographic average CTE.

On first look, microcracking may seem beneficial; the thermal shock resistance of the material, which is proportional to the material's strength and inversely proportional to its elastic modulus and thermal expansion, is expected to be improved by microcracking. However, the material strength also decreases with increasing microcrack density. Microcrack densities in cordierite remain rather low, due to the small difference in crystallographic thermal expansion and large grain (domain) sizes required to reach the stress threshold for microcracking. As a result of a much larger anisotropy in crystallographic expansion, microcrack densities in aluminum titanate-based materials are much higher and strongly influence the ceramic article's strength.

Porous cordierite and aluminum titanate based honeycomb ceramic articles with low thermal expansion, high porosity, low Young's modulus and high strength are utilized as high-performance automotive catalytic converter substrates and diesel particulate filters. For cordierite products, raw materials such as alumina, talc, clay, magnesia, alumina and silica powders may be mixed with organic binders and pore formers. For aluminum titanate composite products, raw materials such as alumina, titania powders and raw materials for forming the "filler" phase, for example strontium oxide, alumina, silica to form feldspar (strontium aluminum silicate feldspar or "SAS"), may be mixed with organic binders, pore formers and water to form a plastic mixture. The plastic mixture may be extruded or otherwise shaped into a green body of desired shape, for example, a honeycomb, trough log or disk filter, dried, and then fired to temperatures between 1350° C. and 1450° C., depending on the raw material combination. During the drying and firing process, the raw material particles react, and form, via various intermediates, the final crystalline cordierite or alumina titanate composite. The shaped green part transforms upon firing into a solid, durable porous ceramic article. Other substrate and filter honeycomb materials or mixtures of materials that upon high temperature treatments react to form oxide or non-oxide ceramics, may include metals, intermetallics, mullite, alumina ($Al_2O_3$), zircon, alkali and alkaline-earth alumino-silicates, spinels, perovskites, zirconia, ceria, silicon nitride ($Si_3N_4$), silicon aluminum oxynitride (SiAlON), and zeolites.

Diesel particulate filters (DPF) and gasoline particulate filters (GPF) may be obtained from a honeycomb porous ceramic by plugging channels in a checkerboard pattern on one end and plugging the remaining channels at the other end to form a filter with inlet and outlet channels. The exhaust gas flows into the open inlet channels, through the wall of the honeycomb (through-wall flow) because the inlet channels are plugged at the other end and out of the outlet channels, which are plugged at the inlet end. During exhaust gas passage through the porous honeycomb wall, small particulates from the exhaust gas are deposited on the pore surface or as the soot layer on the wall surface, thus providing filtering of the exhaust gas. The soot cake of deposited particulates may be periodically burned in a regeneration cycle or continuously during passive regeneration so that the DPF or GPF has a lifetime similar to that of the vehicle. Alternative filter designs may be used, such as radial trough filters or radial disk filters, which compared to the honeycomb design with its long, narrow gas flow channels may show wider gas flow channels and a stronger radial component for the gas flow, but share the same particulate filtering of the gas when passing through the thin porous ceramic wall and offer the same opportunity for de-NOx functionality with incorporation of a suited catalyst in the wall-porosity and/or on the channel walls.

Tightening of exhaust gas regulations may call for higher particulate filtration efficiency, particularly for small particle size, and for higher $NO_x$ filtration efficiency, not only in the currently established test cycles, but also in continuous real-world driving. $CO_2$ regulations may call for use of less fuel and OEMs demand lower pressure drops, both at improved thermal shock resistance and extended lifetime of the porous ceramic honeycomb substrate. To meet these demands, substrates and filters with higher porosity, larger pore size, with thinner honeycomb walls than currently in use may be needed.

The above information disclosed in this Background section is only for enhancement of understanding of the background of the invention as claimed and therefore it may contain information that does not form any part of the prior art nor what the prior art may suggest to a person of ordinary skill in the art.

SUMMARY

Exemplary embodiments of the present disclosure provide porous ceramic articles having microstructures characterized by sinter bonded or reaction bonded engineered spheroidal particles and pore networks.

Exemplary embodiments of the present disclosure also provide a method of making porous ceramic articles using sinter bonded or reaction bonded engineered spheroidal particles.

Exemplary embodiments of the present disclosure also provide a plastic ceramic precursor batch composition for making porous ceramic articles having microstructures characterized by sinter bonded or reaction bonded engineered spheroidal particles and pore networks.

Additional features of the invention will be set forth in the description which follows, and in part will be apparent from the description, or may be learned by practice of the invention.

An exemplary embodiment discloses a method of making a porous ceramic article. The method includes forming green particles of at least 10 μm diameter, calcining the green particles to form pre-reacted particles, mixing the pre-reacted particles and a liquid vehicle to form a paste and forming the paste into a wet green body. The pre-reacted particles include at least one of dense, porous, or hollow spheroidal particles, and the pre-reacted particles include one or more phases. The method includes drying the wet green body to form a dried green body and firing the dried green body to form the porous ceramic article.

An exemplary embodiment also discloses a method of making a porous ceramic article having inverse porosity pore structure. The method includes forming green particles of at least 10 μm diameter, calcining the green particles to form pre-reacted particles, mixing the pre-reacted particles and a liquid vehicle to form a paste. The pre-reacted particles comprise at least one of dense, porous, or hollow spheroidal particles and the pre-reacted particles comprise one or more phases. The method includes forming the paste into a wet green body, drying the wet green body to form a dried green body, and firing the dried green body to form the porous ceramic article comprising inverse porosity pore structure. The porous ceramic article comprises a porosity of at least 50% and a median pore size (d50) of 10 to 30 μm.

An exemplary embodiment also discloses a porous ceramic body including a microstructure of solid matter and a network of contiguous pores with large pore necks. The porous ceramic body has a permeability of greater than or equal to 1000, a porosity greater than or equal to 50%, a median pore size (d50) greater than 10 μm, a coefficient of thermal expansion (CTE) in a range of $2\times10^{-7}$ to $20\times10^{-7} K^{-1}$ from room temperature (25° C.) to 800° C., a strain tolerance greater than 0.10%, and an MOR greater than 170 psi for a honeycomb geometry (300/14) or equivalent.

An exemplary embodiment also discloses a porous ceramic body including a microstructure of sinter bonded or reaction bonded large pre-reacted particles and pore network structure exhibiting large pore necks. The sinter bonded or reaction bonded large pre-reacted particles comprise a homogeneous phase mixture or a phase distribution of reaction product layers and green phases.

An exemplary embodiment also discloses a plastic ceramic precursor batch composition for making a porous ceramic article. The plastic ceramic precursor batch includes at least one of dense, porous, and hollow pre-reacted particles, and a liquid vehicle, wherein the pre-reacted particles comprise one or more phases.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the disclosure, and together with the description serve to explain the principles of the claimed invention.

FIG. 1 is a schematic flow diagram of a method of making a porous ceramic honeycomb article according to an exemplary embodiment of the disclosure.

FIG. 2A shows green particle shapes. FIG. 2B shows reactions of the fine powder particles of the green particle after calcining to form the pre-reacted particle. FIG. 2C is a schematic showing (i) a dense pre-reacted particle, (ii) a porous pre-reacted particle, and (iii) a hollow pre-reacted particle.

FIGS. 13A, 13B, and 13C are a series of SEM micrographs of pre-reacted particles made from green particles of spray-dried alumina (boehmite) with 17% silica (Ludox®), after firing to 1410° C. (FIG. 13A), 1610° C. with short hold time (FIG. 13B) and 1610° C. with long hold time (FIG. 13C) according to an exemplary embodiment of the disclosure.

FIGS. 14A and 14B are SEM micrographs of pre-reacted particles with full inorganic batch composition (aluminum titanate+feldspar) after pre-firing at 1200° C. according to an exemplary embodiment of the disclosure. FIG. 14A is a regular surface view of the particles and FIG. 14B is a cross section of the particles. FIGS. 14C and 14D are regular surface and cross sectional SEM micrographs of pre-reacted particles having the same composition as in FIGS. 14A and 14B after pre-firing at 1300° C. according to an exemplary embodiment of the disclosure.

FIGS. 15A and 15B are SEM micrographs of pre-reacted particles of Example No. OTS, made from spray-dried powder with 2% boron oxide addition after rotary calcining at 1100° C., regular view and polished cross section according to an exemplary embodiment of the disclosure.

FIG. 16A shows the green (as-spray-dried) particles incorporated into the batch, FIG. 16B shows pre-reacted (spray-dried and fired) particles incorporated into the batch, and FIG. 16C shows charred (spray-dried and fired only to low temperature) particles incorporated into the batch.

SEM images of AT-type batch extruded and fired ware made with spray-dried alumina/3% silica are shown in FIGS. 18A and 18B for green spray-dried particles, and FIGS. 18C, and 18D for charred spray-dried particles.

Figure 19A:
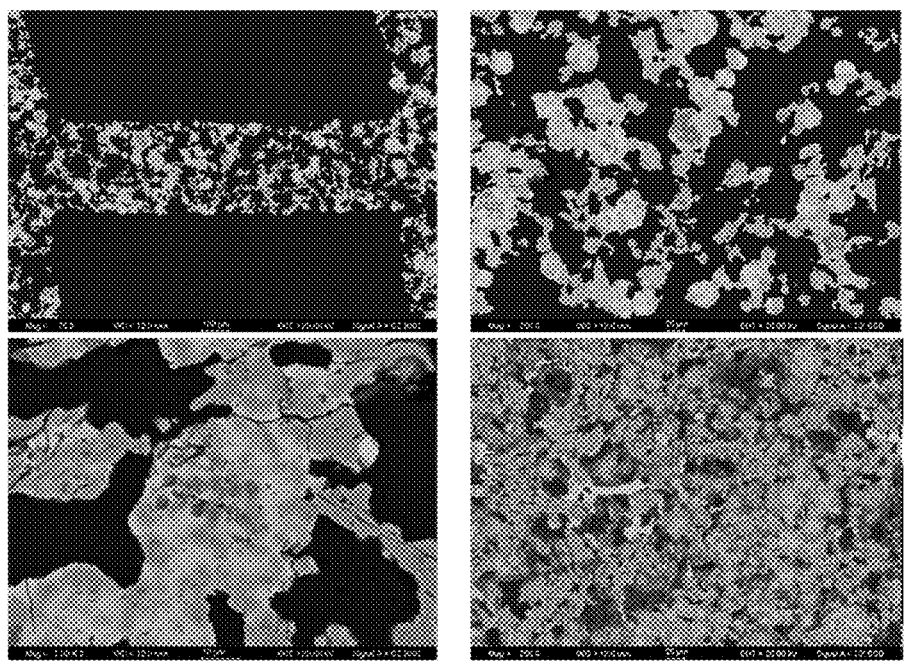
Figure 19B:
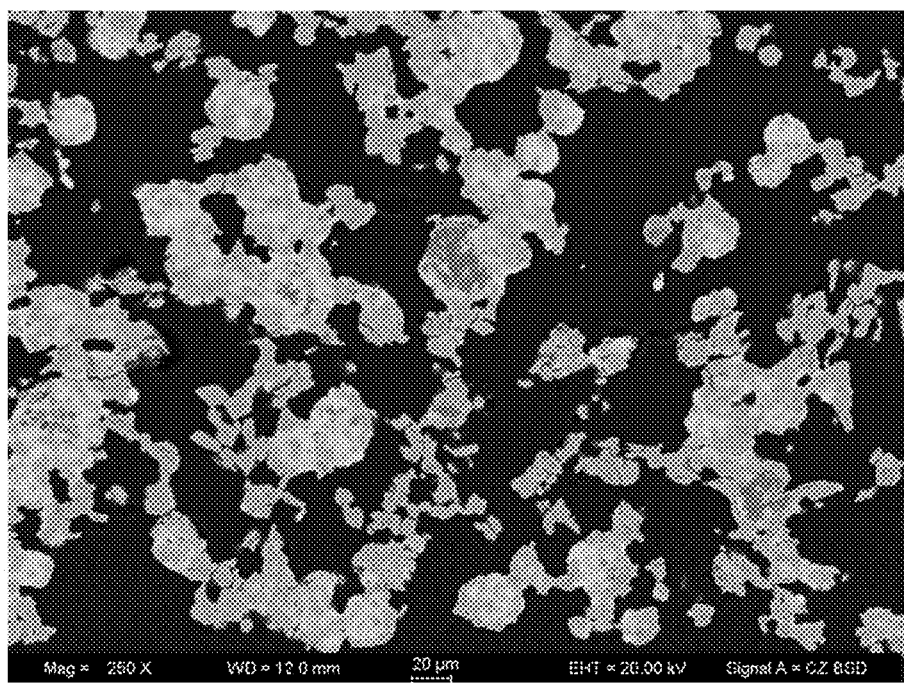

FIGS. 19A and 19B show SEM images of the inverse porosity characteristics in the bulk and at the surface, phase distribution, and low microcrack density in AT-type extruded and fired ware made from spray-dried, pre-fired (pre-reacted) particles of alumina/3% silica according to an exemplary embodiment of the disclosure.

FIGS. 20A, 20B, 20C, and 20D show SEM images of AT-type batch extruded and fired ware made with pre-reacted (spray-dried, pre-fired) particles alumina/3% silica with 5% Darvan according to an exemplary embodiment of the disclosure. FIG. 20A shows a polished cross section through a honeycomb channel wall. FIG. 20B shows details of the inverse porosity. FIG. 20C shows details of surface porosity, and FIG. 20D shows details of phase distribution and microcracking.

Figure 21:
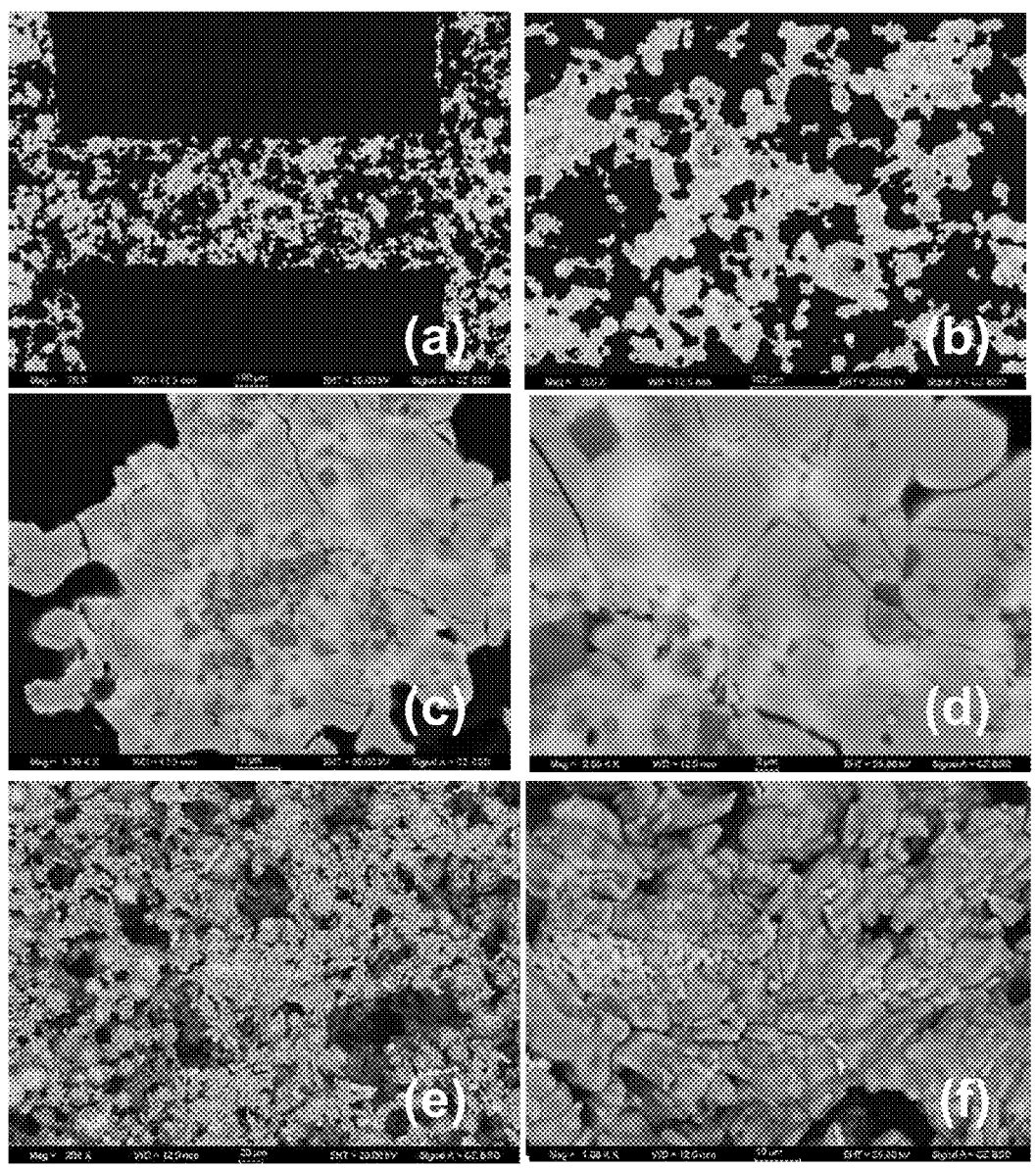

FIG. 21 shows SEM images of AT-type batch fired ware made from spray-dried, pre-fired alumina/3% silica with 5% Duramax, illustrating porosity, surface porosity, phase distribution and microcracking according to an exemplary embodiment of the disclosure. FIG. 21(*a*) shows a polished cross section through a honeycomb channel wall. FIG. 21(*b*) shows details of the inverse porosity. FIGS. 21(*c*) and 21(*d*) show details of phase distribution and microcracking. FIGS. 21(*e*) and 21(*f*) show details of the surface and surface porosity.

FIG. 22A shows a polished cross-section of a wall of AT porous ceramic honeycomb fired at 1427° C./15 h having about 50% porosity and particles of spray-dried alumina/3% silica pre-fired at 1300° C. according to an exemplary embodiment of the disclosure. FIGS. 22B and 22C show the polished cross-section at greater magnifications illustrating the regular porosity with small pore necks and the phase distribution. FIGS. 22D, 22E, and 22F are SEM micrographs of the fired, unpolished surface that illustrate pore and phase interconnectivity.

Figure 23A:
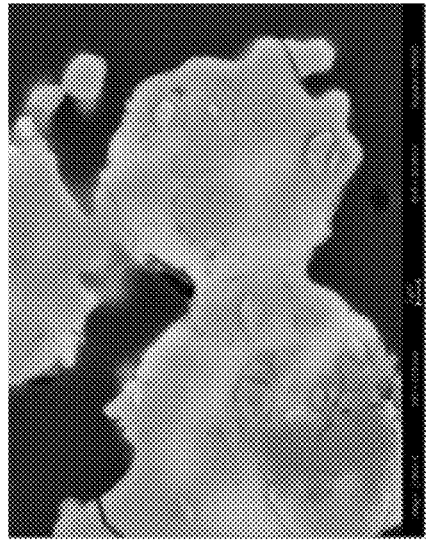
Figure 23B:
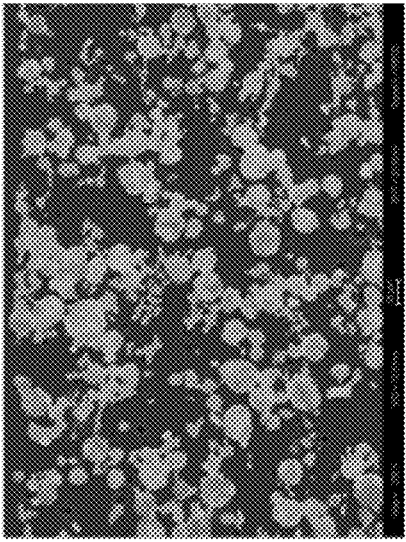
Figure 23C:
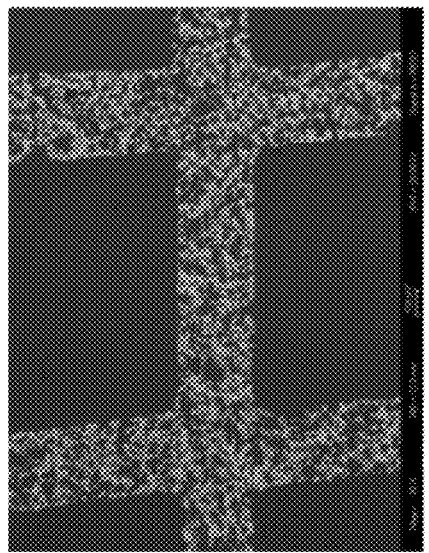
Figure 23D:
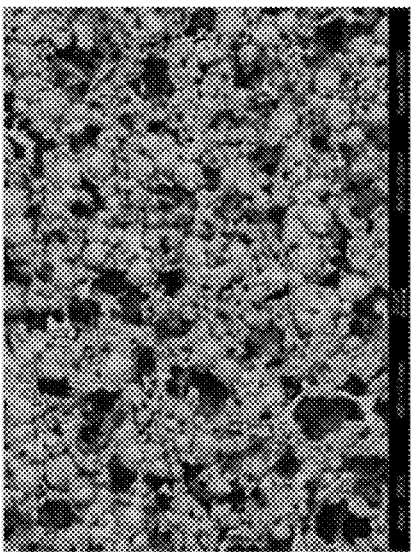

FIG. 23A is a SEM micrograph of a polished cross-section of a wall of AT porous ceramic honeycomb having spray-dried pre-fired alumina/3% silica/lanthanum oxide particles according to an exemplary embodiment of the disclosure showing inverse porosity with large pore necks. FIGS. 23B and 23C show the polished cross-section at greater magnifications illustrating the inverse porosity with large pore necks and the phase distribution. FIG. 23D is a SEM micrograph of the unpolished surface of the AT porous ceramic honeycomb of FIG. 23A illustrating pore and pre-reacted particle interconnectivity.

Figure 24C:
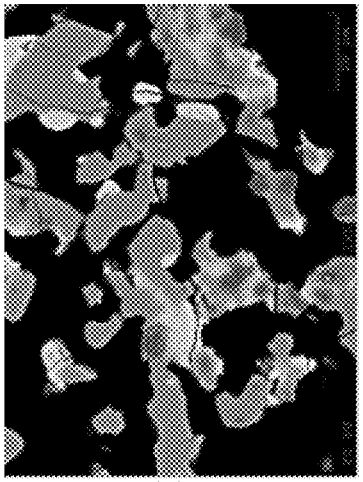
Figure 24F:
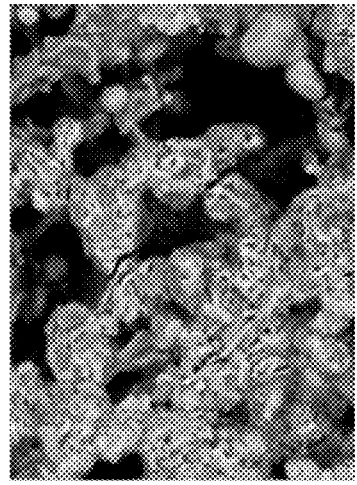
Figure 24B:
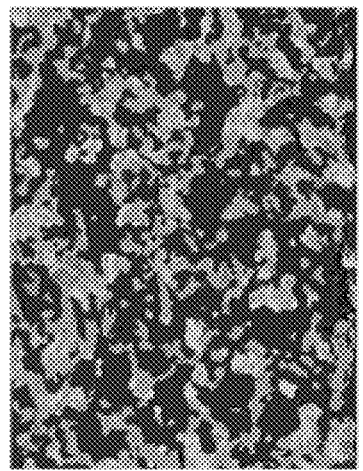
Figure 24E:
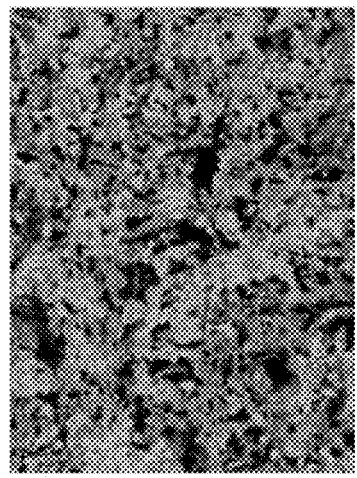
Figure 24A:
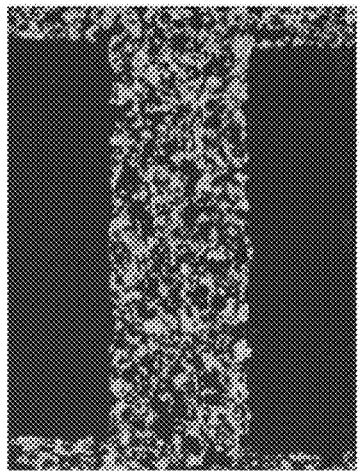
Figure 24D:
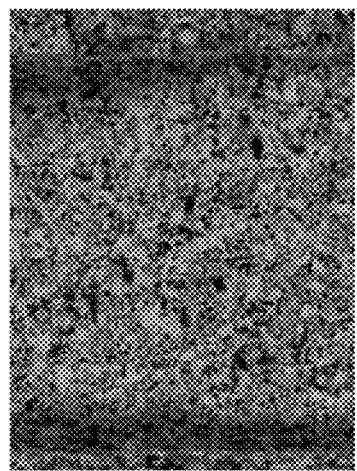

FIG. 24A shows a polished cross-section of a wall of AT porous ceramic honeycomb fired at 1427° C./15 h having about 55% porosity and pre-reacted particles of spray-dried titania/silica pre-fired to 1300° C. with average particle size of about 13 nm according to an exemplary embodiment of the disclosure. FIGS. 24B and 24C show the polished cross-section at greater magnifications illustrating the pore structure and phase distribution. FIGS. 24D, 24E, and 24F are SEM micrographs of the fired, unpolished surface that illustrate pore and phase interconnectivity.

Figures 25A, 25B, 25C, 25D, 25E, 25F:
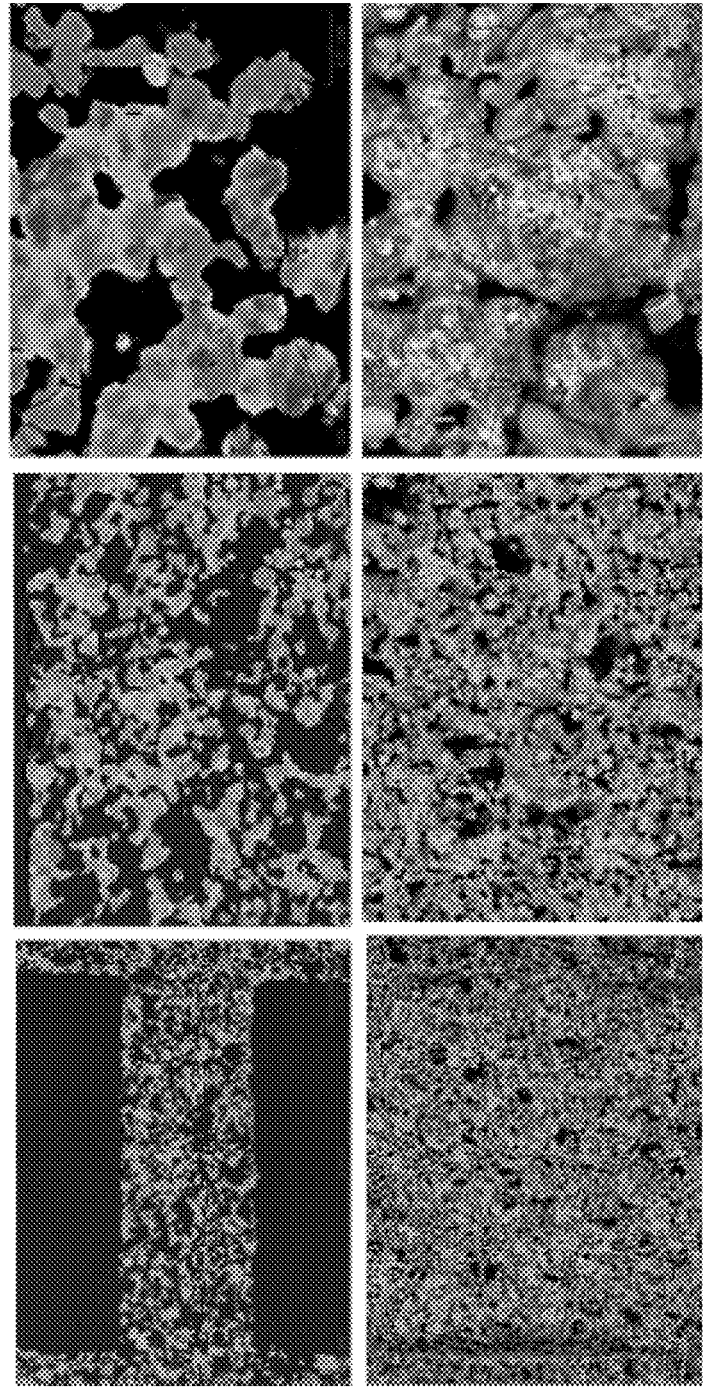

FIG. 25A shows a polished cross-section of a wall of AT porous ceramic honeycomb fired at 1427° C./15 h having about 54% porosity and made from pre-reacted particles of spray-dried titania/silica pre-fired to 1300° C. with average particle size of about 13 nm and particles of spray-dried alumina/silica pre-fired to 1300° C. with average particle size of about 16 nm according to an exemplary embodiment of the disclosure. FIGS. 25B and 25C show the polished cross-section at greater magnifications illustrating the regular porosity with small pore necks and the phase distribution. FIGS. 25D, 25E, and 25F are SEM micrographs of the fired, unpolished surface that illustrate pore and phase connectivity.

Figure 26C:
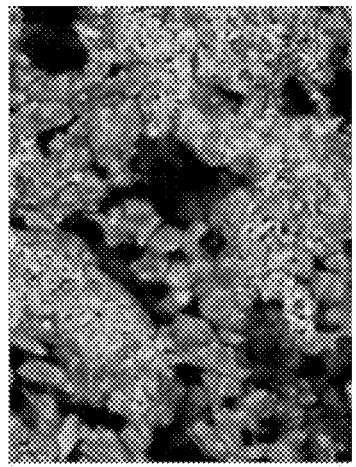
Figure 26B:
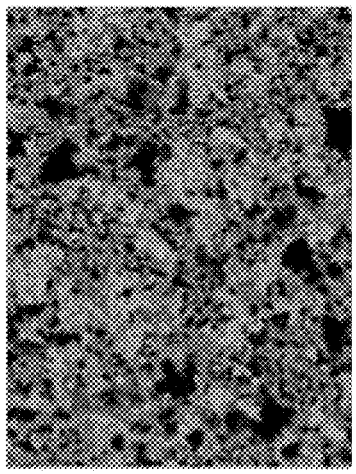
Figure 26A:
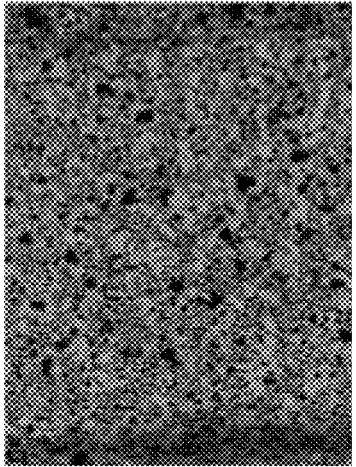
Figure 26F:
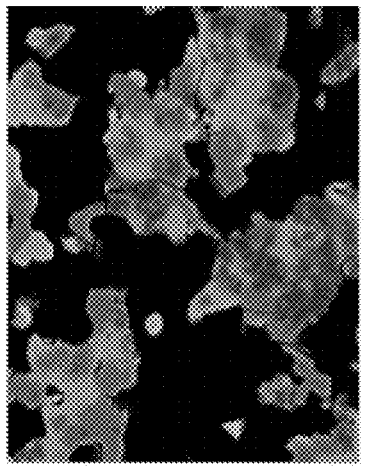
Figure 26E:
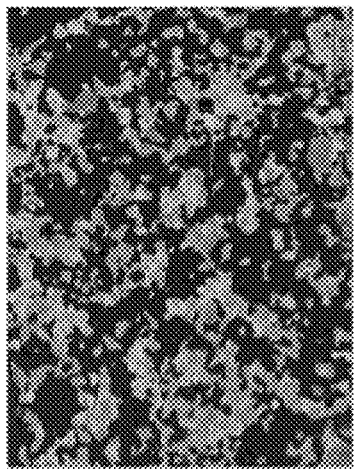
Figure 26D:
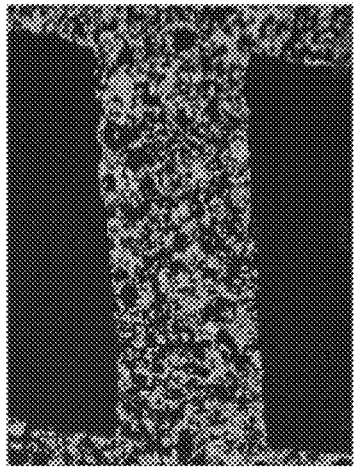

FIG. 26A shows a polished cross-section of a wall of AT porous ceramic honeycomb fired at 1427° C./15 h made with pre-reacted particles of spray-dried titania/silica pre-fired to 1300° C. with average particle size of about 13 µm and particles of spray-dried alumina/silica pre-fired to 1600° C. with average particle size of about 13 µm according to an exemplary embodiment of the disclosure. FIGS. 26B and 26C show the polished cross-section at greater magnifications illustrating the pore structure and the phase distribution. FIGS. 26D, 26E, and 26F are SEM micrographs of the fired, unpolished surface that illustrate pore and phase interconnectivity.

Figures 27A, 27B, 27C:
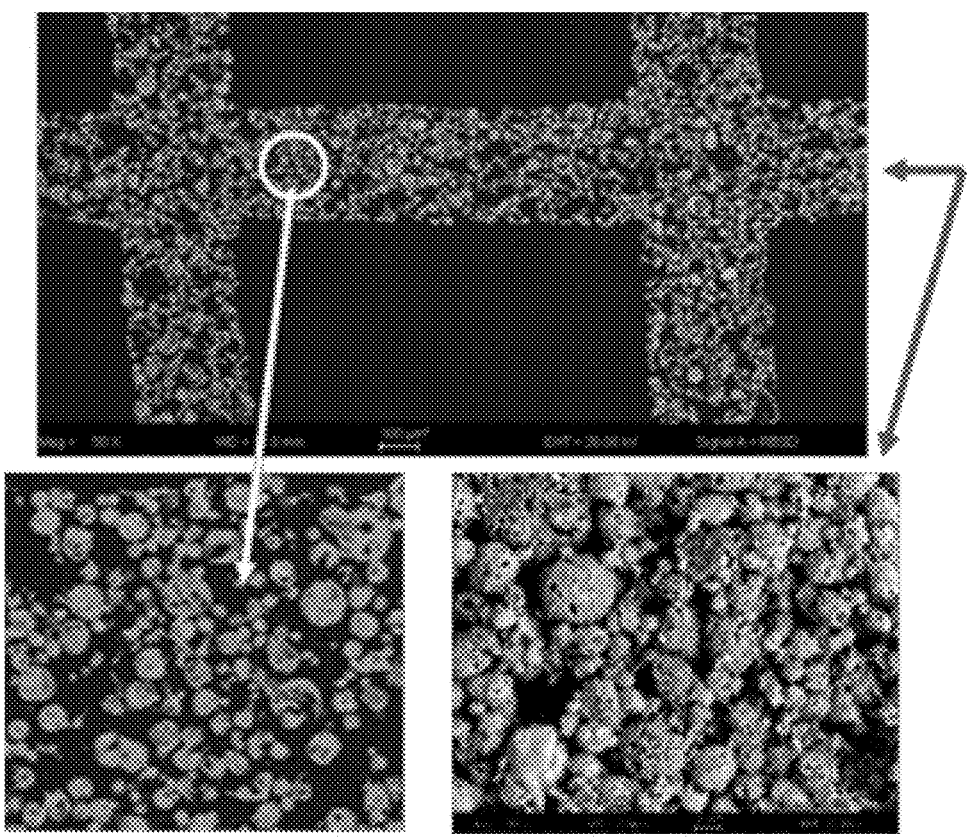

FIG. 27A shows a polished cross-section of a wall of AT porous ceramic honeycomb made from particles of pre-fired spray-dried full batch composition and fine alumina as binder according to an exemplary embodiment of the disclosure. FIG. 27B shows the polished cross-section at greater magnification and FIG. 27C shows the as-fired wall surface illustrating the spheroid packing of the inverse porosity with small particle necks and large pore necks.

FIGS. 28A, 28B, and 28C show SEM images of AT-type batch extruded and fired ware made from hollow pre-reacted calcined at 1650° C. for 15 hr, the extruded material was fired at 1410° C. according to an exemplary embodiment of the disclosure. FIG. 28A shows a polished cross section through a honeycomb channel wall showing preserved hollow spheres and inverse porosity. FIG. 28B shows details of the solid phases and inverse porosity. FIG. 28C shows details of surface porosity and material.

Figure 29B:
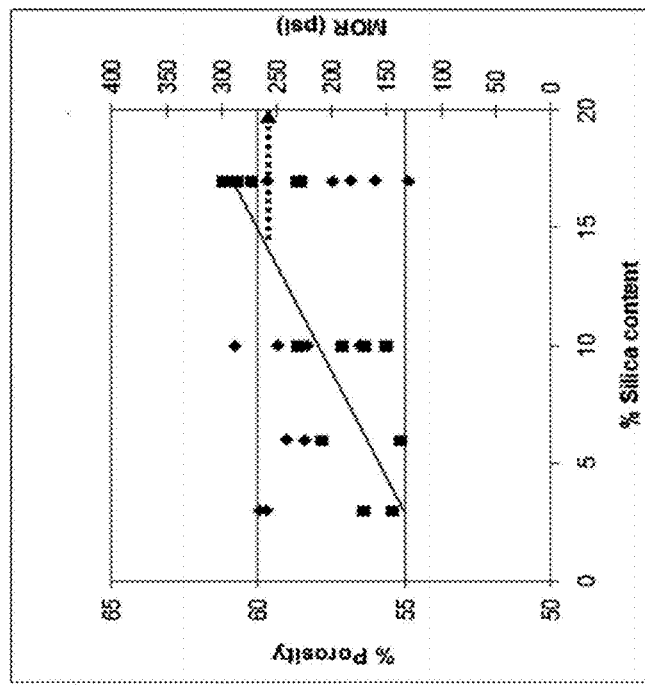
Figure 29A:
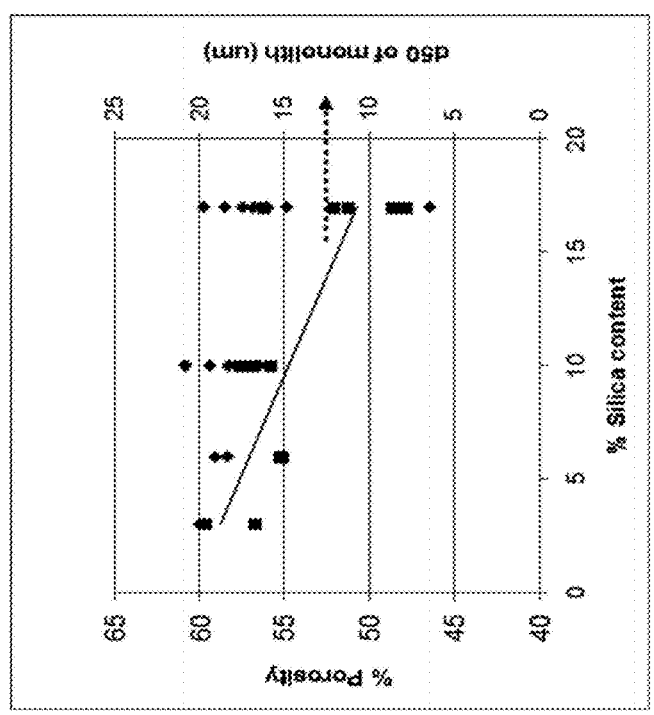
Figure 30A:
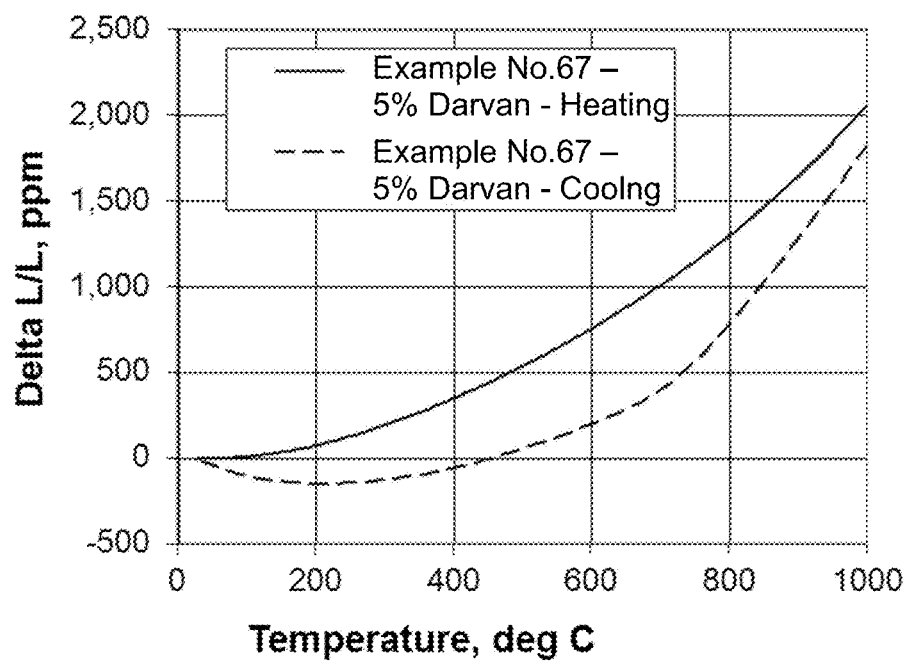
Figure 30B:
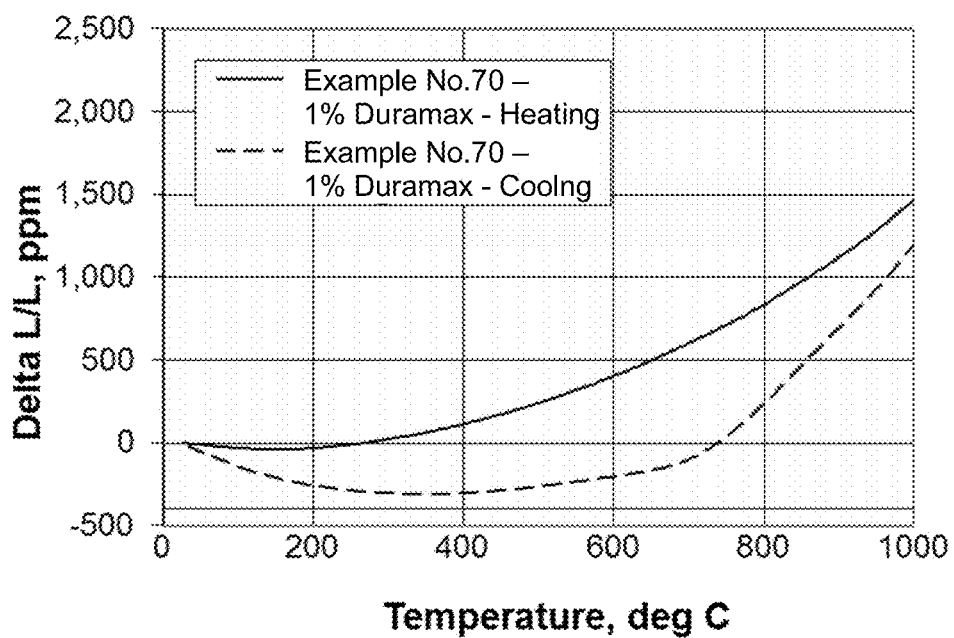
Figure 30C:
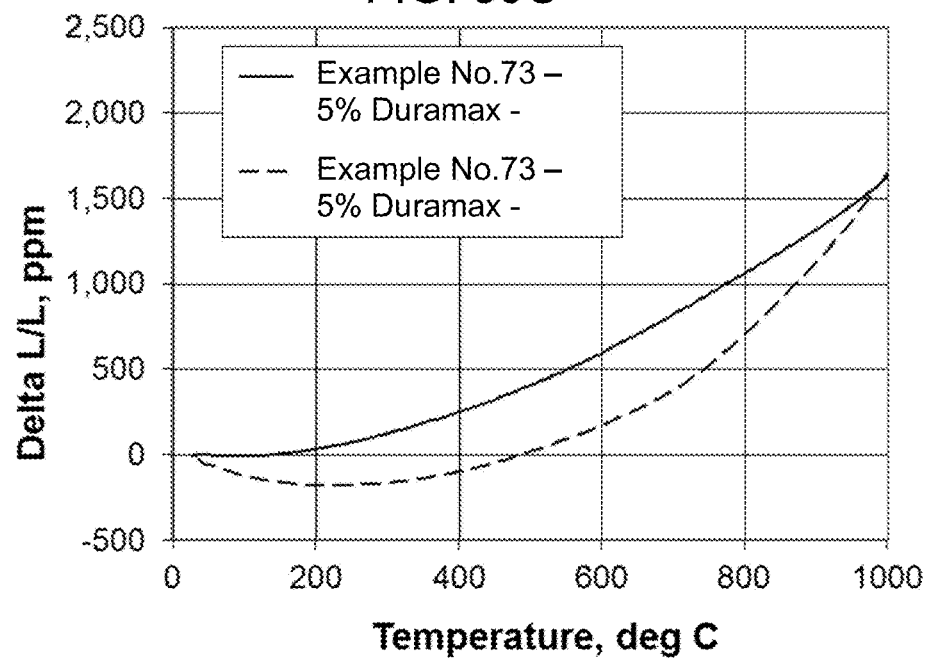
Figure 30D:
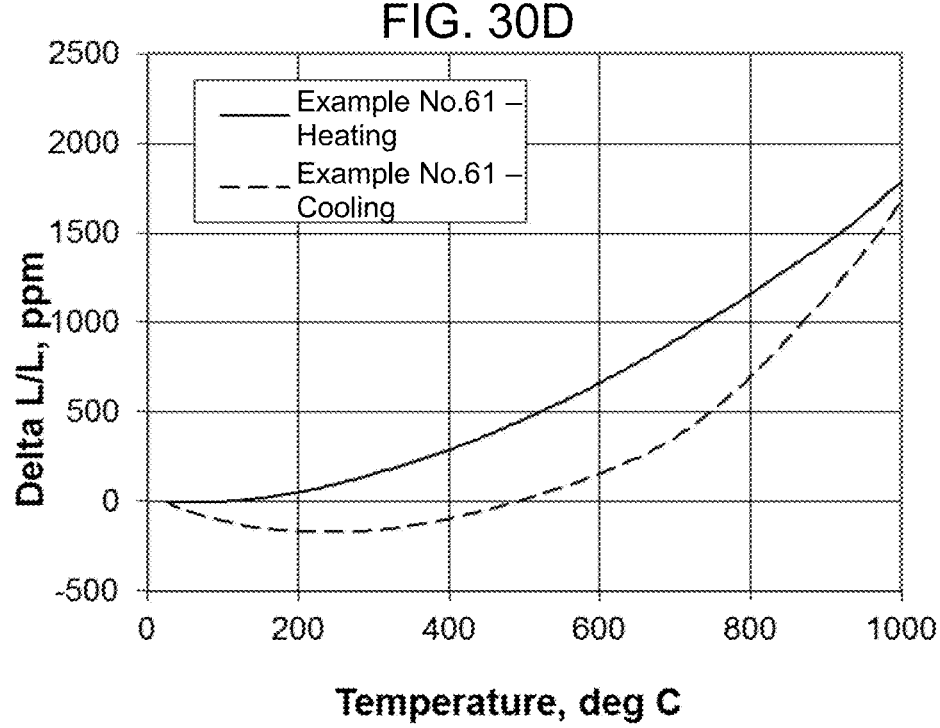

FIGS. 29A and 29B are graphical plots of data showing the evolution of porosity, median pore size (d50) and modulus of rupture (MOR) of porous ceramic articles comprising aluminum titanate composition that were obtained from batch material including pre-reacted powders of alumina with different silica content according to an exemplary embodiment of the disclosure.

FIGS. 30A, 30B, 30C, and 30D show changes in CTE cooling-heating curve shape for AT-type materials made with pre-reacted particles of spray-dried alumina/3% silica with different organic additive type and volume.

Figure 31:
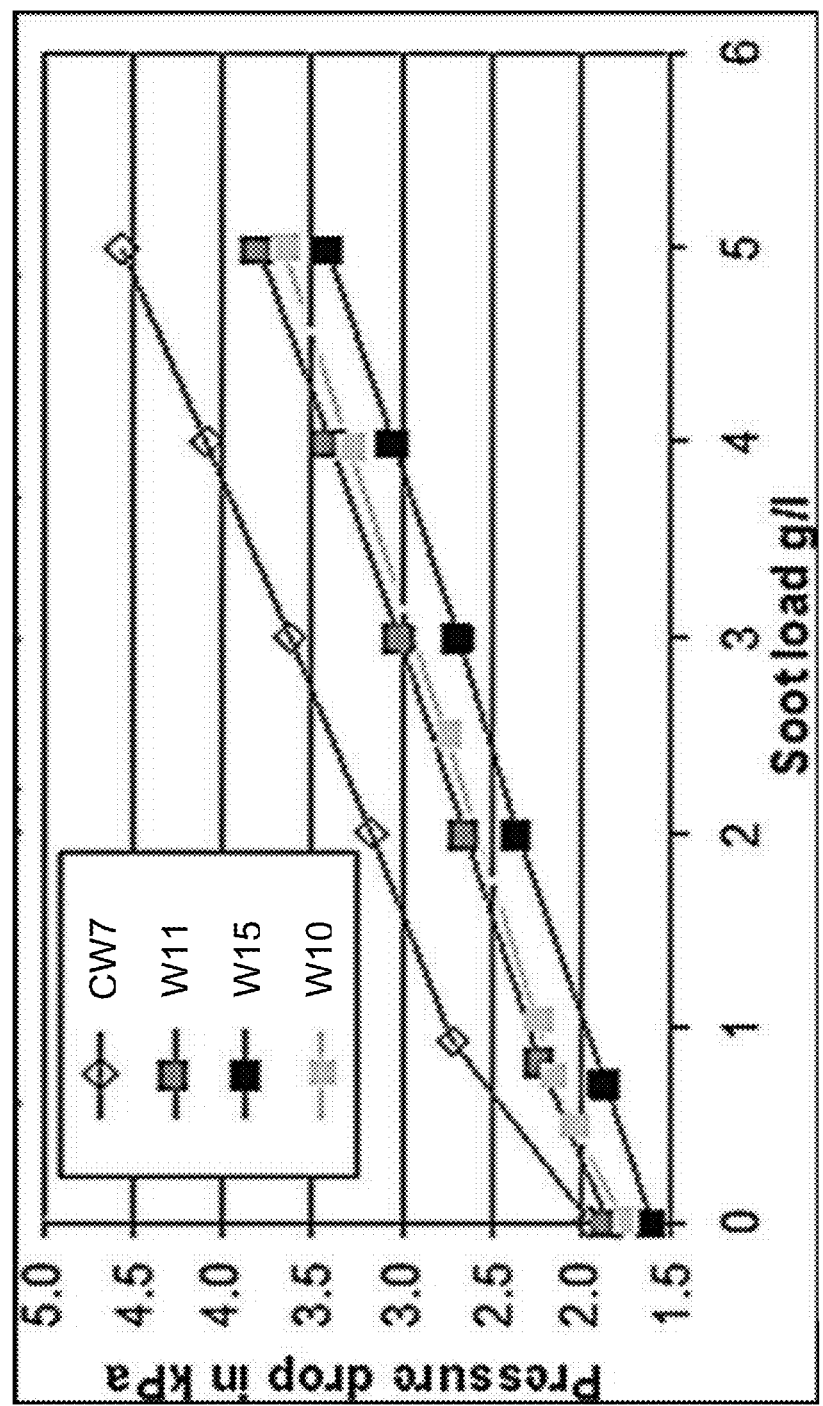

FIG. 31 is a graphical plot of data of pressure drop as function of soot loading for uncoated porous ceramic filter samples made with pre-reacted powders as batch materials according to exemplary embodiments of the disclosure and a comparative sample made with commercial raw materials.

Figure 32:
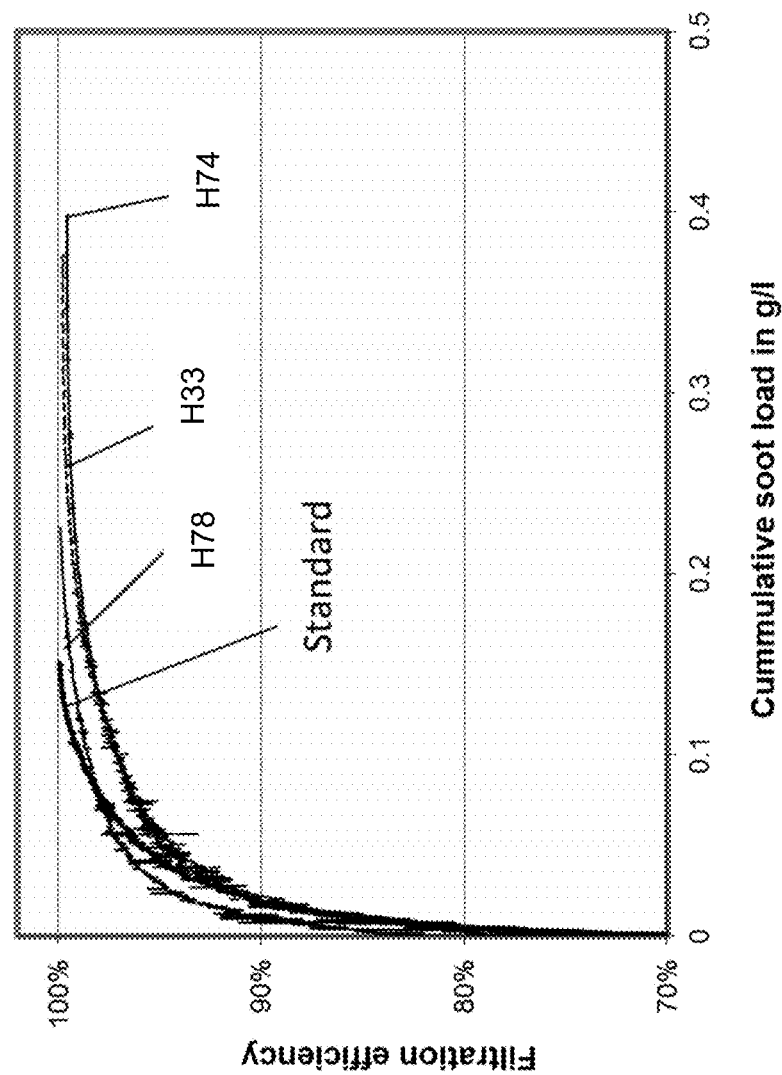

FIG. 32 is a graphical plot of data of filtration efficiency as function of soot loading for uncoated porous ceramic filter samples made with spray-dried pre-fired raw materials according to exemplary embodiments of the disclosure and a comparative sample made with commercial raw materials.

Figure 33A:
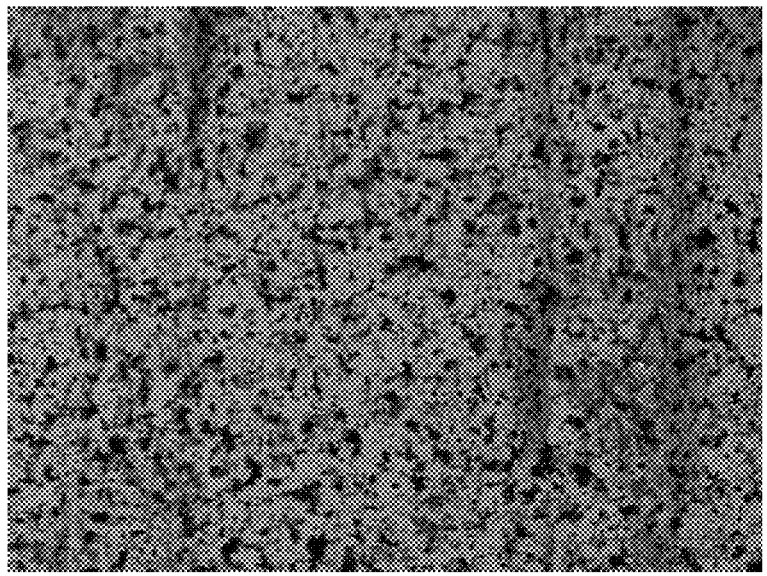
Figure 33B:
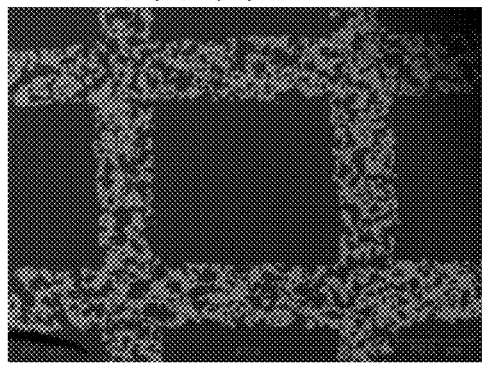
Figure 33C:
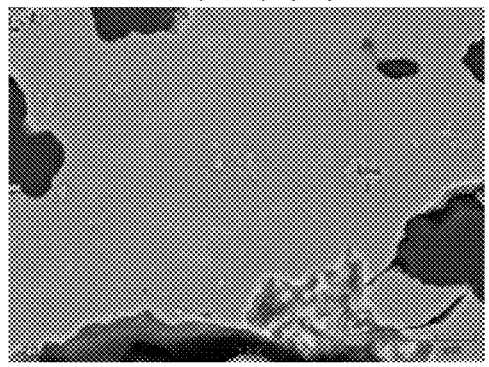
Figure 33D:
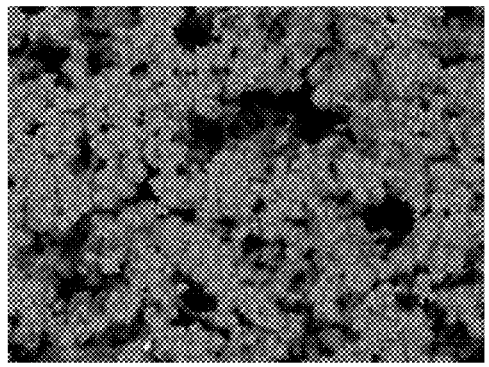
Figure 33E:
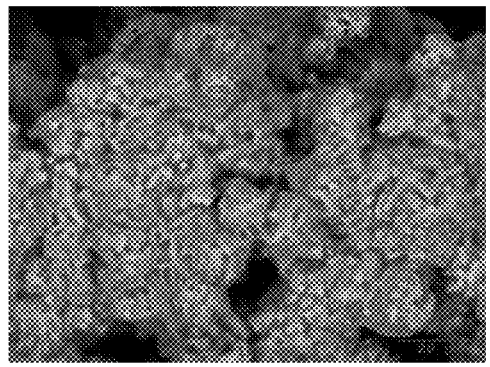

FIGS. 33A, 33B, 33C, 33D and 33E show SEM images of cordierite-type batch extruded and fired ware made from pre-reacted particles, spray-dried Example No. OJJ, pre-fired at 1410° C., the extruded material was fired at 1300° C. according to an exemplary embodiment of the disclosure. FIG. 33A shows a surface of a honeycomb wall indicating porosity shape and distribution. FIG. 33B shows a polished cross section through a honeycomb channel wall showing inverse porosity. FIG. 33C shows details of the solid phases. FIGS. 33D and 33E show details of surface porosity and material.

FIGS. 34A, 34B, 34C, and 34D show SEM images of cordierite-type batch extruded and fired ware made from pre-reacted particles, spray-dried Example No. OJJ pre-fired at 1410° C.; the extruded material was fired at 1610° C. according to an exemplary embodiment of the disclosure. FIG. 34A shows a polished cross section through a honeycomb channel wall showing inverse porosity. FIG. 34B shows details of the solid phases, microcracking and inverse porosity. FIGS. 34C and 34D show details of surface porosity and material.

Figure 35:
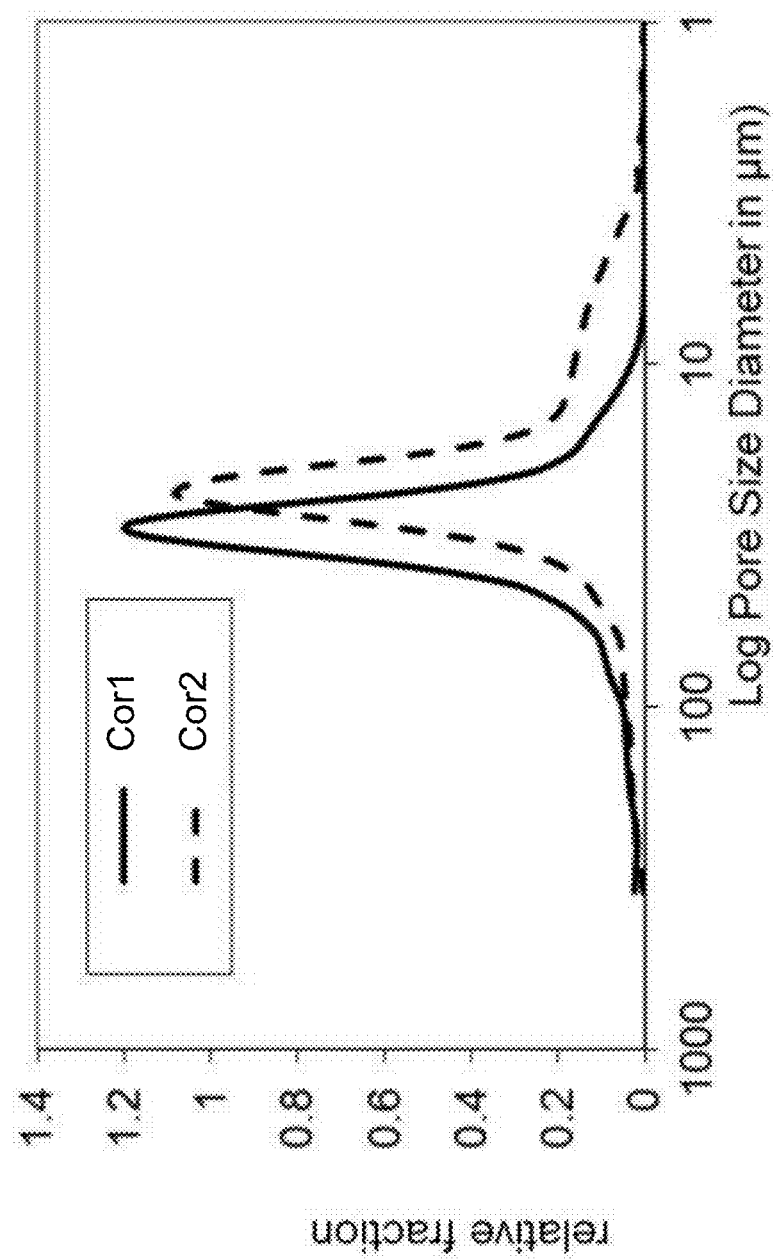
Figure 36:
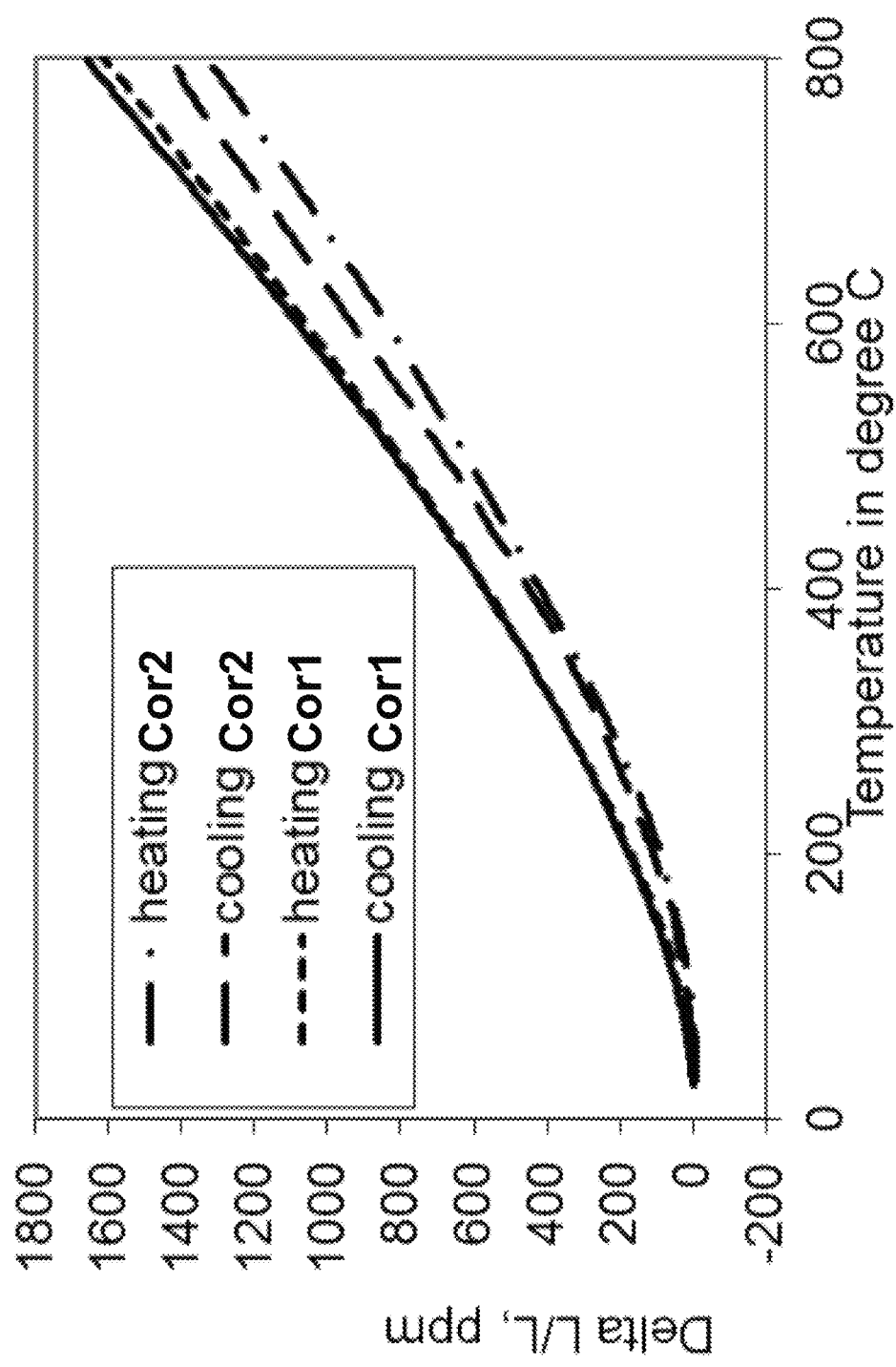

FIG. 35 shows the pore size distribution for the Example shown in FIGS. 33A-E. FIG. 36 shows the thermal expansion of the Examples shown in FIGS. 33A-E and FIGS. 34A-D.

DETAILED DESCRIPTION OF THE ILLUSTRATED EMBODIMENTS

The claimed invention is described more fully hereinafter with reference to the accompanying drawings, in which embodiments of the disclosure are shown. This claimed invention may, however, be embodied in many different forms and should not be construed as limited to the embodiments set forth herein. Rather, these embodiments are provided so that this disclosure is thorough, and will fully convey the scope of the claimed invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Exemplary embodiments of the present disclosure relate to a porous ceramic article and the production thereof. The porous ceramic article may be made of aluminum titanate based materials, such as aluminum titanate solid solution (pseudobrookite) as the main phase (greater than 50 vol %) and other phases such as cordierite, feldspar, mullite, spinel, alumina, rutile, or similar oxides, cordierite, or other oxide or non-oxide ceramics, including metals, intermetallics, mullite, alumina ($Al_2O_3$), zircon, alkali and alkaline-earth alumino-silicates, spinels, perovskites, zirconia, ceria, silicon oxide ($SiO_2$), silicon nitride ($Si_3N_4$), silicon aluminum oxynitride (SiAlON), and zeolites. Application of the porous ceramic article may include, for example, honeycomb integrated and non-integrated diesel and gasoline catalyst supports, substrates, and particulate filters. Exemplary embodiments of the present disclosure also relate to a porous ceramic article and batch compositions including pre-reacted particles, and a process for making the porous ceramic article by using at least one batch material in the form of pre-reacted particles.

The pre-reacted particles may be of selected composition, structure, size, and size distribution to impose a reaction path and microstructure development during reactive firing of the porous ceramic article. The porous ceramic article produced with the pre-reacted particles may have an engineered pore distribution and phase distribution, which may be referred to herein as the pore network structure and the microstructure. The microstructure may be characterized by phases within the solid matter and the morphology may be characterized by the shape of the matter and the shape of the pores within the ceramic article. Generally, the microstructure and morphology are characterized by matter and pore channels of two-dimensional cross sections through the three dimensional structure. The porous ceramic article made from the pre-reacted particles may have a "normal" porosity of small pore necks and large matter necks or "inverse" porosity of large pore necks and small matter necks with large pore size in the final, fired ceramic. Pore necks may be considered the channels connecting pores. In microstructures having pores created by fugitive pore formers, the pores are generally spherical or other shape with small connecting channels where the pores intersect one another, as an example of normal porosity with small pore necks. On the other hand, in microstructures having pre-reacted spheroidal particles forming the microstructure, pores may be formed between the particle material as an example of inverse porosity with large pore necks. In the latter case the pore channels are wider and show less constriction for gas flow.

The porous ceramic article having the pre-reacted particles according to an exemplary embodiment of the present disclosure provides improved diesel particulate filter (DPF), gasoline particulate filter (GPF), catalyst support, substrate, and combined substrate particulate filter product properties compared to porous ceramic articles made from powder batches without pre-reacted particles. Porous ceramic articles made from batches with pre-reacted particles exhibited large pore size and high porosity, good strength and low coefficient of thermal expansion (CTE) that enable, low pressure drop at higher washcoat and catalyst loading. Thus, exemplary embodiments of the present disclosure enable integration of high selective catalytic reduction (SCR) catalyst loading and high de-$NO_x$ catalyst efficiency at low pressure drop, high filtration efficiency, and good thermal shock resistance.

Use of spray-dried particles for good particle packing and narrow pore size distributions was attempted for making porous bodies applied through processes, such as pressing into shape and natural sintering. However, green spray-dried powders did not successfully survive extrusion processes. In fact, the inventors have run into many roadblocks and dead ends in attempting to use green spray-dried powders successfully in extrusion processes. Despite a broad exploration of different binders it seemed impossible to make the spray-dried particle strong enough to survive the pressures of extrusion. Trials were conducted to extrude green spray-dried alumina-talc, alumina-clay and graphite (GR) with binder and use them as raw material in ceramic precursor batches. Material properties in these trials were little changed over powder raw material. In these attempts, the spray-dried particles were used as spray-dried green and broke up into powder or small fragments under the shear stresses of screw and extrusion die.

FIG. 1 is a process flow diagram to manufacture a porous ceramic article according to an exemplary embodiment of the disclosure. The method of manufacturing a porous ceramic article 100 may include spray-drying single batch components, partial batch compositions or full batch compositions 110. To provide mechanical strength to the spray-dried particles for the batch mixing and extrusion process, the spray-dried powders are calcined (pre-reacted) at high temperature so that a partial or complete reaction or sintering is induced 120. Pre-reacting in batch furnaces can be used for calcining, but may require additional milling to break up sintered agglomerates. Rotary calcining, for example, may avoid agglomeration of the spray-dried particles. Sieving or other separation methods can be used to select narrower particle size fractions.

According to other exemplary embodiments, particles can be made by pre-reacting fine powders with a polymer followed by breaking up of the polymer, such as by grinding, and calcining (firing) the ground particles to form pre-reacted particles. Likewise, a slurry may be made of the fine powders, then compacted to form particles, such as by drying. The dried particles may then be calcined (fired) to form the pre-reacted particles. Other methods may include spray-drying, spin drying, and atomizing the slurry to form green particles that may then be calcined to form the pre-reacted particles.

The green particles may have spheroidal, such as (i) spherical (ii) ellipsoidal, and (iii) toroidal (torus like with or without a center hole) shapes as shown in a schematic of FIG. 2A. A particle may include fine powders, binders, and additives as described in more detail below. FIG. 2B shows a schematic of the fine powder particles of the green particle after calcining to form the pre-reacted particle. In this case, the fine powder particles may have (i) sintered, (ii) partially reacted, or (iii) fully reacted. Depending on the fine powders, calcining temperature, calcining time, and the like, one or more of these reactions may take place to form the pre-reacted particle. FIG. 2C is a schematic showing (i) a dense pre-reacted particle, (ii) a porous pre-reacted particle, and (iii) a hollow pre-reacted particle.

That is, the pre-reacted particles can comprise at least one of dense, porous, or hollow spheroidal particles. The spheroidal particles can comprise at least one of spherical (e.g., substantially round), toroidal (e.g., doughnut, with or without a hole), prolate spheroidal (e.g., egg, raindrop, American football), and oblate spheroidal (e.g., pancake, lentil) particles.

The pre-reacted particles are then incorporated in the batch and mixed with the other batch constituents 130. The batch is extruded 140, dried 150, and fired 160 to form the porous ceramic article. In the case of pre-fired, partially or fully pre-reacted spray-dried materials, firing temperatures can be lower or durations shorter. For fully pre-reacted spray-dried materials, very short or low temperature firing schedules can be implemented, for example, when a low firing binder may be sintered.

According to an exemplary embodiment of the disclosure, fine powders and soluble constituents may be mixed in a slurry with water, and any of binder, dispersant, surfactant, and anti-foam agent. The slurry is then suspended in a carrier gas and atomized at the top of the spray dryer. Parameters such as nozzle size, temperature, pressure, and solid loading may be varied. Fine powders, for example, particles of less than 1 μm, or soluble constituents may be used.

Hollow and solid spray-dried particles of different sizes, size distribution and compositions may be made by using different settings of the spray-dryer and different starting materials according to exemplary embodiments of the disclosure. Green particles may be dense or contain different levels of porosity, ranging from dense over porous to hollow, and also different pore sizes.

According to exemplary embodiments alpha alumina or boehmite may be used as an alumina source, colloidal silica suspension may be used as a source for silica, fine titania as a source for titania, and fine magnesium oxide as a source for magnesia. Other inorganics, such as strontium carbonate, calcium carbonate, and lanthanum carbonate may be jet-milled to less than 1 μm particle size and added to the slurry. Lanthanum acetate, boron oxide and other sintering aids may be added in the form of an aqueous solution to the slurry.

Exemplary embodiments of combinations of inorganic powders spray-dried to form green particles include alumina (fine alpha alumina or boehmite) with 1.5 to 15% silica, alumina with different sinter additives such as B, Mg, Y, Fe, etc., alumina-silica mixtures with different sinter additives such as B, Mg, La, Y, Fe, etc., titania defining compositions, such as alumina with different levels of silica, alumina/titania mixtures, aluminum titanate composition, feldspar composition, and full aluminum titanate (AT) batch compositions (aluminum titanate and feldspar phases) with complete final AT inorganic composition or with a small deficiency in alumina or silica or (alumina+silica). Spray-dried full batch compositions may also contain sintering aids such as lanthanum oxide, ceria, yttria, zirconia, boron oxide, alkali oxides, etc.

Spray-dried powders may be pre-fired at different temperatures for different times, in a regular box or tube furnace in a crucible, sinter box, or on a setter, or in a rotary calciner according to exemplary embodiments. Conditions for static firing of alumina/silica-based dried green powders include firing top temperatures between 1200° C. and 1600° C. and 1 h to 15 h hold time. Conditions for static firing of full AT-based composition green powders include temperatures between 1200° C. and 1600° C. At lower reaction temperatures, aluminum titanate may not be formed; at temperatures greater than 1300° C., aluminum titanate was formed.

In a static setting, the green powders may sinter together at high temperature and at long hold times and thus, may be broken apart prior to further use, for example, as a batch constituent. Sieving or low energy milling may be used to break the loosely sintered agglomerates.

Rotation of green powders during pre-firing avoids sintering together and may provide better preservation of particle shape. An industrial rotary calciner may be used for firing powders. For example, rotary calcining conditions of alumina/silica-based green particles may include, for example, 1000-1650° C. As another example, rotary calcining conditions of the full batch AT spray-dried particles may include, for example, 1000-1480° C.

According to exemplary embodiments the pre-reacted powders may be used as batch material together with other raw materials to match the final ceramic article (e.g., filter, substrate) inorganic composition, for example AT, AT-based composite, cordierite, cordierite composite, silicon carbide, silicon nitride, or like ceramic article inorganic compositions. Pore formers, such as graphite, polymer beads, foaming agents, starch and others with particle sizes to match the pre-reacted particle size, may be added to the batch at levels of 0-50%, for example, at levels of 5%, 10%, 20%, 25%, 30%, or 40%. To provide satisfactory rheological properties and enable a good extrusion quality, methylcellulose (3-7%) may be added as a binder and a lubricating oil package, may be added to form a green ceramic article (green ware).

Batches may be engineered to achieve high porosity and large pore size in the ceramic article through a random loose packing (low density packing) of the pre-reacted (e.g., spray-dried pre-fired) particles in agglomerates, to benefit from engineered reaction path, microstructure and reaction degree of the pre-reacted particles to control firing shrinkage during drying and firing of the green ware to form the ceramic article.

According to exemplary embodiments, a method of making a porous ceramic honeycomb may include mixing batch constituents, for example, premixing powder batch ingredients including pre-reacted particles, pore-former, and binder. These dry ingredients may be combined in a mulling pan and mulled, while batch water is added during mulling until a suitable paste texture is reached. The paste may then be formed, for example, extruded or pressed, for example, in a ram extruder or a twin screw extruder through a die into a honeycomb structure. The cell geometry of the honeycomb structure may be, for example, 300 cells per square inch (cpsi) (46.5 cells per square cm) and 14 mil (0.014 inch or 0.0356 cm) wall thickness (300/14), 300/10, 400/14, 600/9, 900/12 or other cell geometry suitable as a honeycomb filter or substrate after drying and firing. The formed green ware with different pre-reacted particle batch materials may be dried and fired to obtain the porous ceramic honeycomb.

Formed green honeycomb parts may be dried in a microwave oven, air dried, hot air died, RF dried, etc., or subjected to a combination of drying methods and times until sufficiently dried to be fired. Firing may include heating in an appropriate atmosphere at a temperature sufficient to form the final phases of the porous ceramic honeycomb and subsequent cooling. For example, firing may occur in an air atmosphere in a furnace at heating rates of 120° C./h to the maximum firing temperature, which may range from 1000° C. to 1650° C., a hold for 1 to 30 hours and cool down rate of about 10 to 160° C./hour. Heating may include slow ramp rates during debinding in low oxygen partial pressure during burnout of pore formers, surfactants, lubricants, additives, and binders.

Figure 3A:
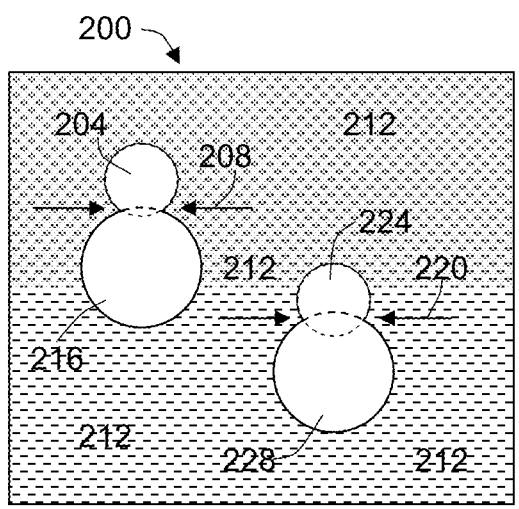
FIG. 3A is a schematic diagram of a cross section through a porous ceramic article showing a regular porosity microstructure with narrow pore necks and FIG. 3B is a schematic diagram of a cross section through a porous ceramic article showing an inverse porosity microstructure with large pore necks according to an exemplary embodiment of the disclosure.
Figure 3B:
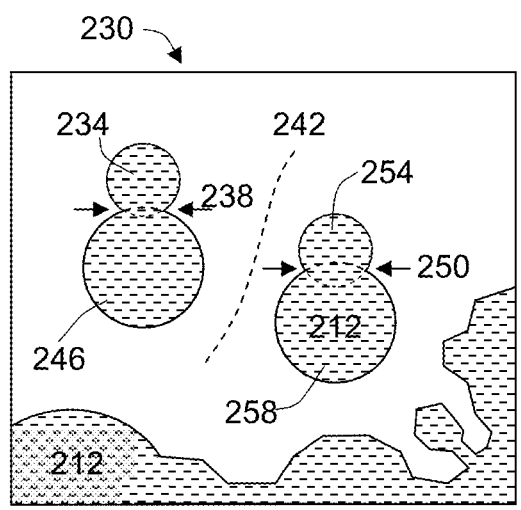

FIG. 3A is a schematic diagram of a cross section through a porous ceramic article showing a regular porosity microstructure with narrow pore necks and FIG. 3B is a schematic diagram of a cross section through a porous ceramic article showing an inverse porosity microstructure with large pore necks according to an exemplary embodiment of the disclosure. In porous ceramic precursor batches a pore former may be included. Pore formers may include graphite, polymer spheres, starches, and the like. During firing, the pore former is burned out leaving a pore in the fired porous ceramic article. During this burnout of the pore former, gases may need to escape from the article, while some reactants may be left behind as part of the solid matter of the final article. Exothermal and endothermal firing events due to dehydration, burn out and other transformations may require slow firing to avoid cracking of the article.

FIG. 3A demonstrates that regular porosity 200 with narrow necks 208, 220 between solid matter 212 may result in high pressure drop, as may be obtained from firing unreacted, fine powders with large fugitive pore former. The solid matter 212 may be multiphase, multicomponent, and microcracked, or a single phase with no microcracks. The pore morphology generally resembles the shape and arrangement of a fugitive pore former that was burned out during firing of the article. The pore network 200 through which gases travel during in-service consists of pores 204 and the connection between pores. These connections may be referred to as pore necks 208. Fluids, such as exhaust gases, may be cleaned as they travel through the pore network 200. Pore neck 208 may cause flow restriction as the fluid flows from pore 204 to pore 216 through the pore neck 208. Small pore necks 208 may lead to a high pressure drop for a porous ceramic article or a honeycomb filter. Large pore necks 220 may lead to a lower pressure drop than small or narrow pore necks 208. Large pore neck 220 connects pore 224 to pore 228 in FIG. 3A. FIGS. 3A and 3B are schematics of cross sections (two-dimensional) through three-dimensional structures such that pores 204, 216, 224, and 228 may be connected in the pore network 200 even though pores 204 and 216 are shown as spaced apart from pores 224 and 228 by material 212 in the two-dimensional cross section schematic.

Inverse porosity with large pore necks between matter as can be obtained by sintering reacted spherical batch particles (spray-dried pre-fired particles) in a final firing process with or without a fine, low temperature binder is demonstrated in FIG. 3B. Small necks may limit permeability and gas flow and control the pressure drop. Materials with large necks in the pore structure produce improved permeability and thus provide low pressure drop filters. FIG. 3B illustrates a cross section of an inverse pore network 230 microstructure. Pre-reacted particles form a sinter-bonded or reaction-bonded porous ceramic article. Matter 212 may include shapes generally resembling spheroidal, pre-reacted particles such as shape 234 joined to shape 246 at matter neck 238. In an inverse porosity morphology, the matter 212 appears in a cross-sectional two-dimensional (2D) view as islands surrounded by irregularly shaped pores in contrast to the morphology of FIG. 3A. In the normal porosity morphology, the pores 204, 216 and 224, 228 appear in a 2D cross sectional view as islands surrounded by irregularly shaped matter as shown in FIG. 3A.

The pore neck 242 of FIG. 3B between matter islands 212 may be larger than pore necks 208 and 220 of FIG. 3A. The matter can be considered to have matter neck 238 and matter neck 250 where solid shape 254 joins solid shape 258. FIG. 3B is a schematic of a cross section (two-dimensional) through a three-dimensional structure such that solid shapes 234, 246, 254, and 258 may be connected even though solid shapes 234 and 246 are shown in the 2D scheme as spaced apart from solid shapes 254 and 258 by pore network 230 in the two-dimensional cross section schematic. While the 2D projection of the pore structure 230 is shown as completely surrounding matter islands 212, this has been done for clarity of explanation of inverse porosity and the pore structure 230. In three-dimensional (3D) structures, for example, in 3D real pore network structures of Examples described below, the pore structure 230 does not completely surround the matter 212. In the inverse pore structures of embodiments of the materials, as will be seen in the following Examples, the inverse porosity microstructure is characterized in more contiguous pores than normal porosity and an inverse pore shape compared to normal porosity.

According to exemplary embodiments of the disclosure, a porous ceramic article having an inverse pore structure achieves higher permeability than a similar composition made from non pre-reacted particles. For example, the porous ceramic article may have a permeability greater than 1000 and a porosity greater than 50%. For example, the porosity may be greater than 57%, or even greater than 60%. The porous ceramic article may have a median pore size (d50) greater than 10 µm, for example, a median pore size greater than 15 µm, or even greater than 18 µm. The porous ceramic article may have a coefficient of thermal expansion from room temperature (RT) to 800° C. less than $20\times10^{-7}K^{-1}$, for example, less than $15\times10^{-7}K^{-1}$, or even less than $10\times10^{-7}K^{-1}$. Furthermore, a (300/14) honey comb body of the porous ceramic article may have a modulus of rupture (MOR) flexural strength greater than 170 psi, for example, greater than 200 psi.

According to exemplary embodiments of the disclosure, a porous ceramic article having a regular (non-inverse) pore structure achieves higher permeability than a similar composition made from non pre-reacted particles. For example, the porous ceramic article may have a permeability greater than 1000 and a porosity greater than 50%. For example, the porosity may be greater than 57%, or even greater than 60%. The porous ceramic article may have a median pore size (d50) greater than 10 µm, for example, a median pore size greater than 15 µm, or even greater than 18 µm. The porous ceramic article may have a coefficient of thermal expansion from room temperature (RT) to 800° C. less than $20\times10^{-7}K^{-1}$, for example, less than $15\times10^{-7}K^{-1}$, or even less than $10\times10^{-7}K^{-1}$. Furthermore, a (300/14) honey comb body of the porous ceramic article may have a modulus of rupture (MOR) flexural strength greater than 170 psi, for example, greater than 200 psi.

EXAMPLES

To enhance understanding of the disclosure with respect to certain exemplary and specific embodiments thereof, which are illustrative only and not intended to be limiting, the following illustrative Examples are put forth and are intended to provide a complete disclosure and description of how the articles and methods claimed herein can be made and evaluated. They are intended to be purely exemplary and are not intended to limit the scope of what the inventors regard as their invention as claimed.

Table 1 lists the ingredients used for making green particles. Table 2 summarizes examples of hollow alumina-silica green particles obtained from boehmite—3% silica slurries designated as A1, A2, and A3, in Table 1. Spray drying parameters, such as solid loading, surfactant addition, viscosity, nozzle size in mm, temperature in ° C., pressure, and inlet and outlet pressure in atmospheres, are listed in Table 2. The obtained green particles are separated into a coarse and a fine particle size fraction and are characterized by parameters such as the ratio of coarse over fine particle fraction, the average diameter of the coarse particle fraction, the average diameter of the fine particle fraction and the breadth of the particle fractions. In addition, the fraction of hollow particles as determined by SEM is indicated. Table 2 also shows the resulting pre-reacted particle average diameter of the spray-dried coarse particle fraction after firing to 1300° C.

TABLE 1

| Example No. | Raw Materials | Wt % |
| --- | --- | --- |
| A1 | SiO$_2$ | 3.285 g |
|  | water | 230 g |
|  | alumina | 100 g |
|  | additional binder, surfactant, dispersant | 1 g |
| A2 | SiO$_2$ | 3.285 g |
|  | water | 400 g |
|  | alumina | 100 g |
|  | additional binder, surfactant, dispersant | 1 g |
| A3 | SiO$_2$ | 3.285 g |
|  | water | 580 g |
|  | alumina | 100 g |
|  | additional binder, surfactant, dispersant | 1 g |

In Table 1, Ludox AS® was used as the SiO$_2$ (colloidal silica in water), a fine alumina powder was used, and Tritan x-100® was used as the organic additive. In Table 2, the nozzle size was 1.5 mm.

TABLE 2

| Example No. | Comp | % hollow spheres from SEM | TS | Viscosity RPM200 (cp) | pressure (atm) | Flow (%) | Inlet T (° C.) | Outlet T (° C.) | Ratio coarse/fine | Coarse green d50 μm | Coarse spread (d90-d10) μm | Fines green d50 μm | Fine spread (d90-d10) μm |
|---|---|---|---|---|---|---|---|---|---|---|---|---|---|
| 1 | A1 | >90 | 30 | 0.31 | 1.5 | 65 | 360 | 120 | 0.66 | 27.1 | 40 | 8.01 | 15.89 |
| 2 | A1 | 50 | 30 | 0.31 | 1.5 | 65 | 300 | 120 | 0.41 | 29.39 | 46 | 9.09 | 17.78 |
| 3 | A1 | 50 | 30 | 0.31 | 0.5 | 65 | 360 | 90 | 3.16 | 46.31 | 91 | 14.88 | 28.74 |
| 4 | A2 | 75 | 25 | 0.83 | 1.5 | 65 | 360 | 120 | 0.41 | 21.23 | 28 | 7.89 | 13.95 |
| 5 | A2 | 85 | 25 | 0.83 | 1.5 | 65 | 360 | 110 | 0.51 | 22 | 29 | | |
| 6 | A2 | 60 | 25 | 0.83 | 1.5 | 65 | 360 | 100 | 0.49 | 23.94 | 32 | | |
| 7 | A2 | 59 | 25 | 0.83 | 1 | 57 | 360 | 100 | 0.80 | 27.39 | 45 | | |
| 8 | A2 | 65 | 25 | 0.83 | 0.5 | 44 | 360 | 100 | 1.88 | 33.38 | 56 | | |
| 9 | A2 | 50 | 25 | 0.83 | 1.5 | 67 | 360 | 80 | 1.27 | 43.07 | 150 | | |
| 10 | A2 | 73 | 25 | 0.83 | 0.5 | 44 | 360 | 90 | 2.54 | 44.56 | 192 | | |
| 11 | A2 | 50 | 25 | 0.83 | 0.5 | 44 | 360 | 80 | 4.32 | 48.66 | 125 | | |
| 12 | A2 | 73 | 25 | 0.83 | 0.5 | 44 | 360 | 80 | 3.60 | 53.05 | 131 | | |
| 13 | A3 | >90 | 15 | 0.51 | 1.5 | 65 | 300 | 120 | 0.12 | 18.06 | 19 | 6.4 | 10.07 |
| 14 | A3 | >90 | 15 | 0.51 | 1.5 | 65 | 360 | 120 | 0.28 | 19.98 | 26 | 7.18 | 12.05 |
| 15 | A3 | 50 | 15 | 0.51 | 0.5 | 65 | 360 | 90 | 1.87 | 44.33 | 98 | 12.87 | 24.53 |

The effect of various parameters on the spray-dried particle size distribution will be described with reference to FIGS. 4-8 and Table 3. According to these results, green particle processing settings can be determined for the optimum engineered batch raw materials and optimum porous ceramic article properties.

Figure 4:
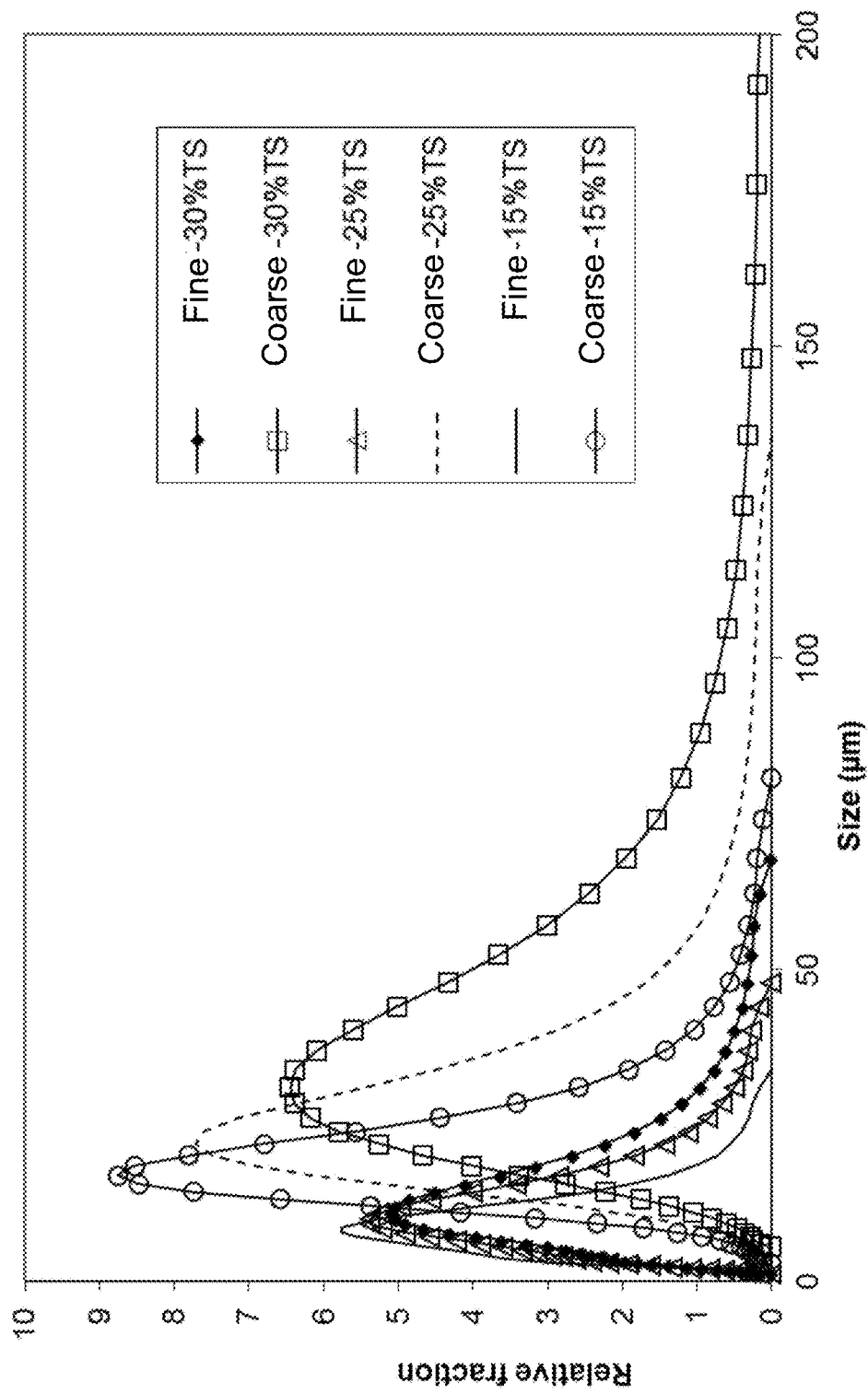
FIG. 4 is a graphical plot of particle size distributions of green particles made by spray-drying as a function of solid loading (TS) according to an exemplary embodiment of the disclosure.

FIG. 4 is a graphical plot of the green particle size with distributions obtained by spray-drying with different solid loading (TS) according to an exemplary embodiment of the disclosure. FIG. 4 illustrates fine (F) and coarse (C) green particle size distributions obtained with solid loadings of 15, 25, and 30% of compositions A1, A2, and A3 (Table 1). The spray dryer settings were 1.5 atm pressure, inlet temperature 300° C., outlet temperature 120° C. and 65% atm. FIG. 4 shows that the distribution and average particle size d50 decrease with decrease in solid loading TS. The demonstrated changes are related to the composition rheology, which is shown to be influenced by the solid loading. Lower solid loading produces a narrower particle size distribution.

Figure 5:
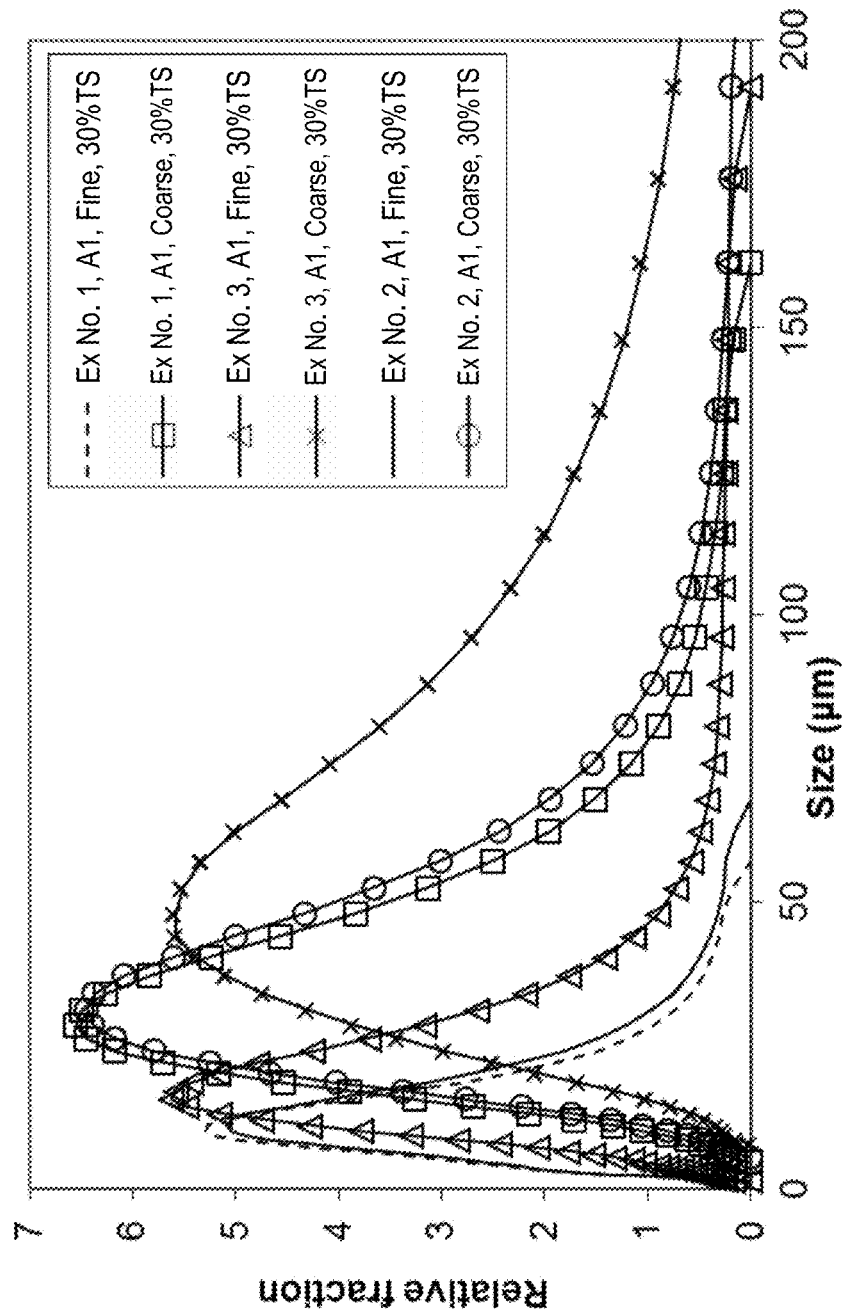
FIG. 5 is a graphical plot of the evolution of particle size distributions of green particles made by spray-drying at fixed solid loading (30% solid loading (TS) of boehmite/3% silica from Ludox®) that were obtained with different spray-dryer outlet temperature according to an exemplary embodiment of the disclosure.

FIG. 5 is a graphical plot of the evolution of green particle size distribution obtained by spray-drying at fixed solid loading (30% TS of boehmite/3% silica from Ludox®) at different outlet temperatures according to an exemplary embodiment of the disclosure. FIG. 5 shows results for outlet temperatures of 90° C. and 120° C. The outlet temperature has a strong impact on the spray-dried particle size distribution. At lower outlet temperature, a broad particle size distribution is obtained with large average particle size. The higher outlet temperature provides a narrower particle size distribution and a smaller average particle size.

Figure 6:
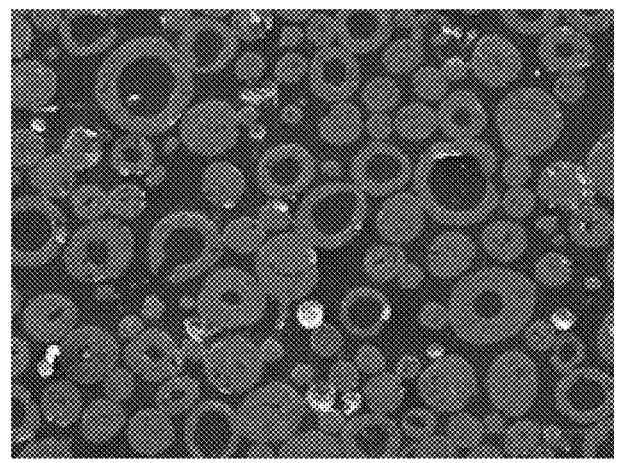
FIG. 6 is a scanning electron microscope (SEM) micrograph of a polished cross section of pre-fired, spray-dried particles with alumina-based composition, after firing at 1670° C. for 120 h, showing a significant fraction of hollow particles according to an exemplary embodiment of the disclosure.

FIG. 6 is a scanning electron microscope (SEM) micrograph of a polished cross section of pre-reacted particles with alumina-based composition, after firing at 1670° C. for 120 h, showing a significant fraction of hollow particles according to an exemplary embodiment of the disclosure.

Solid pre-reacted particles with different sizes and compositions were made by spray-drying and pre-reacting for use as batch materials. Table 3 summarizes examples of processing solid green particles of alumina-silica composition by spray-drying. In the Examples, alumina with 3% silica slurry compositions and the listed spray-drying parameters (solid loading, viscosity, temperature, pressure, and inlet and outlet pressure) are presented. A nozzle diameter of 1.5 mm was used for all Examples in Table 3 except for the compositions of Samples 26-28 that used a 1.0 mm nozzle. A 1% surfactant (Tritan x-100®) was used in all Examples of Table 3. The achieved green particle size distributions are characterized by parameters such as the ratio of coarse over fine particles, the average diameter of the coarse particle fraction, the average diameter of the fine particle fraction and the breadth of the fine particle fraction. In addition, the fraction of solid particles as determined by SEM is indicated when differing from 100%. The results indicate that more hollow particles are obtained at 40% solid loading than at lower solid loading. The spray-dried coarse particle fraction has been fired to 1300° C.; Table 3 also lists the average diameter of the pre-reacted particles.

TABLE 3

| Example No. | % hollow | % TS | Viscosity RPM200 (cp) | Pressure (atm) | Flow (%) | Inlet T (° C.) | Outlet T (° C.) | Ratio coarse/fine | Coarse green d50 μm | Coarse spread (d90-d10) μm | Fines green d50 μm | Coarse 1300° C. d50 μm |
|---|---|---|---|---|---|---|---|---|---|---|---|---|
| 16 | 65 | 40 | | 2 | 70 | 280 | 94 | 3.96 | 31.2 | 61 | | 29.96 |
| 17 | 62 | 40 | | 1.5 | 65 | 300 | 95 | 2.49 | 32.98 | 63 | 6.53 | 30.13 |
| 18 | 70 | 40 | | 1.5 | 65 | 280 | 94 | 2.13 | 33.28 | 86 | | 31.64 |
| 19 | 60 | 40 | | 2 | 80 | 300 | 95 | 1.67 | 30.71 | 57 | 5.55 | 32.62 |
| 20 | | 30 | 1.52 | 2 | 80 | 300 | 120 | 0.44 | 18.07 | 22 | 4.82 | 17.53 |
| 21 | | 30 | 1.52 | 1.5 | 65 | 300 | 95 | 0.91 | 22.04 | 26 | 5.96 | 20.71 |
| 22 | | 30 | 1.52 | 1 | 57 | 300 | 120 | 0.78 | 21.95 | 26 | 6.53 | 21.01 |
| 23 | | 20 | 0.61 | 2 | 80 | 300 | 120 | 0.23 | 18.47 | 23 | 4.4 | 17.45 |
| 24 | | 20 | 0.61 | 1 | 57 | 300 | 120 | 0.58 | 20.6 | 24 | 6.79 | 19.03 |
| 25 | | 20 | 0.61 | 1.5 | 65 | 300 | 95 | 0.81 | 22.56 | 29 | 5.86 | 21.25 |
| 26 | | 30 | | 2 | 80 | 300 | 120 | 0.29 | 14.84 | 18 | 4.78 | 14.26 |
| 27 | | 30 | | 1.5 | 65 | 300 | 95 | 0.89 | 21.69 | 27 | 6.87 | 20.65 |
| 28 | | 30 | | 1 | 57 | 300 | 120 | 1.03 | 23.64 | 33 | 7.96 | 22.29 |

Figure 7:
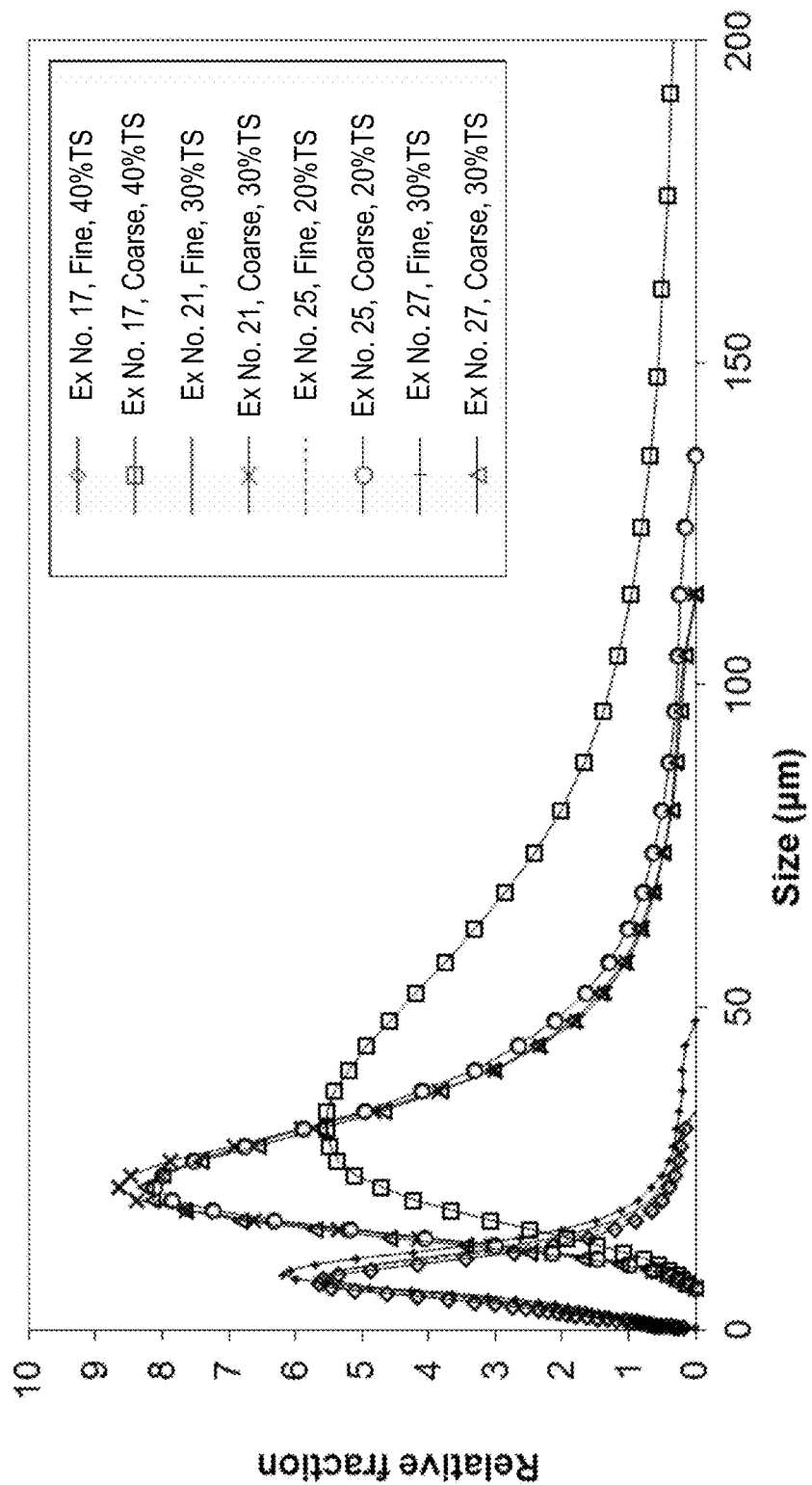
FIG. 7 is a graphical plot of the evolution of spray-dried particle size as function of solid loading showing that a broad particle size distribution is obtained at 40% solid loading according to an exemplary embodiment of the disclosure.
Figure 8:
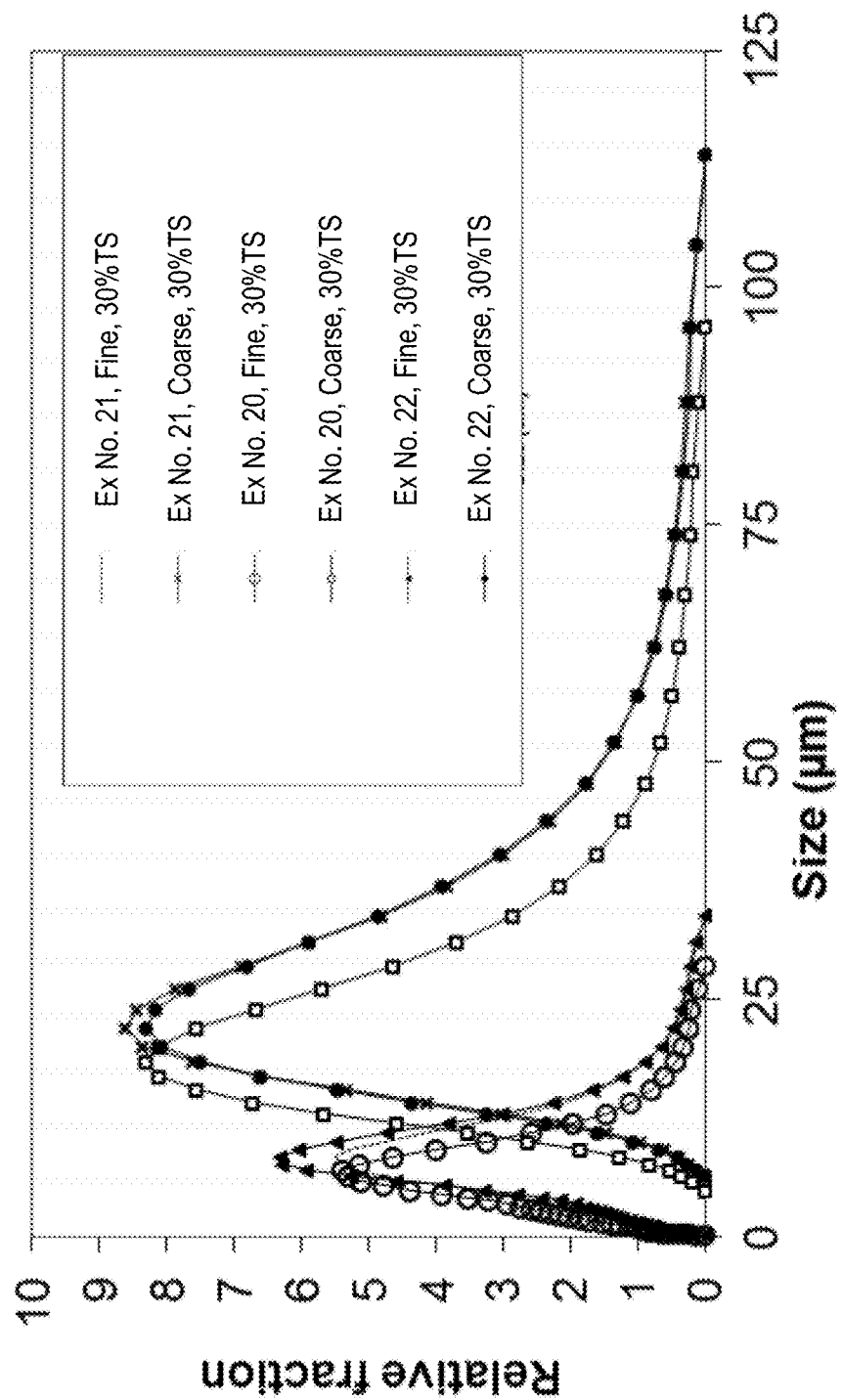
FIG. 8 is a graphical plot of the evolution of spray-dried particle size at fixed solid loading (30% TS of alumina A1000/3% silica from Ludox®) as function of spray-dryer outlet temperatures of 90° C. and 120° C. according to an exemplary embodiment of the disclosure.

The impact of the spray-drying parameters on green particle size distribution is illustrated graphically in FIG. 7. FIG. 7 is a graphical plot of green particle size distribution obtained by spray-drying different solid loading (TS) of fine alumina/3% silica from Ludox® showing that a broad particle size distribution is obtained at 40% solid loading according to an exemplary embodiment of the disclosure. FIG. 8 is a graphical plot of the green particle size distribution obtained by spray-drying fixed solid loading (30% TS of fine alumina/3% silica from Ludox®) with different spray-dryer outlet temperature, here 90° C. or 120° C., according to an exemplary embodiment of the disclosure. The higher outlet temperature of 120° C. at 2 atm pressure produces the narrowest green particle size distribution with smallest average green particle size.

Many Examples of green particle compositions were made by spray-drying and are presented in Table 4. Exemplary embodiments of combinations of spray-dried batch constituents include fine alpha alumina or boehmite with 1.5 to 15% silica, alumina with sinter additives such as oxides of B, Mg, Y, Fe, etc., alumina/silica with different sinter additives B-, Mg-, La-, Y-, Fe-oxide, etc., titania with various levels of silica, and feldspar-based compositions. Aluminum titanate-feldspar composite compositions (full AT batch of inorganics), a small deficiency in alumina or silica or (alumina+silica) from full AT batch, and some spray-dried full batch compositions containing sintering aids such as lanthanum oxide, according to exemplary embodiments, were also made.

TABLE 4

| Raw materials (wt %) | Example Nos. | | | | | | |
|---|---|---|---|---|---|---|---|
| | 29 | 30 | 31 | 32 | 33 | 34 | 35 |
| 40% silica solution in water | 3.10 | | 2.17 | 0.00 | 0.00 | 0.00 | 0.00 |
| fine alumina | 29.75 | 15.06 | 28.08 | 14.70 | 14.65 | 15.38 | 45.31 |
| hydrated alumina | 0.00 | 0.00 | 0.00 | 0.00 | 0.00 | 1.22 | 3.60 |
| fine titania | 0.52 | 10.49 | 0.00 | 10.24 | 10.22 | 9.89 | 29.13 |
| fine silica | 0.00 | 3.57 | 0.00 | 3.48 | 3.47 | 3.37 | 9.92 |
| micro-crystalline silica | 0.00 | 0.00 | 0.00 | 0.00 | 0.00 | 0.00 | 0.00 |
| calcium carbonate | 0.00 | 0.48 | 0.00 | 0.47 | 0.48 | 0.45 | 1.34 |
| magnesium-hydroxide | 0.00 | 0.00 | 0.00 | 0.00 | 0.00 | 0.00 | 0.00 |
| strontium carbonate | 0.00 | 0.00 | 0.00 | 2.74 | 2.72 | 2.64 | 7.78 |
| strontium acetate | 0.00 | 0.00 | 0.00 | 0.00 | 0.00 | 0.00 | 0.00 |
| Sr-carbonate + Ca-carbonate = 5.5:1 | 0.00 | 0.00 | 0.00 | 0.00 | 0.00 | 0.00 | 0.00 |
| lanthanum oxide | 0.00 | 0.00 | 0.00 | 0.00 | 0.00 | 0.00 | 0.00 |
| lanthanum acetate | 0.00 | 0.00 | 0.00 | 0.00 | 0.00 | 0.00 | 0.00 |
| additive | 0.00 | 0.35 | 0.29 | 0.00 | 0.34 | 0.33 | 0.97 |
| antifoam | 0.00 | 0.00 | 0.00 | 0.00 | 0.00 | 0.00 | 0.00 |
| $B_2O_3$ | 0.62 | 0.00 | 0.00 | 0.00 | 0.00 | 0.66 | 1.95 |
| water | 66.01 | 70.05 | 69.46 | 68.37 | 68.12 | 66.05 | 0.00 |

| Raw materials (wt %) | Example Nos. | | | | | | | |
|---|---|---|---|---|---|---|---|---|
| | 36 | 37 | 38 | 39 | 40 | 41 | 42 | 43 |
| 40% silica solution in water | 0.00 | 12.20 | 12.13 | 12.10 | 0.00 | 0.00 | 0.00 | 0.00 |
| fine alumina | 13.76 | 22.30 | 22.18 | 22.12 | 13.67 | 13.62 | 13.75 | 13.62 |
| hydrated alumina | 1.26 | 0.00 | 0.00 | 0.00 | 1.25 | 1.24 | 1.25 | 1.24 |
| fine titania | 10.16 | 0.00 | 0.00 | 0.00 | 10.09 | 10.06 | 10.15 | 10.05 |
| fine silica | 0.00 | 0.00 | 0.00 | 0.00 | 0.00 | 0.00 | 0.00 | 0.00 |
| micro-crystalline silica | 3.45 | 0.00 | 0.00 | 0.00 | 3.44 | 3.43 | 3.45 | 3.42 |
| calcium carbonate | 0.47 | 0.00 | 0.00 | 0.00 | 0.46 | 0.46 | 0.47 | 0.46 |
| magnesium-hydroxide | 0.00 | 0.00 | 0.00 | 0.27 | 0.00 | 0.34 | 0.00 | 0.00 |
| strontium carbonate | 2.71 | 0.00 | 0.00 | 0.00 | 2.70 | 2.69 | 2.71 | 0.00 |
| strontium acetate | 0.00 | 0.00 | 0.00 | 0.00 | 0.00 | 0.00 | 0.00 | 3.74 |
| Sr-carbonate + Ca-carbonate = 5.5:1 | 0.00 | 0.00 | 0.00 | 0.00 | 0.00 | 0.00 | 0.00 | 0.00 |
| lanthanum oxide | 0.00 | 0.00 | 0.00 | 0.00 | 0.00 | 0.00 | 0.17 | 0.00 |
| lanthanum acetate | 0.00 | 0.00 | 0.00 | 0.00 | 0.00 | 0.00 | 0.00 | 0.00 |
| additive | 0.34 | 0.27 | 0.27 | 0.27 | 0.34 | 0.34 | 0.34 | 0.34 |
| antifoam | 0.00 | 0.00 | 0.00 | 0.00 | 0.00 | 0.00 | 0.00 | 0.00 |
| $B_2O_3$ | 0.00 | 0.00 | 0.54 | 0.54 | 0.67 | 0.67 | 0.00 | 0.00 |
| water | 67.84 | 65.23 | 64.88 | 64.70 | 67.39 | 67.16 | 67.80 | 67.13 |

| Raw materials (wt %) | Example Nos. | | | | | | | |
|---|---|---|---|---|---|---|---|---|
| | 44 | 45 | 46 | 47 | 48 | 49 | 50 | 51 |
| 40% silica solution in water | 8.79 | 8.90 | 4.35 | 7.23 | 7.22 | 9.90 | 10.73 | 9.87 |
| fine alumina | 13.99 | 16.28 | 27.25 | 26.01 | 25.98 | 17.83 | 19.33 | 18.04 |
| hydrated alumina | 1.28 | 1.30 | 0.00 | 0.00 | 0.00 | 1.44 | 1.57 | 1.44 |
| fine titania | 10.32 | 10.47 | 0.00 | 0.00 | 0.00 | 11.63 | 12.61 | 11.60 |
| fine silica | 0.00 | 0.00 | 0.00 | 0.00 | 0.00 | 0.00 | 0.00 | 0.00 |

TABLE 4-continued

| Raw materials (wt %) | | | | | | | | |
|---|---|---|---|---|---|---|---|---|
| micro-crystalline silica | 0.00 | 0.00 | 0.00 | 0.00 | 0.00 | 0.00 | 0.00 | 0.00 |
| calcium carbonate | 0.47 | 0.00 | 0.00 | 0.00 | 0.00 | 0.00 | 0.00 | 0.00 |
| magnesium-hydroxide | 0.00 | 0.00 | 0.00 | 0.00 | 0.00 | 0.00 | 0.00 | 0.00 |
| strontium carbonate | 0.00 | 0.00 | 0.00 | 0.00 | 0.00 | 0.00 | 0.00 | 0.00 |
| strontium acetate | 0.00 | 0.00 | 0.00 | 0.00 | 0.00 | 0.00 | 0.00 | 0.00 |
| Sr-carbonate + Ca-carbonate = 5.5:1 | 0.00 | 3.28 | 0.00 | 0.00 | 0.00 | 3.64 | 3.95 | 3.63 |
| lanthanum oxide | 0.00 | 0.00 | 0.00 | 0.00 | 0.00 | 0.00 | 0.00 | 0.00 |
| lanthanum acetate | 0.00 | 0.00 | 0.00 | 0.00 | 0.12 | 0.00 | 0.00 | 0.00 |
| additive | 0.34 | 0.35 | 0.29 | 0.29 | 0.29 | 0.39 | 0.42 | 0.39 |
| antifoam | 0.00 | 0.00 | 0.00 | 0.00 | 0.00 | 0.78 | 0.84 | 0.78 |
| $B_2O_3$ | 0.00 | 0.00 | 0.00 | 0.00 | 0.00 | 0.00 | 0.00 | 0.00 |
| water | 64.81 | 59.42 | 68.12 | 66.47 | 66.40 | 54.38 | 50.54 | 54.25 |

| Raw materials | Example Nos. | | | | | | | |
|---|---|---|---|---|---|---|---|---|
| (wt %) | 52 | 53 | 54 | 55 | 56 | 57 | 58 | 59 |
| 40% silica solution in water | 4.79 | 12.86 | 12.82 | 11.51 | 14.07 | 13.62 | 4.82 | 8.35 |
| fine alumina | 29.99 | 23.51 | 23.43 | 41.44 | 22.40 | 24.89 | 30.19 | 0.00 |
| hydrated alumina | 0.13 | 1.88 | 3.53 | 0.00 | 2.05 | 1.98 | 0.00 | 2.96 |
| fine titania | 0.00 | 15.12 | 15.07 | 0.00 | 16.54 | 16.01 | 0.00 | 23.86 |
| fine silica | 0.00 | 0.00 | 0.00 | 0.00 | 0.00 | 0.00 | 0.00 | 0.00 |
| micro-crystalline silica | 0.00 | 0.00 | 0.00 | 0.00 | 0.00 | 0.00 | 0.00 | 0.00 |
| calcium carbonate | 0.00 | 0.00 | 0.00 | 0.00 | 0.00 | 0.00 | 0.00 | 0.00 |
| magnesium-hydroxide | 0.00 | 0.00 | 0.00 | 0.00 | 0.00 | 0.00 | 0.00 | 0.00 |
| strontium carbonate | 0.00 | 0.00 | 0.00 | 0.00 | 0.00 | 0.00 | 0.00 | 0.00 |
| strontium acetate | 0.00 | 0.00 | 0.00 | 0.00 | 0.00 | 0.00 | 0.00 | 0.00 |
| Sr-carbonate + Ca-carbonate = 5.5:1 | 0.33 | 4.74 | 8.92 | 0.00 | 5.18 | 5.02 | 0.00 | 7.48 |
| lanthanum oxide | 0.00 | 0.00 | 0.00 | 0.09 | 0.00 | 0.00 | 0.00 | 0.00 |
| lanthanum acetate | 0.00 | 0.00 | 0.00 | 0.00 | 0.00 | 0.00 | 0.13 | 0.00 |
| additive | 0.32 | 0.50 | 0.00 | 0.00 | 0.00 | 0.00 | 0.00 | 0.00 |
| antifoam | 0.64 | 1.01 | 1.01 | 0.92 | 1.11 | 1.07 | 0.64 | 1.59 |
| $B_2O_3$ | 0.00 | 0.00 | 0.00 | 0.00 | 0.00 | 0.00 | 0.00 | 0.00 |
| water | 63.81 | 40.38 | 35.22 | 46.04 | 38.65 | 37.42 | 64.23 | 55.77 |

Figure 9:
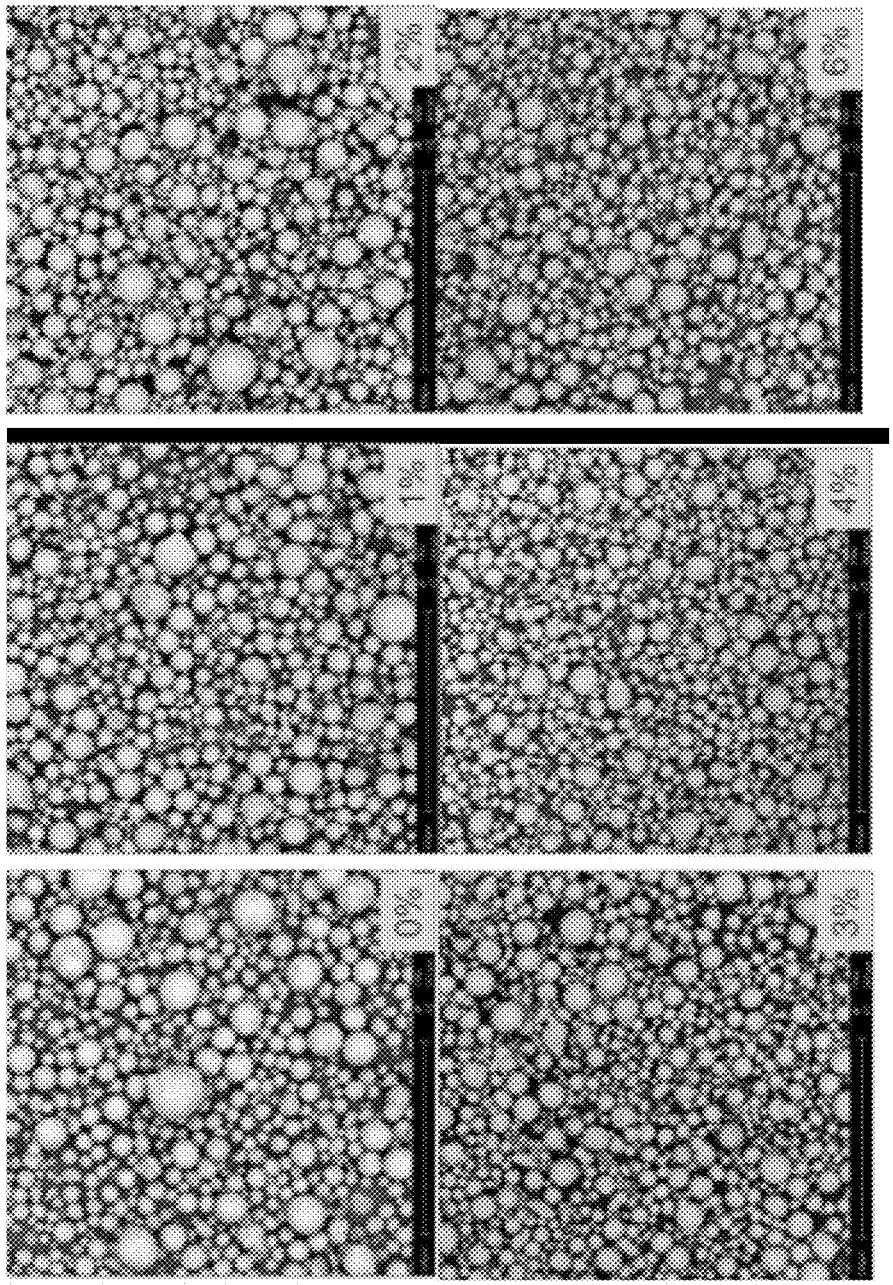
FIG. 9 shows SEM micrographs of green particles obtained by spray-drying alumina/3% silica with Triton and various levels of Antifoam between 0 and 6% according to an exemplary embodiment of the disclosure.
Figure 10:
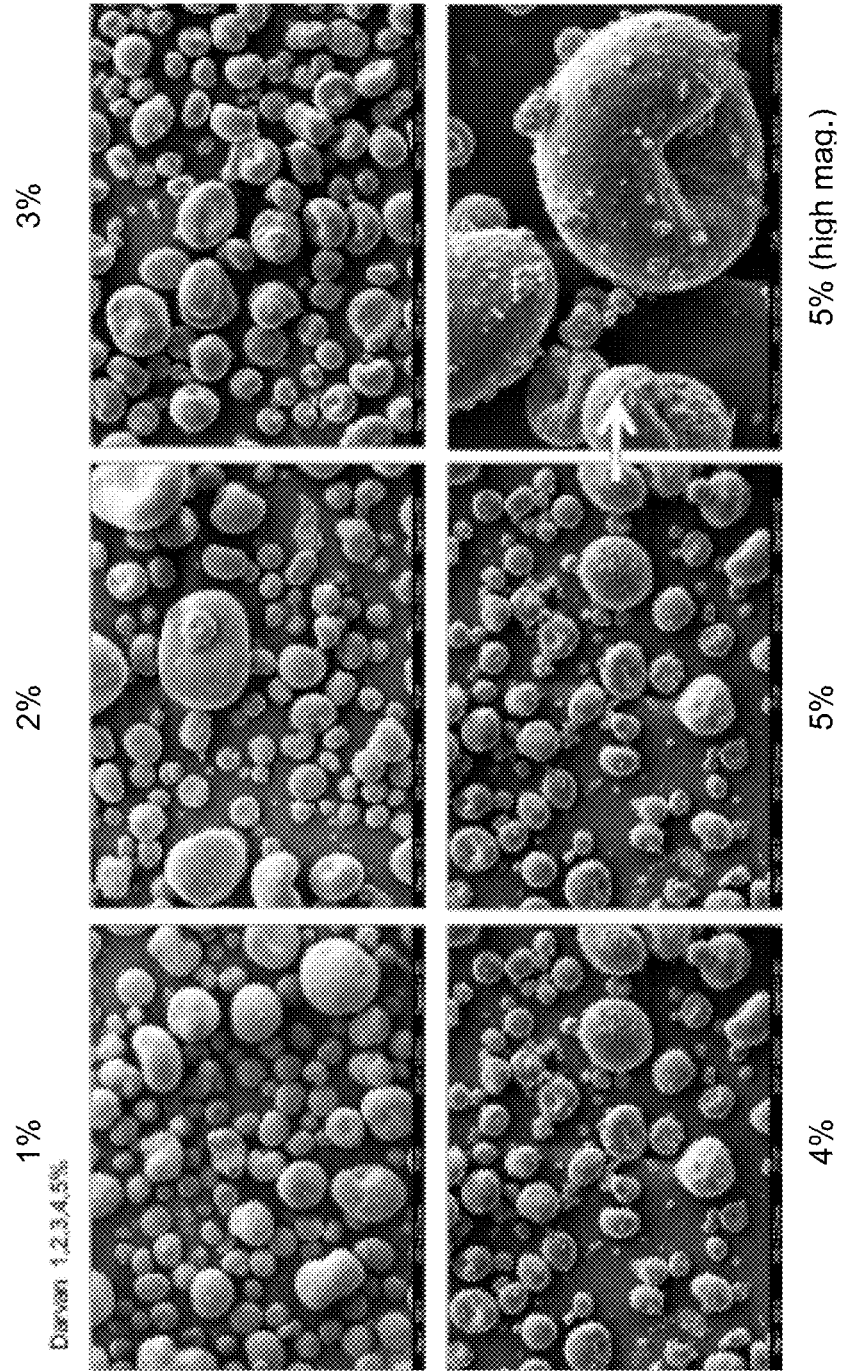
FIG. 10 shows SEM micrographs of green particles obtained by spray-drying alumina/3% silica with various levels of Darvan® between 0 and 5%, illustrating that addition of Darvan® yields particles with smooth surface, but donut shape according to an exemplary embodiment of the disclosure.
Figure 11:
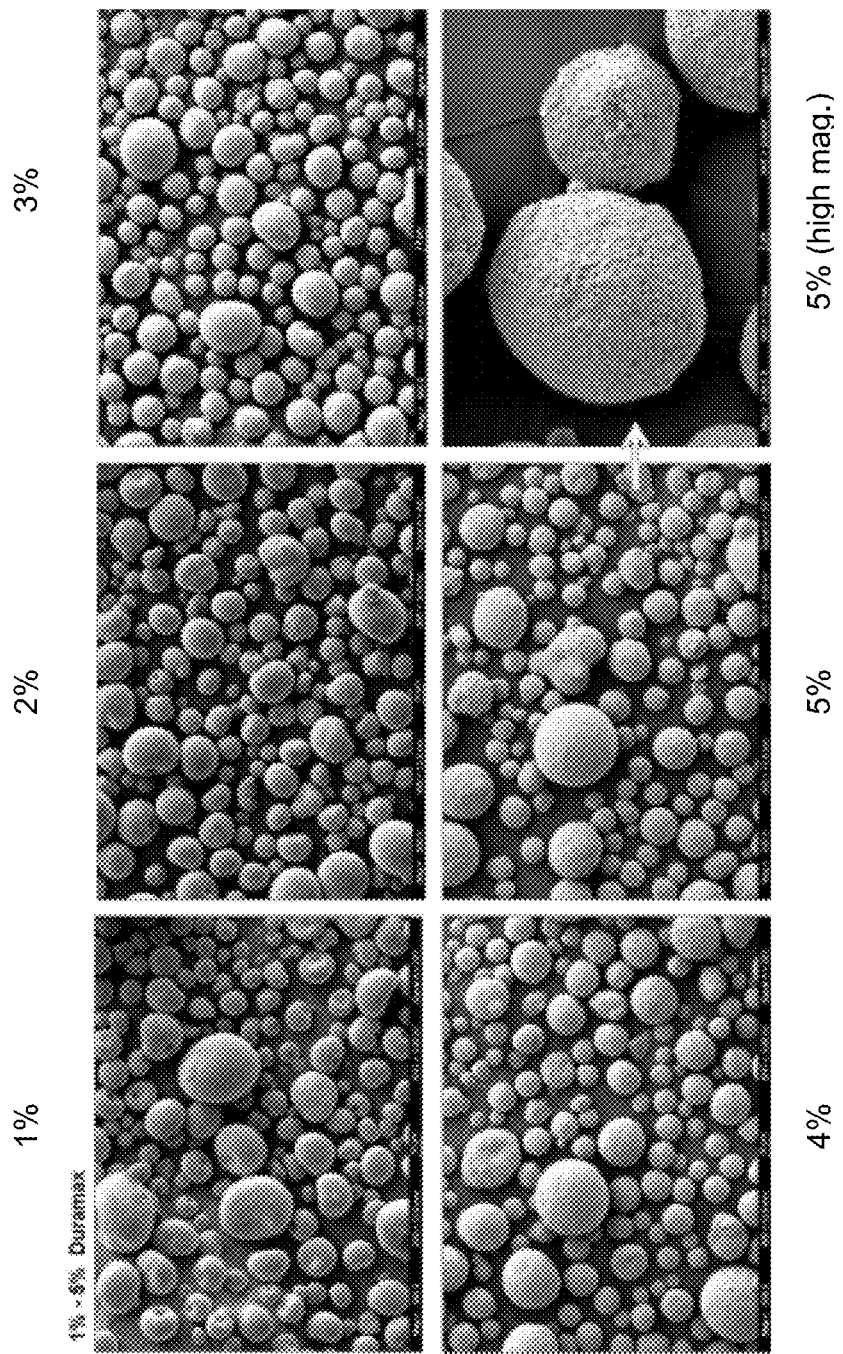
FIG. 11 shows SEM micrographs of green particles obtained by spray-drying alumina/3% silica with various levels of Duramax® between 0 and 5%, illustrating that Duramax® yields non-agglomerated particles, the size distribution of which is independent of the Duramax® level, the particle shape becomes more spherical with increasing Duramax® fraction, and the particle surfaces of which become porous at high Duramax® levels according to an exemplary embodiment of the disclosure.

Different binders, dispersants, surfactants and other organic additives may be added to the inorganic spray-drying batch. Table 5 shows compositions having additions of Triton™ X100 (SIGMA-ALDRICH®), Duramax™ D-3005 (THE DOW CHEMICAL COMPANY®), an ammonium salt of a polyelectrolyte, or Darvan-C® (R.T. VANDERBILT COMPANY, INC.), an ammonium polymethylacrylate, at levels of 1-5% to the 97% alumina/3% silica inorganic batch mixtures. In some cases, antifoaming agent (Antifoam A) was added together with Triton to avoid foaming. Spray dryer settings of 1.5 atm pressure, 65% flow, inlet temperature 300° C., outlet temperature 120° C. and a 1.5 mm tip were used. Spray-drying of compositions with the different levels of Darvan or Duramax and with small additions of Triton produced a similar spray-dried median particle size under the same spraying conditions. Smaller particle size was produced for higher Triton/Antifoam-A levels, due to a promoted agglomeration and formation of small particles in presence of the antifoaming agent as shown in FIG. 9. While spray-dried particle sizes were very similar for different Duramax and Darvan levels, the shape of the particles differed significantly. Spray-dried particles obtained by spraying alumina/3% silica with various levels of Darvan 0%, 1%, 2%, 3%, 4%, and 5% (FIG. 10, upper left to lower center) resulted in particles with smooth surfaces, but irregular torus shape. For increasing Darvan fraction, additional fine particles, more irregular shape and agglomeration of fine particles to the powder were observed so that 1% Darvan addition seemed to be a preferred level. Spray-dried particles obtained by spraying alumina/3% silica with various levels of Duramax of 0%, 1%, 2%, 3%, 4%, and 5% resulted in particles with spherical shape with smooth surfaces at low Duramax level and increasingly rough, porous surfaces at higher Duramax level (FIG. 11, upper left to lower center). No agglomeration or other disadvantage was observed for high Duramax level, so that the 5% addition is considered as a preferred configuration.

Duramax levels of 3-5% to the spray-dried alumina-based batch provided preferred particle size, shape and surface texture. The surfactant Triton may produce fine porosity in the spray-dried particles; however, no fine porosity was observed. Darvan is a dispersant that may be used in many types of ceramic slurries. No advantage in phase distribution was observed in the spray-dried particles by the addition of Darvan. At high concentration, Duramax acts as a dispersant and binder; it may introduce porosity in the spray-dried particles. These examples of binders, dispersants and surfactants are not intended to be a complete list. One of ordinary skill in the art would know that other organic binders, dispersants, and surfactants, such as carboxymethylcellulose, acrylic binders, polyethylene glycol (PEG), or polyvinyl alcohol (PVA) may be used for the same purpose.

TABLE 5

| | | |
|---|---|---|
| Alumina A1000 | Silica Ludox | Antifoam: 0, 1, 2, 3, 4, 6% |
| Alumina A1000 | Silica Ludox | Triton 1% + Antifoam: 0, 1, 2, 3% Triton 2% + no Antifoam |
| Alumina A1000 | Silica Ludox | Darvan: 0, 1, 2, 3, 4, 5% |
| Alumina A1000 | Silica Ludox | Duramax: 0, 1, 2, 3, 4, 5% |

Figure 12A:
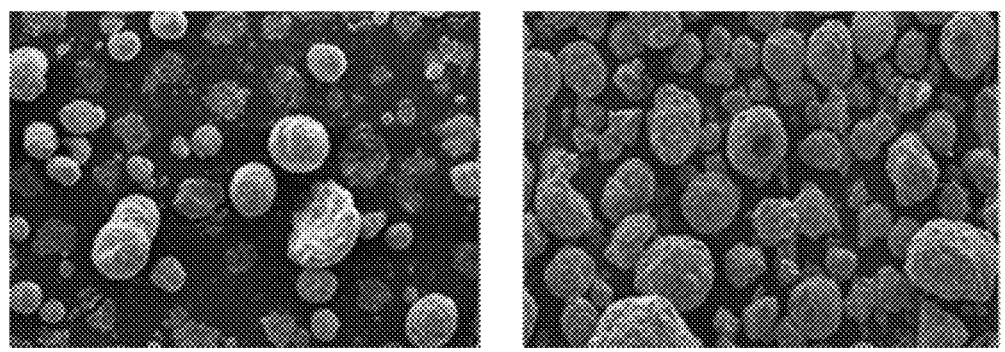
FIG. 12A shows SEM micrographs of particles as spray-dried (green) (left) and after calcining (pre-reacted) at 1600° C. (right) according to an exemplary embodiment of the disclosure.
Figure 12B:
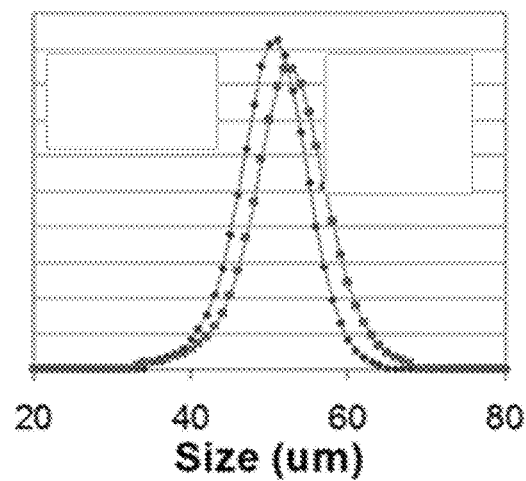
FIG. 12B is a graphical plot of green and pre-reacted particle size distributions as illustrated by the samples of FIG. 12A.

Green spray-dried particles in the batch did not survive mixing and extrusion shear forces independent of composition and type of organic addition. This was clearly demonstrated by examining microstructure and porosity of extruded and fired parts. Porosity and median pore size of materials made with green spray-dried particles or charred spray-dried powders did not reach the porosity and pore size of standard materials that were made with commercial coarse alumina, see Table 6.

hours, so that the particles were not reacted, partially reacted, or fully reacted and correspondingly not densified, partially densified, or fully densified. Particle size and shape were largely preserved during pre-firing. FIG. 12A shows an exemplary spray-dried powder of alumina/3% silica composition as spray-dried (left) and after firing (right). FIG. 12B shows the green and fired particle size distributions of

TABLE 6

| Example No. | Organics added for making green spray-dried particles | pretreatment of green spray-dried particles | Properties of extruded, fired ware | | |
|---|---|---|---|---|---|
| | | | Porosity of fired ware in % | Median pore diameter in fired ware in μm | CTE in $10^{-7}$ $K^{-1}$ from RT to 1000 K |
| 60 | no | no | 47.74 | 9.40 | |
| 61 | no | Pre-fired to 1300° C. | 54.44 | 22.44 | 18.3 |
| 62 | no | Charred | 43.64 | 8.66 | |
| 63 | 1% Darvan | no | 43.07 | 9.50 | |
| 64 | 1% Darvan | Pre-fired to 1300° C. | 46.42 | 16.72 | 21 |
| 65 | 1% Darvan | Charred | 42.64 | 9.41 | |
| 66 | 5% Darvan | no | 41.77 | 12.65 | |
| 67 | 5% Darvan | Pre-fired to 1300° C. | 53.05 | 21.38 | |
| 68 | 5% Darvan | Charred | 41.03 | 12.25 | |
| 69 | 1% Duramax | no | 42.95 | 8.41 | |
| 70 | 1% Duramax | Pre-fired to 1300° C. | 48.43 | 19.93 | 15 |
| 71 | 1% Duramax | Charred | 44.66 | 8.46 | |
| 72 | 5% Duramax | no | 38.04 | 4.38 | 14 |
| 73 | 5% Duramax | Pre-fired to 1300° C. | 58.47 | 22.72 | 13 |
| 74 | 5% Duramax | Charred | 33.81 | 6.97 | 13 |
| 75 | 1% Triton + Antifoam | no | 46.01 | 10.53 | |
| 76 | 1% Triton + Antifoam | Pre-fired to 1300° C. | 40.39 | 7.76 | |
| 77 | 1% Triton + Antifoam | Charred | 43.78 | 10.52 | |

Aluminum titanate type batches with spray-dried alumina/3% silica/organic binder batch materials (97% alumina (A1000), 3% silica (Ludox) as inorganics and superaddition of surfactant) together with porosity and pore size for extruded, fired material (1410° C., 15 h) are shown in Table 6. Green, charred, or pre-fired spray-dried powders were used; spray-dried powders were made without any binder, with Triton and Antifoam, Darvan, or Duramax. The spray-dried particles were added in a batch with batch composition silica—8.78%, strontium carbonate—8.1%, calcium carbonate—1.4%, titanium dioxide—30.32%, spray-dried particles (green, charred or pre-fired)—51.2%, lanthanum oxide—0.2%, superaddition of potato starch (PS)—15%, superaddition of Methocel—4.5%. The Examples were subjected to twin-screw type mixing and 1 inch (2.54 cm) ram extrusion. Firing condition was 1410° C./15 hrs.

Figure 17A:
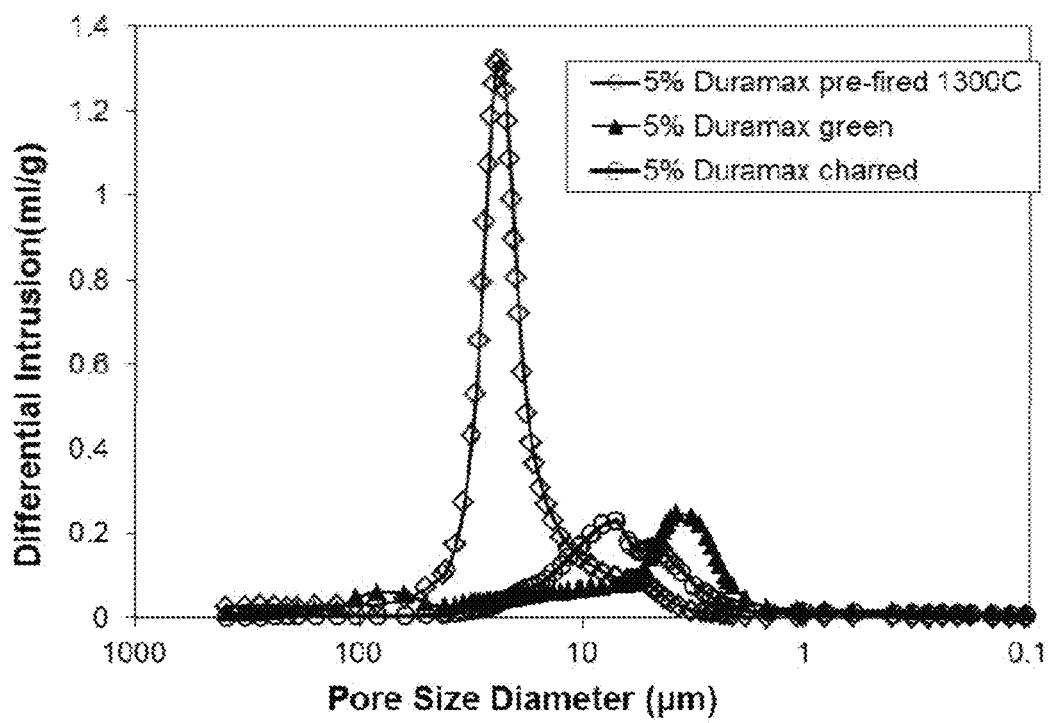
FIG. 17A shows a graphical comparison of pore size distribution in Examples of porous ceramic articles having spray-dried alumina/3% silica with 5% Duramax using green, charred, or pre-fired to 1300° C. spray-dried particles.
Figure 17B:
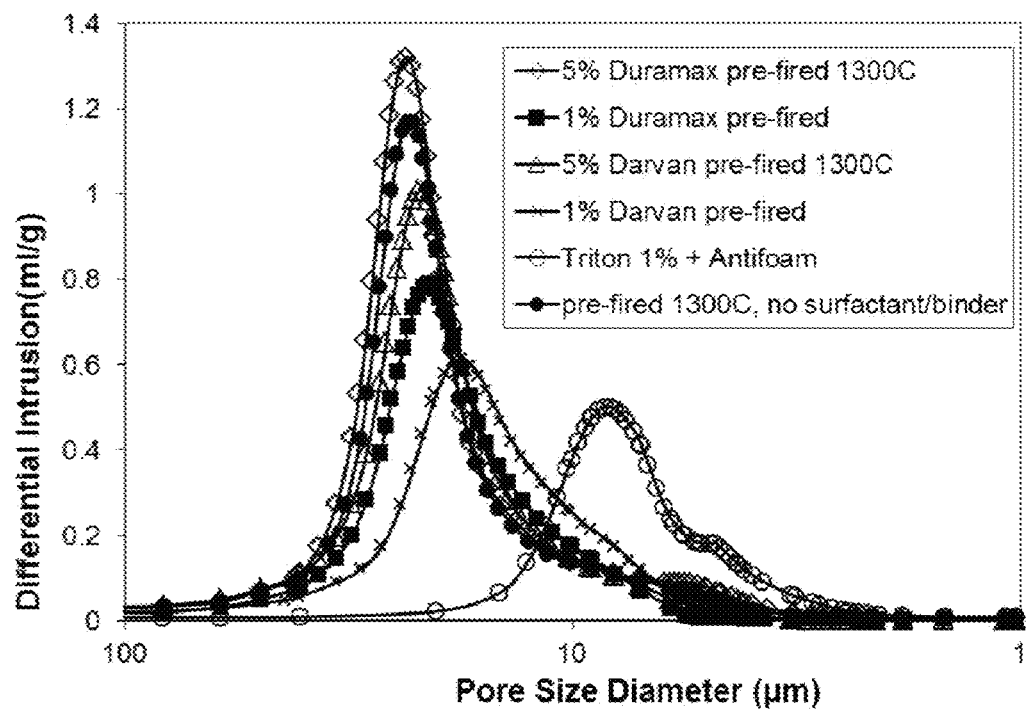
FIG. 17B shows a graphical comparison of pore size distribution in Examples of porous ceramic articles having pre-fired to 1300° C. spray-dried alumina/3% silica with organic additives.

Example spray-dried powders were pre-fired to improve their mechanical strength so that they would survive extrusion. Pre-firing conditions were varied and covered temperatures from 1000° C. to 1600° C. and different durations from fractions of an hour (in an industrial rotary calciner) to many the exemplary spray-dried powder of FIG. 12A. FIGS. 12A and 12B illustrate that the green particle size and size distribution are well preserved through firing. Tables 7, 8, and 9 show calcined particle average size and phase composition after firing for exemplary green spray-dried powders. The exemplary powders in Table 7 and 8 were fired in CMR box furnaces, except where indicated, in air at the indicated temperature. Table 7 presents characteristics of pre-reacted alumina/silica particles. Table 8 presents characteristics of pre-reacted full aluminum titanate-feldspar batch particles. The exemplary powders in Table 9 were fired in an industrial size rotary calciner at 1440° C. Table 9 presents characteristics of pre-reacted full aluminum titanate-feldspar batch particles. FIG. 17A shows a graphical comparison of pore size distribution in Examples of porous ceramic articles having spray-dried alumina/3% silica with 5% Duramax using green, charred, or pre-fired to 1300° C. spray-dried particles. FIG. 17B shows a graphical comparison of pore size distribution in Examples of porous ceramic articles having pre-fired to 1300° C. spray-dried alumina/3% silica with addition of surfactants.

TABLE 7

| Green alumina/silica particles | | | Pre-reacting Temp. in °C. | Calcined particle diameter from Particle Track analysis D in μm | Calcined particle diameter from SEM analysis D in μm | Pre-reacted particle crystalline composition vol % plus glass phase | | |
|---|---|---|---|---|---|---|---|---|
| Green particle Example No. | Silica in wt % | Others in wt % | | | | Al₂O₃ | cristobalite | mullite |
| 78 | 3 | 0.03% Ga₂O₃ | 1300 | | | | | |
| 79 | 3 | | 1600 | | | | | |
| 80 | 3 | | 1610 | 19.5 | 19.3 | | | |
| 81 | 3 | | 1610 | 15.4 | 15.8 | | | |
| 82 | 3 | | 1610 | 18.5 | 18.8 | 87.8 | | 12.2 |
| 83 | 6 | | 1410 | 20.4 | | 94 | 4 | |
| 84 | 6 | | 1610 | 16.4 | | 75.2 | | 24.8 |
| 85 | 10 | | 1410 | 22.4 | 20.0 | | | |
| 86 | 10 | | 1610 | 20.7 | 19.5 | 55 | | 45 |
| 87 | 18 | | 1410 | 16.1 | 13.8 | | | |
| 88 | 18 | | 1610 | 15.7 | 15.1 | 70.2 | 11.7 | 18.1 |
| 89 | 18 | | 1610 | 25.4 | 25.2 | 30.4 | | 69.6 |
| 90 | 10 | 0.4% La₂O₃ | 1410 | 22.1 | 18.9 | | | |
| 91 | 10 | 0.4% La₂O₃ | 1390 | 23.6 | 21.8 | | | |
| 92 | 10 | 0.4% La₂O₃; 2% Antifoam | 1410 | 19.2 | 18.7 | | | |
| 93 | 6 | | 1440 (rotary) | 16.9 | 16.7 | | | |
| 94 | 6 | | 1500 (rotary) | 16.1 | 15.2 | | | |

TABLE 8

| Green "full batch" AT-SAS particles | | Pre-reacting Temp. in °C. | Calcined particle diameter from Particle Track analysis D in μm | Calcined particle diameter from SEM analysis D in μm |
|---|---|---|---|---|
| Green particle Example No. | Deviations on full batch composition | | | |
| 95 | −6% alumina | 1200 | 30.7 | |
| 96 | −6% alumina | 1200 | | |
| 97 | −6% alumina | 1300 | | |
| 98 | −6% alumina | 1410 | 42 | 25.8 |
| 99 | −6% alumina | 1410 | 42.4 | |
| 100 | −6% alumina | 1410 | | 47.2 |
| 101 | −6% alumina | 1410 | 28.3 | |
| 102 | −6% alumina | 1200 | 24.8 | 20.0 |
| 103 | −6% alumina | 1300 | 27.0 | 21.4 |
| 104 | −6% alumina | 1200 | 11.1 | 41.0 |
| 105 | −6% alumina | 1200 | 25.3 | 27.1 |
| 106 | −6% alumina | 1300 | | 28.4 |
| 107 | −6% alumina | 1410 | | |
| 108 | −6% alumina | 1200 | 25.3 | 23.0 |

| Green "full batch" AT-SAS particles | | Pre-reacted particle composition vol % | | | | | | |
|---|---|---|---|---|---|---|---|---|
| Green particle Example No. | Deviations on full batch composition | Aluminum titanate | Al₂O₃ | rutile | feldspar | mullite | SrTi₃Al₈O₁₉ | quartz |
| 95 | −6% alumina | | | | | | | |
| 96 | −6% alumina | | | | | | | |
| 97 | −6% alumina | 44.3 | 6.2 | 4.8 | 15.8 | | 28.9 | |
| 98 | −6% alumina | 24.1 | 15.2 | 12.4 | 17.6 | | 30.7 | |
| 99 | −6% alumina | 63.2 | 1.1 | 2 | 30.3 | | 3.5 | |
| 100 | −6% alumina | 30.7 | 6.7 | 15.1 | 26.8 | 16.7 | 4.5 | |
| 101 | −6% alumina | | | | | | | |
| 102 | −6% alumina | | | | | | | |
| 103 | −6% alumina | | | | | | | |
| 104 | −6% alumina | | | | | | | |
| 105 | −6% alumina | | | | | | | |
| 106 | −6% alumina | 1.9 | 29.6 | 27.5 | 13.5 | 6.9 | 19.1 | 1.5 |
| 107 | −6% alumina | 11.4 | 22.8 | 20 | 15.9 | | 29.9 | |
| 108 | −6% alumina | 9.4 | 30.1 | 27.4 | 27.6 | | 5.6 | |

TABLE 9

| Example No. | spray-dried rotary calcined particles | green spray-dried particle average diameter (μm) | rotary calcining temperature (° C.) | calcined particle average diameter (μm) | AT vol % | $Al_2O_3$ vol % | $TiO_2$ vol % | SAS vol % |
|---|---|---|---|---|---|---|---|---|
| 109 | Full AT batch | 43 | 1440 | 45 | 70.6 | 7.5 | 1.4 | 20.5 |
| 110 | Full AT batch | 51 | 1440 (milled) | 49 | 70.6 | 7.6 | 1.3 | 20.5 |

SEM images in FIGS. 13A-C, 14A-C, and 15A-B illustrate characteristic spray-dried particle shape and phase distribution for various compositions. FIGS. 13A, 13B, and 13C are a series of SEM micrographs of spray-dried particles including alumina (boehmite) with 17% silica (Ludox®), after firing to 1410° C. (FIG. 13A), 1610° C. with short hold time (FIG. 13B) and 1610° C. with long hold time (FIG. 13C) according to an exemplary embodiment of the disclosure. Pores 1201, 1203 are evident in the particles as are a first phase 1205 and a second phase 1207. Pore 1203 is a large pore compared to pore 1201. The particles increase in densification from FIG. 13A to FIG. 13C.

FIGS. 14A and 14B are SEM micrographs of pre-fired, spray-dried particles with full inorganic AT (aluminum titanate+feldspar) batch composition after pre-firing at 1200° C. according to an exemplary embodiment of the disclosure. FIG. 14A is a regular surface view of the particles and FIG. 14B is a cross section of the particles. FIGS. 14C and 14D are regular surface and cross sectional SEM micrographs of pre-fired, spray-dried particles having the same composition as in FIGS. 14A and 14B after pre-firing at 1300° C. according to an exemplary embodiment of the disclosure.

FIGS. 15A and 15B are SEM micrographs of Example No. 34 spray-dried powder with 0.7% boron oxide addition after rotary calcining at 1100° C., regular view (FIG. 15A) and polished cross section (FIG. 15B) according to an exemplary embodiment of the disclosure.

The phases present in the fired ceramic parts were identified by X-ray diffraction (XRD). A Philips PW 1830® diffractometer (Co Ka radiation) was used for X-ray diffraction. Spectra were typically acquired from 20 to 100°. Rietveld refinement was used for quantification of the phase contributions.

Standard scanning electron microscopy, SEM, characterization was conducted on green and fired spray-dried particles and their polished cross-sections, on honeycomb wall surfaces and polished honeycomb wall cross sections. For the observation of polished sections, the fired ware was infiltrated with epoxy, sliced and polished. The spatial distribution of porosity and phases in presence at a microscopic level was visualized on polished sample cross sections. High resolution SEM was used to assess details of the microstructure and the phase distribution. Chemical composition of the different phases and elemental distributions were obtained from (qualitative) analysis and elemental mapping by energy dispersive X-ray spectroscopy on the SEM.

Porosity, median pore diameter and pore size distribution were determined by mercury intrusion porosimetry from an Autopore™ IV 9500 porosimeter with software from Micromeritics®. The mercury intrusion porosimetry method uses the capillary law with non-wetting liquid and cylindrical pores as may be expressed with the Washburn equation $D=-(1/P) 4y \cos \Phi$, where D is the pore diameter, P is the applied pressure, y is the surface tension and $\Phi$ is the contact angle. The volume of mercury is directly proportional to the pressure. Data reduction used the differential and log differential to calculate the first derivative of the cumulative specific intrusion volume as a function of calculated log diameter. Mercury porosimetry was used to calculate the permeability. Permeability is the gas flow rate through a material under applied pressure. In the Autopore device, pressure is increased and the mercury fills smaller and smaller pores until a critical pressure is reached where the mercury spans the sample, as may be expressed as k [in millidarcys]$=1/226(Lc)2\sigma/\sigma_o$, where $\sigma$ is the conductivity at length Lc and $\sigma_o$ is the conductance in the pore. The mercury porosity data can further be used to deduce a tortuosity. The tortuosity factor characterizes the efficiency of gas interaction with the surface during its transport through a porous medium. Tortuosity is strongly dependent on the pore interconnectivity. The gas interaction with the material internal surface is greater the larger the tortuosity factor is. J. Hager derived an expression for material permeability based on a capillary bundle model in which pores are homogeneously distributed in random directions. Using the Hagen-Poiseuille correlation for fluid flow in cylindrical geometries, and making substitutions with measurable parameters, and combining with Darcy's law, an expression can be derived for material permeability in terms of total pore volume, material density, pore volume distribution by pore size, and material tortuosity. The total pore volume, material density, and pore volume distribution by pore size are obtainable from mercury porosimetry tests. Katz and Thompson also derived an expression for material permeability based on measurements obtainable from mercury porosimetry and which does not depend on knowledge of material tortuosity. Combining the Hager and Katz-Thompson expressions provides a means for determining tortuosity from data collected by mercury porosimetry.

Thermal expansion was measured for bar-shaped samples with dimension 0.25"×0.25"×2" (0.623×0.623×5.08 cm) during heating from room temperature to 1200° C. at a rate of 4° C./min and subsequent cooling to room temperature. Unless otherwise noted herein, the longitudinal axis of the test bars was oriented in the direction of the honeycomb channels, thus providing the thermal expansion in the axial direction of the honeycomb parts. Unless otherwise noted herein, room temperature as stated herein refers to 25° C. Average thermal expansion coefficients for various temperature ranges are listed in the tables and in the text are CTE20-800 in $K^{-1}$, the average thermal expansion coefficient from room temperature to 800° C., defined as L(800° C.)–L(20° C.)/780° C. as average thermal expansion coefficient in the temperature range from room temperature to 800° C., CTE20-1000 in $K^{-1}$, the average thermal expansion coefficient from room temperature to 1000° C., defined as L(1000° C.)–L(20° C.)/980° C. as average thermal expansion coefficient in the temperature range from room temperature to 1000° C., CTE500-900 in $K^{-1}$, the average thermal expansion coefficient from 500 to 900° C., defined as L(900° C.)–L(500° C.)/400° C. as average thermal expansion coefficient in the temperature range from 500° C. to 800° C.

The strength of the ceramics was tested using a transverse bending technique where test specimens were loaded to failure in using either three or four bending points. The maximum stress prior to failure is often referred to as the modulus of rupture or MOR. MOR, measured using four point flexure with a lower span (L) of two inches (fifty and four fifths millimeter) and an upper span (U) of three quarters of an inch (nineteen millimeters). The specimen geometry for the 4-point flexure tests was two and one half inches (sixty three and one half millimeters) in length, one half inch (twelve and seven tenths millimeters) in width (b) and one quarter inch (six and two fifths millimeters) thick (d). The force-measuring system used was equipped with a read-out of the maximum force (P) and a calibrated load cell. The MOR value was calculated using the ASTM flexure strength equation for a rectangular specimen. All specimens tested had a square cellular (honeycomb) structure with the channels in the direction of the length of the honeycomb. The actual material strength independent of the structure of the body, often referred to as the wall strength, was determined by modifying the traditional MOR equation to account for the cellular structure of the honeycomb test bar, using ASTM standard C1674-08.

Bar-shaped samples with dimension 5"×1"×0.5" (12.7× 2.54×1.27 cm) and the longitudinal axis being oriented in the direction of the honeycomb channels were used to measure the elastic modulus by flexural resonance frequency. Samples were heated to 1200° C. and cooled back to room temperature. For each temperature the elastic modulus was directly derived from the resonance frequency and normalized for sample geometry and weight per ASTM C 1198-01.

Referring back to Table 6, materials made from spray-dried batch powders that were obtained with various levels of different dispersants, surfactants and binders are shown. The AT batch included 8.78% silica, 8.1% strontium carbonate, 1.4% calcium carbonate, 30.32% titanium dioxide, 51.2% of the spray-dried green compositions of Table 6 (alumina/silica), 0.2% lanthanum oxide, 15% superaddition potato starch, 4.5% superaddition methocel. The spray-dried powders were incorporated in the batch as green (as-spray-dried), charred, or pre-reacted powders. Table 6 compares porosities of fired extruded (300/13) materials made from batches with commercial raw materials, green spray-dried particles, charred spray-dried particles and pre-fired spray-dried particles. A batch with AT-type inorganic composition and pore former package was used, in which alumina and a small fraction of silica were replaced by spray-dried batch powder of same composition. Batch additions are listed in Table 6 together with the resulting porosity of the extruded fired material. The batch was subjected to twin-screw type mixing and 1" (2.54 cm) ram extruded. The dried extruded articles were fired at 1410° C./15 hr.

The spray-dried powders were either not pretreated (green), charred in nitrogen to 500° C., or pre-reacted by firing in air for 5 h at 1300° C. A standard AT batch Comparative Example with commercial particulate alumina A10 with 10 µm median particle size extruded and fired under the same conditions produced about 50% porosity and 15 µm pore size.

Mercury intrusion porosimetry showed that green, unfired spray-dried powders (without any surfactant addition) produced slightly lower porosity (48%) with significant smaller median pore size, d50=9 µm than the Comparative Example. Charring the spray-dried particle in nitrogen to 500° C. promoted further loss in porosity with a resulting 43% porosity, 9 µm pore size. In contrast, for the pre-fired spray-dried particles, the porosity was increased to 54.4% with median pore size of 22 µm. The gain compared to use of commercial coarse alumina raw material was a 4-5% increase in porosity and 6-7 µm increase in pore size.

Materials obtained from green or charred spray-dried batch materials with various organic additions (Darvan, Duramax, Triton) showed little change in porosity, indicating that green and charred spray-dried particles do not survive the shear during twin screw-like mixing and extrusion. Use of spray-dried, pre-fired particles containing Darvan or Duramax yielded a significant increase in porosity and pore size. Both, porosity and pore size increased with the amount of Darvan or Duramax in the slurry. For 5% addition, 53% and 58% porosity, 21 µm and 23 µm median pore size were obtained with 5% Darvan and Duramax, respectively. This is a significant gain in porosity (3% and 8%, respectively) and a significant gain in median pore size (5 and 7 µm, respectively). It may be very difficult to obtain such high porosity and large pore size with commercial raw materials at such low pore former level.

Figure 16A:
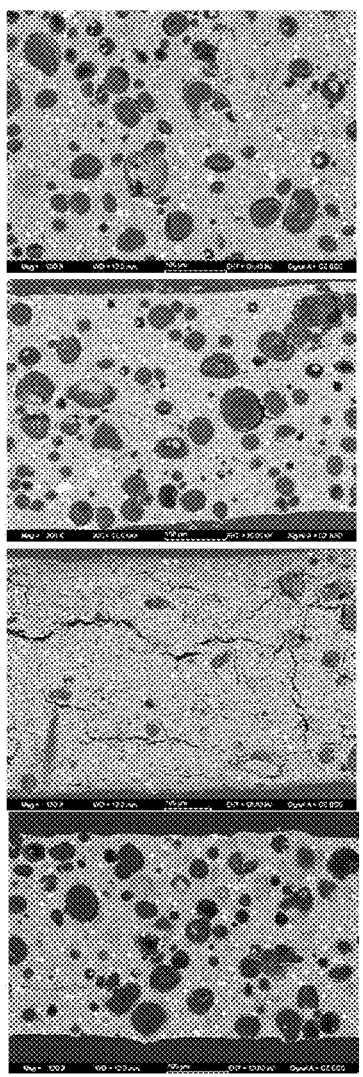
FIGS. 16A, 16B, and 16C show AT-type extruded greenware, in which alumina and a small fraction of silica had been replaced by green, charred, or pre-fired spray-dried powders of alumina/3% silica/organic binder according to exemplary embodiments of the disclosure.
Figure 16B:
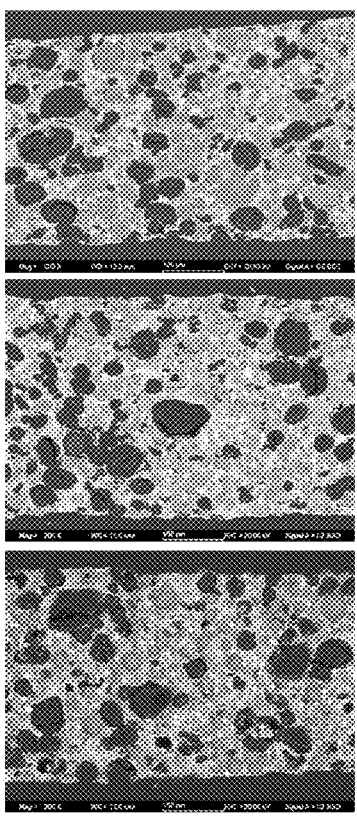
Figure 16C:
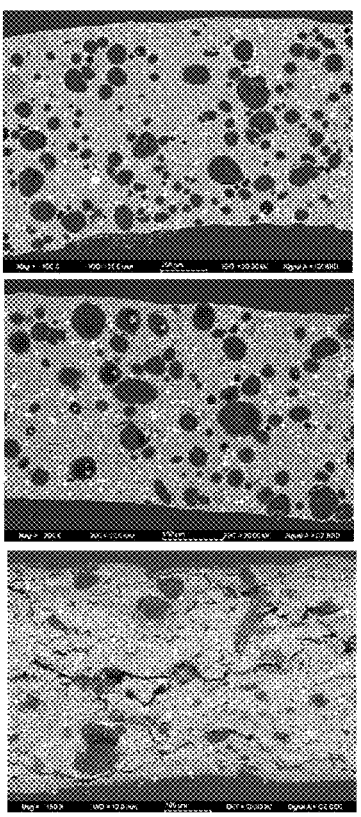

FIGS. 16A, 16B, and 16C SEM images of the extruded green ware revealed that few spray-dried green and charred particles survived the mixing and extrusion, while spray-dried particles pre-fired to higher temperature survived mixing and extrusion. AT-type extruded greenware, in which alumina and a small fraction of silica had been replaced by spray-dried powders of alumina/3% silica/organic binder are shown in FIGS. 16A, 16B, and 16C. The spray-dried particles had been incorporated into the batch green as spray-dried (FIG. 16A), pre-fired at 1300° C. for 5 h in air (FIG. 16B), or charred to 500° C. in nitrogen (FIG. 16C). Spray-dried powders were obtained without any addition (first row), with addition of 5% Darvan (second row), with addition of 5% Duramax (third row) or addition of 1% Triton (last row). The SEM images show polished cross sections of the green ware. The SEM images of FIG. 16B show that the pre-fired spray-dried particles were all fully preserved and regularly distributed in the greenware.

Figure 16D:
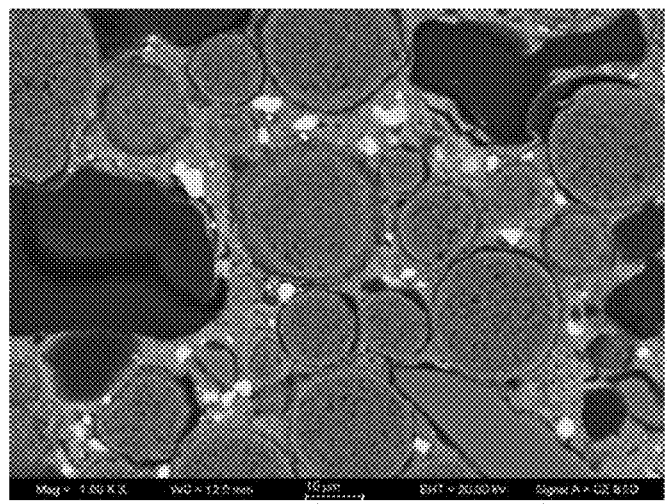
FIG. 16D shows a SEM image at higher magnification of FIG. 16B (first row) made without any addition.
Figure 16E:
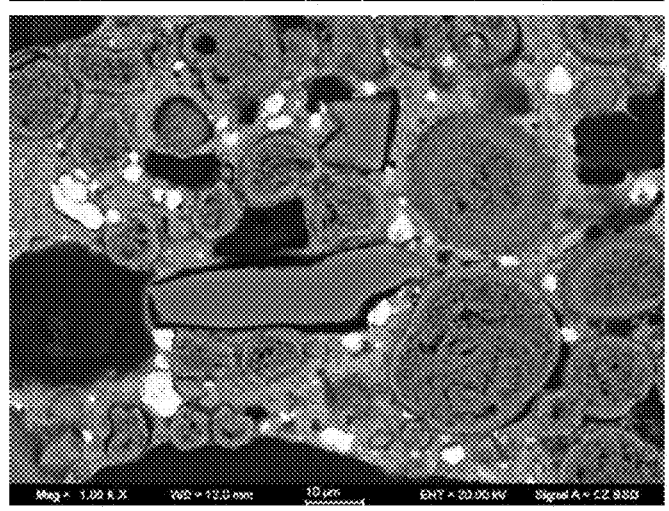
FIG. 16E shows a SEM image at higher magnification of FIG. 16B (second row) with addition of 5% Darvan.
Figure 16F:
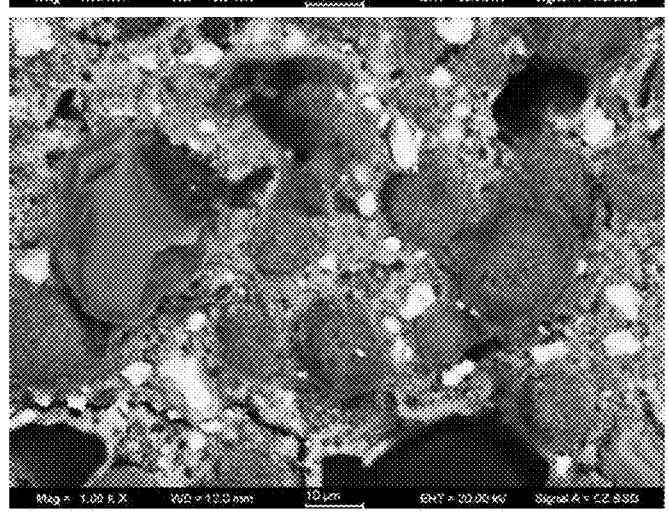
FIG. 16F shows a SEM image of FIG. 16B (third row) with addition of 5% Duramax (polished cross sections).

FIG. 16D shows an SEM image at higher magnification of FIG. 16B (first row) made without any addition, FIG. 16E shows a SEM image at higher magnification of FIG. 16B (second row) with addition of 5% Darvan, and FIG. 16F shows an SEM image of FIG. 16B (third row) with addition of 5% Duramax. The SEM images at higher magnification in FIG. 16D illustrates for the organic-free particles that they preserved a spherical shape and had suffered no fracture. Cross sections of the materials containing Darvan and Duramax show some distortion of the spray-dried particles possibly due to the distortions resulted from cutting and polishing of the green ware or related to the addition of the organics.

FIGS. 18A, 18B, 18C, and 18D show AT-type batch extruded and fired ware made from spray-dried alumina/3% silica. The SEM images show details of porosity, surface porosity, phase distribution and microcracking. The typical regular phase distribution of well-mixed, fine raw materials is obtained for use of green spray-dried particles (FIGS. 18A and 18B) and charred spray-dried particles (FIGS. 18C and 18D).

FIGS. 19A and 19B show SEM images of the inverse porosity characteristics in the bulk and at the surface, phase distribution, and low microcrack density in AT-type extruded and fired ware made from spray-dried, pre-fired alumina/3% silica (aluminum titanate shows grey phase contrast, feldspar is bright and unreacted alumina dark grey) according to an exemplary embodiment of the disclosure. The Examples made from pre-fired spray-dried material shown in FIGS.

19A and 19B are characterized by an inverse porosity with high pore interconnectivity. The shape of the individual spray-dried particles may still be visible, but was transformed into larger grain agglomerates of aluminum titanate and feldspar. The distribution of these two phases was regular. Unreacted alumina was visible in the form of agglomerates that typically are not present in materials made from commercial batch materials. Extending the pre-firing time of the spray-dried particles to achieve full reaction, account for different impurity levels in A1000, or adjust the AT-type batch composition may suppress the 3% excess of alumina that typically yields small alumina inclusions within the aluminum titanate grains. Possibly, but not necessarily related to the different distribution of the excess alumina, the microcrack density in the materials made from pre-fired spray-dried powders was much lower. Materials made from pre-fired spray-dried material that were spray-dried from slurries containing 5% Darvan (FIGS. 20A, 20B, 20C, and 20D) or 5% Duramax (FIGS. 21(a)-(f)) showed the same characteristic inverse porosity, but exhibited a more irregular, much coarser pore and phase distribution with more agglomeration. Agglomeration of unreacted alumina was also enhanced compared to the materials made from organic-free spray-dried materials. Low microcrack density is evident in FIGS. 20D and 21(d).

Regular and inverse pore structures (see FIGS. 3A and 3B) were obtained with pre-fired spray-dried AT-type batch components. The regular pore structure (FIG. 3A) is typically found in materials made from commercial raw materials and results from reactions of the raw materials and extensive sintering at contact, reaction and diffusion zones between the raw material particles. Inverse pore structure (FIG. 3B) is characterized by large pore necks and small material sinter necks. Such pore networks were observed in structures where particles were welded and underwent very little if any reaction or sintering. Inverse pore structures were obtained with certain spray-dried batch materials, pre-firing and part firing conditions. Inverse porosity was obtained when the full (or almost complete) batch composition was spray-dried and fully pre-reacted. Under such conditions, no major reactions occurred in the extruded material during firing, and the spray-dried particles sintered only at their contact points. Inverse porosity also formed more frequently in high and ultrahigh porosity materials. However, batch and firing conditions that produced inverse porosity were also found for low porosity and partially reacted spray-dried batch materials. The following Figures illustrate examples of the resulting microstructures together with their spray-dried powders, batch compositions and firing cycles.

FIGS. 22A-F show a representative material of regular pore structure with small pore necks. This material was obtained with an AT-type composition batch, in which spray-dried alumina/3% silica was used as pre-reacted particle batch material. The spray-dried alumina/silica powder of Example No. 78 had an average particle size of 16 μm and had been pre-fired to 1300° C. The SEM images show Example No. H1 (AT type batch extruded and fired ware made with Example No. 78 particles) ware after firing at 1427° C./15 h. The porosity was about 50% porosity. FIGS. 22A-C show polished cross-sections of the fired wall at different magnifications and illustrate the pore structure and phase distribution. The phase with brighter contrast is feldspar and the phase with darker contrast is aluminum titanate. FIGS. 22D-F show the fired, unpolished surface. The fired material properties are summarized in Table 10.

TABLE 10

| Example No. | Fully Fired MOR (psi) | CTE (RT to 1000° C.) in $10^{-7}$ K$^{-1}$ | % Porosity | d50 (μm) | (d50-d10)/d50 | Permeability in mDarcy | tortuosity |
|---|---|---|---|---|---|---|---|
| H1 | 286 | 17.2 | 51.85 | 12.89 | 0.49 | 376 | 8.4 |
| H3 | | | 55.09 | 13.4 | 0.42 | 447 | 10.8 |
| H4 | | | 53.72 | 13.59 | 0.47 | 406 | 10.3 |
| H5 | | 19.6 | 57.35 | 13.23 | 0.48 | 452 | 9.9 |

FIGS. 23A-D show a high porosity AT-type ware made from spray-dried alumina/3% silica/lanthanum oxide pre-reacted particles having inverse porosity. The material preserved during the firing the shape of spherical clusters that sintered together at their contact points, thus producing the inverse porosity with large pore necks. Example No. H2 was made from spray-dried Example No. 92 particles (alumina with 10% silica and 0.4% lanthanum acetate) with 19 μm average particle size and fired at 1410° C. The material was extruded with 20% potato starch as pore former. SEM images of the wall surface and polished cross sections at different magnifications are shown in FIGS. 23A-D. FIG. 23A shows a polished cross-section of the wall showing inverse porosity with large pore necks. FIGS. 23B and 23C show the polished cross-section at greater magnifications illustrating the inverse porosity with large pore necks and the phase distribution. FIG. 23D is a SEM micrograph of the unpolished surface illustrating pore and pre-reacted particle interconnectivity. In FIG. 23B, the brighter contrast phase is feldspar, the grey phase is aluminum titanate, and the dark phase is alumina.

Materials with high porosity and regular porosity morphology were also obtained by exemplary embodiments of spray-dried composition and firing schedule. FIGS. 24A-F show the example of a high porosity material Example No. H3 with 55% porosity that was made from pre-reacted titania with small amount of silica in an AT-type batch. Example No. 111 pre-reacted spray-dried particles (titania/silica) used in Example No. H3 had an average particle size of 13 μm and were pre-fired at 1300° C. Extruded ware of Example No. H3 was fired at 1427° C. for 15 h. Example No. H3 showed a regular porosity with relatively small pore necks. The phase distribution was coarse and the microcrack density rather low. FIGS. 24A, 24B and 24C show polished cross-sections of the fired wall at different magnifications and illustrate the pore structure and phase distribution. FIGS. 24D, 24E, and 24F show SEM views of the fired, unpolished surface and illustrate the pore and particle interconnectivity in the microstructure and pore structure. The bright phase is feldspar and the grey phase is aluminum titanate. The material properties are summarized in Table 10.

Some Examples were made by using two pre-reacted batch materials, such as Example No. H4 from pre-fired spray-dried AlSi Example No. 78 particles and pre-fired spray-dried TiSi Example No. 111 particles. FIG. 25A shows a polished cross-section of a wall of AT porous ceramic honeycomb fired at 1427° C./15 h having about 54% porosity and particles of spray-dried titania/silica pre-fired to 1300° C. with average particle size of about 13 μm and particles of spray-dried alumina/silica pre-fired to 1300° C. with average particle size of about 16 μm according to an exemplary embodiment of the disclosure. Both powders were incorporated in the AT-type batch. FIGS. 25B and 25C show the polished cross-section at greater magnifications illustrating the regular porosity with small pore necks and the phase distribution. FIGS. 25D, 25E, and 25F are SEM micrographs of the fired, unpolished surface that illustrate pore and phase connectivity. The white particles are feldspar, the grey ones aluminum titanate. The material properties of Example H4 are summarized in Table 10.

High porosity Example H5 with 57% porosity after firing to 1427° C./15 h was made from the same spray-dried powder compositions as Example H4, but the spray-dried alumina-based powder had been fired to higher pre-firing temperature. FIG. 26A shows a polished cross-section of a wall of Example H5 porous ceramic honeycomb fired at 1427° C./15 h having particles of spray-dried titania/silica pre-fired to 1300° C. with average particle size of about 13 μm and particles of spray-dried alumina/silica pre-fired to 1600° C. with average particle size of about 13 μm according to an exemplary embodiment of the disclosure. FIGS. 26B and 26C show the polished cross-section at greater magnifications illustrating the pore structure and the phase distribution. FIGS. 26D, 26E, and 26F are SEM micrographs of the fired, unpolished surface that illustrate pore and phase interconnectivity. The bright contrast phase is feldspar and the grey one aluminum titanate. A regular, coarse phase distribution was obtained. The material properties of Example H5 are summarized in Table 10.

FIG. 27A shows a polished cross-section of a wall of AT porous ceramic honeycomb having particles of pre-fired spray-dried full batch composition and fine alumina as binder according to an exemplary embodiment of the disclosure. FIG. 27B shows the polished cross-section at greater magnification and FIG. 27C shows the as-fired wall surface illustrating the spheroid packing of the inverse porosity with small particle necks and large pore necks.

FIGS. 28A, 28B, and 28C show SEM images of AT-type batch extruded and fired ware made from hollow pre-reacted calcined alumina/silica. The spray-dried hollow particles were pre-fired to 1650° C. for 15 hr. The extruded honeycomb ware was fired at 1410° C. according to an exemplary embodiment of the disclosure. FIG. 28A shows a polished cross section through a honeycomb channel wall showing preserved hollow spheres and inverse porosity. FIG. 28B shows details of the solid phases and inverse porosity. FIG. 28C show details of surface porosity and material.

Properties of Examples having spray-dried, pre-fired alumina/silica batch material are summarized in Tables 11-13. The Examples were obtained by 1" and 2" ram extrusions as indicated in Tables 11-13, and fired to the indicated temperature. It can be seen that the Examples cover a wide porosity and pore size range. FIGS. 29A and 29B show the evolution of porosity, median pore size d50 and MOR of materials with the same AT-type composition, but with different amounts of silica in the spray-dried alumina/silica batch material according to exemplary embodiments of the disclosure. It can be seen that the silica content in the spray-dried particles has little impact on the porosity. The porosity decreases slightly with the silica level in the spray-dried powder. The silica level in the spray-dried powder has a strong impact on the median pore size of the extruded, fired ware. A strong decrease in median pore size was observed with increasing silica content. 3% silica yielded 20 μm median pore size, while 17% silica yielded only 10 μm pore size. MOR increases with decreasing porosity and decreasing pore size. The examples include cases where, at similar or higher porosity and similar or larger median pore diameter, the MOR is higher than that of a material made from commercial coarse alumina raw material. The same is valid for the porosity-normalized MOR.

TABLE 11

| Batch | W1 | W2 | W3 | W4 | W5 | W6 | W7 | W8 | W9 | W10 |
|---|---|---|---|---|---|---|---|---|---|---|
| Ram extrusion inch | 1 | 1 | 1 | 1 | 1 | 1 | | 1 | 1 | 2 |
| spray-dried particles | Ex no. 84 | Ex no. 83 | Ex no. 85 | Ex no. 90 | Ex no. 86 | Ex no. 88 | Ex no. 87 | Ex no. 88 | Ex no. 89 | Ex no. 92 |
| spray-dried powder composition | alumina/ 6% silica | alumina/ 6% silica | alumina/ 10% silica | alumina/ 10% silica | alumina/ 10% silica | alumina/ 17% silica | alumina/ 17% silica | alumina/ 17% silica | alumina/ 17% silica | alumina/ 10% silica |
| sintering aid | | | | 0.4% La | | | | | | 0.4% La |
| spray-dried particle d50 in μm | 16.38 | 20.4 | 22.39 | 22.08 | 20.71 | 15.67 | 16.09 | 15.67 | 25.42 | 19.2 |
| Prefiring temperature of spray-dried powder in ° C. | 1610 | 1410 | 1410 | 1410 | 1610 | 1610 | 1410 | 1610 | 1610 | 1410 |
| Spray dried pre-reacted particles | 49.54 | 49.54 | 51.74 | 51.74 | 51.74 | 56.75 | 56.76 | 56.76 | 56.76 | 51.74 |
| Micro-crystalline Silica | 7.22 | 7.22 | 5.02 | 5.02 | 5.02 | 0.00 | 0.00 | 0.00 | 0.00 | 5.02 |
| Strontium carbonate | 8 | 8 | 8 | 8 | 8 | 8 | 8 | 8 | 8 | 8 |
| calcium carbonate | 1.38 | 1.38 | 1.38 | 1.38 | 1.38 | 1.38 | 1.38 | 1.38 | 1.38 | 1.38 |
| Titanium dioxide | 29.95 | 29.95 | 29.95 | 29.95 | 29.95 | 29.95 | 29.95 | 29.95 | 29.95 | 29.95 |

TABLE 11-continued

| | | | | | | | | | | |
|---|---|---|---|---|---|---|---|---|---|---|
| Lanthanum oxide | 0.2 | 0.2 | 0.2 | 0.2 | 0.2 | 0.2 | 0.2 | 0.2 | 0.2 | 0.2 |
| Hydrated aluminum oxide | 3.71 | 3.71 | 3.71 | 3.71 | 3.71 | 3.71 | 3.71 | 3.71 | 3.71 | 3.71 |
| Pore former | 20PS | 20PS | 20PS | 20PS | 20PS | 20PS | 20PS | 20PS | 20PS | 20PS |

| Batch | W11 | W12 | W13 | W14 | W15 | W16 | W17 | W18 | W19 | W20 |
|---|---|---|---|---|---|---|---|---|---|---|
| Ram extrusion inch | 2 | 2 | 2 | 2 | 2 | 1 | 1 | 1 | 1 | 1 |
| spray-dried particles | Ex no. 81 | Ex no. 89 | Ex no. 112 | Ex no. 80 | Ex no. 81 | Ex no. 42 | Ex no. 42 | Ex no. 43 | Ex no. 113 | Ex no. 113 |
| spray-dried powder composition | alumina/ 3% silica | alumina/ 17% silica | alumina/ 6% silica | alumina/ 3% silica | alumina/ silica | AT/ SAS - 6% alumina | AT/ SAS - 6% alumina | AT/ SAS - 6% alumina | AT/SAS | AT/SAS |
| spray-dried particle d50 in μm | 15 | 25 | 17 | 19 | 15.4 | 49 | 31 | 20 | 36 | 36 |
| Prefiring temperature of spray-dried powder in °C. | 1600 | 1610 | 1610 rotary calciner | 1610 rotary calciner | 1600 | 1200 | 1200 | 1200 | 1300 | 1300 |
| Spray dried pre-reacted particles | 48.00 | 56.76 | 49.54 | 48.00 | 48.00 | 94.00 | 94.00 | 94.00 | 100.00 | 100.00 |
| Micro-crystalline Silica | 8.73 | 0.00 | 7.22 | 8.73 | 8.73 | | | | | |
| Strontium carbonate | 8 | 8 | 8 | 8 | 8 | | | | | |
| calcium carbonate | 1.38 | 1.38 | 1.38 | 1.38 | 1.38 | | | | | |
| Titanium dioxide | 29.95 | 29.95 | 29.95 | 29.95 | 29.95 | | | | | |
| Lanthanum oxide | 0.2 | 0.2 | 0.2 | 0.2 | 0.2 | | | | | |
| Hydrated aluminum oxide | 3.71 | 3.71 | 3.71 | 3.71 | 3.71 | | | | | |
| fine alumina <1 μm | | | | | | 6 | 6 | 6 | | |
| sinter additives | | | | | | | | | | 1% Li-acetate |
| Pore former | 20PS | | | | 10PS/8GR | 15% PS | 25% PS | 15% PS/ 8% GR | 20% PS | 20% PS |

| Batch | W21 | W22 | W23 | W24 | W25 | W26 | W27 | W28 | W29 | W30 |
|---|---|---|---|---|---|---|---|---|---|---|
| Ram extrusion inch | 1 | 1 | 1 | 1 | 1 | 1 | 2 | 2 | 2 | 2 |
| spray-dried particles | Ex no. 113 | Ex no. 113 | Ex no. 103 | Ex no. 34 | Ex no. 42 | Ex no. 42 | Ex no. 103 | Ex no. 103 | Ex no. 105 | Ex no. 107 |
| spray-dried powder composition | AT/SAS | AT/SAS | AT/SAS | AT/SAS | AT/ SAS - 6% alumina | AT/ SAS - 6% alumina | full AT/SAS-batch composition - 6% alumina | full AT/SAS-batch composition - 6% alumina | full AT/SAS-batch composition - 6% alumina | full AT/SAS-batch composition - 6% alumina |
| sintering aid | | | | 0.4% La; 1% boron oxide | | | | | | |
| spray-dried particle d50 in μm | 36 | 36 | 28 | | | | 21 | 25 | 25 | 23 |
| Prefiring temperature of spray-dried powder in °C. | 1300 | 1300 | 1300 | 1100 | 1410 | 1300 | 1300 | 1200 | 1200 | 1200 |
| Spray dried pre-reacted particles | 100.00 | 100.00 | 93.62 | 90.00 | 94.00 | 94.00 | 94.00 | 94.00 | 94.00 | 93.60 |
| Micro-crystalline Silica | | | | 0.80 | | | | | | |

TABLE 11-continued

| | | | | | | | | | |
|---|---|---|---|---|---|---|---|---|---|
| Strontium carbonate | | | 0.15 | | | | | | |
| calcium carbonate | | | 3 | | | | | | |
| Hydrated aluminum oxide | | 3.71 | 0.37 | | | | | | 3.71 |
| fine alumina <1 μm | | 2.67 | | 3 | 3 | 6 | 6 | 6 | 2.67 |
| alumina d50 = 10 μm | | | 5 | | | | | | |
| sinter additives | 1% Zn-acetate | | | 3% Al,Si,P-glass; phosphoric acid | 3% Al,Si,P-glass; phosphoric acid | | | | |
| Pore former | 20% PS | 0 | 10% PS/8GR | 10% PS/8GR | 15% PS/8GR | 15% PS/8GR | 20PS | 20PS | 25PS | 10PS/8GR |

| Batch | W31 | W32 | W33 | W34 | W35 | W36 | W37 | W38 |
|---|---|---|---|---|---|---|---|---|
| Ram extrusion inch | 2 | 2 | 2 | 2 | 2 | 2 | 2 | 2 |
| spray-dried particles | Ex no. 97 | Ex no. 97 | Ex no. 97 | Ex no. 53 | Ex no. 45 | Ex no. 45 | Ex no. 51 | Ex no. 51 |
| spray-dried powder composition | full AT/SAS-batch composition - 6% alumina | full AT/SAS-batch composition - 6% alumina | full AT/SAS-batch composition - 6% alumina | full AT/SAS-batch composition - 6% alumina | full AT/SAS-batch composition - 6% alumina | full AT/SAS-batch composition - 6% alumina | full AT/SAS-batch composition - 6% alumina | full AT/SAS-batch composition - 6% alumina |
| sintering aid | | | | | | | | |
| spray-dried particle d50 in μm | 41 | | | 36 | 23 | 31 | 43 | 43 |
| Prefiring temperature of spray-dried powder in ° C. | 1300 | 1300 | 1300 | 1300 | 1200 | 1300 | 1440 rotary calciner | 1440 rotary calciner |
| Spray dried pre-reacted particles | 94.00 | 94.00 | 94.00 | 90.00 | 90.00 | 90.00 | 90.00 | 100.00 |
| fine alumina <1 μm | 6 | 6 | 6 | | | | | |
| sinter additives | | | | 10% PDM fine green | 10% PDM fine green | 10% PBM fine green | 10% PBM fine green | |
| Pore former | 15PS/8GR | 15PS/8GR | 15PS/8GR | 20PS | 20PS | 20PS | 20PS | 20PS |

| | Comparative Examples with regular (non pre-reacted) powders | | | | Comparative Examples made from milled, fired AT grog | |
|---|---|---|---|---|---|---|
| Batch | CW1 | CW2 | CW3 | CW4 | CW5 | CW6 |
| Ram extrusion inch | 1 | 1 | 2 | 2 | 1 | 1 |
| spray-dried particles | no | no | no | no | PDM Duratrap ® AT reuse milled | Duratrap ® AT reuse milled |
| Microcrystalline Silica | 10.19 | 10.19 | 10.19 | 10.19 | | |
| Strontium carbonate | 8 | 8 | 8 | 8 | | |
| calcium carbonate | 1.38 | 1.38 | 1.38 | 1.38 | | |
| Titanium dioxide | 29.95 | 29.95 | 29.95 | 29.95 | | |
| Lanthanum oxide | 0.2 | 0.2 | 0.2 | 0.2 | | |
| Hydrated aluminum oxide | 3.71 | 3.71 | 3.71 | 3.71 | | |
| alumina d50 = 10 μm | | 46.57 | 46.57 | 46.57 | | |
| alumina d50 = 20 μm | 46.57 | | | | | |

TABLE 11-continued

| sinter additives | | | | | 90% coarse Duratrap ® AT reuse fired to 1200 C., milled (21 μm) + 10% fines | 90% coarse Duratrap ® AT reuse fired to 1300 C., milled (27 μm) + 10% fines |
|---|---|---|---|---|---|---|
| Pore former | 20PS | 20PS | 20PS | 10PS/8GR | 15PS/8GR | 15PS/8GR |

TABLE 12

1" extruded part containing alumina/silica spray-dried batch material

| Example No. | Batch | honeycomb firing temperature in ° C. | fully fired MOR (psi) | CTE (RT to 1000 C.) in $10^{-7}$ $K^{-1}$ | % porosity | d50 (μm) | (d50-d10)/d50 | permeability in mDarcy |
|---|---|---|---|---|---|---|---|---|
| H6 | W1 | 1410 | 208 | 23.7 | 59.02 | 15.07 | 0.65 | 607 |
| H7 | W2 | 1410 | 137 | 7 | 58.39 | 15.21 | 0.68 | 607 |
| H8 | W3 | 1410 | 150 | 23.2 | 60.79 | 16.87 | 0.66 | 787 |
| H9 | W4 | 1410 | 230 | 21.2 | 56.52 | 17.21 | 0.56 | 755 |
| H10 | W5 | 1410 | 189 | 22 | 59.36 | 17.61 | 0.66 | 831 |
| H11 | W6 | 1410 | 286 | 23.3 | 57.46 | 7.77 | 0.59 | 152 |
| H12 | W7 | 1410 | 285 | 22.8 | 56.84 | 8.09 | 0.57 | 173 |
| H13 | W7 | 1410 | 298 | 26.7 | 56.00 | 8.10 | 0.57 | 155 |
| H14 | W6 | 1410 | 231 | 26.9 | 58.53 | 8.60 | 0.62 | 195 |
| H15 | W8 | 1410 | 228 | 24.9 | 59.72 | 12.03 | 0.72 | 375 |
| H16 | W9 | 1410 | 272 | 18.9 | 54.84 | 16.19 | 0.63 | 659 |
| H17 | W10 | 1410 | | 9.9 | 61.36 | 15.37 | 0.65 | 632 |
| H18 | W4 | 1410 | 230 | | 56.52 | 17.21 | 0.56 | 755 |

1" extruded part containing alumina/silica spray-dried batch material

| | | | Normalized MOR | XRD phase fractions | | | | |
|---|---|---|---|---|---|---|---|---|
| Example No. | Batch | tortuosity | (psi) to 50% Porosity = MOR × 0.5/(1 − Porosity) | AT (%) | alumina (%) | Rutile (%) | SAS (%) | mullite (%) |
| H6 | W1 | 8.61 | 254 | 66.3 | 8.3 | 3.7 | 21.8 | 0 |
| H7 | W2 | 7.92 | 165 | 60.8 | 9.5 | 5.5 | 20.5 | 3.8 |
| H8 | W3 | 7.74 | 191 | 68.1 | 5 | 2.6 | 19.7 | 4.6 |
| H9 | W4 | 6.43 | 264 | 69.7 | 5.8 | 2.6 | 22 | 0 |
| H10 | W5 | 7.88 | 233 | 66.4 | 5 | 3 | 20.7 | 4.9 |
| H11 | W6 | 9.4 | 336 | 69.4 | 7.9 | 2.3 | 20.5 | 0 |
| H12 | W7 | 9.04 | 330 | 70.5 | 5.6 | 1.7 | 22.2 | 0 |
| H13 | W7 | 7.86 | 339 | 69.6 | 7.3 | 2.3 | 20.8 | 0 |
| H14 | W6 | 8.12 | 279 | 70.1 | 6.2 | 2.1 | 21.6 | 0 |
| H15 | W8 | 10.23 | 283 | 67.9 | 8 | 2.6 | 21.6 | 0 |
| H16 | W9 | 6.62 | 301 | 64.5 | 9.6 | 4.2 | 21.8 | 0 |
| H17 | W10 | 8.32 | | 61.4 | 7.1 | 4.8 | 20.3 | 6.4 |
| H18 | W4 | 6.43 | 264 | 69.7 | 5.8 | 2.6 | 22 | 0 |

TABLE 13

Honeycomb 2" ram extrusion batch with pre-fired alumina/silica particles

| Example No. | Batch | Firing temperature in C. | % porosity | d50 (μm) | (d50-d10)/d50 | permeability in mDarcy | tortuosity | CTE (RT to 1000 C.) in $10^{-7}$ $K^{-1}$ |
|---|---|---|---|---|---|---|---|---|
| H19 | W11 | 1410 | 58.65 | 21.37 | 0.43 | 1378 | 5.41 | |
| H20 | W11 | 1410 | 59.96 | 19.57 | 0.46 | 1148 | 6.92 | 13.4 |
| H21 | W11 | 1410 | 60.76 | 19.13 | 0.44 | 1100 | 6.75 | 13.4 |
| H22 | W15 | 1410 | 59.72 | 16.71 | 0.55 | 733 | 7.74 | |
| H23 | W15 | 1410 | 57.44 | 16.40 | 0.56 | 698 | 6.82 | |
| H24 | W15 | 1410 | 59.48 | 17.00 | 0.56 | 762 | 8.3 | |
| H25 | W15 | 1431 | 57.90 | 17.75 | 0.55 | 825 | 7.27 | |
| H26 | W15 | 1431 | 57.38 | 19.48 | 0.53 | 994 | 6.98 | 17.9 |
| H27 | W15 | 1431 | 56.72 | 19.93 | 0.51 | 1019 | 6.25 | |
| H28 | W15 | 1431 | 58.79 | 20.11 | 0.51 | 1047 | 7.29 | |

TABLE 13-continued

Honeycomb 2" ram extrusion batch with pre-fired alumina/silica particles

| | | | | | | | | |
|---|---|---|---|---|---|---|---|---|
| H29 | W15 | 1440 | 53.94 | 20.12 | 0.43 | 1031 | 6.65 | 16.9 |
| H30 | W12 | 1410 | 46.47 | 11.20 | 0.51 | 245 | 8.4 | 20.7 |
| H31 | W12 | 1410 | 47.01 | 11.37 | 0.46 | 269 | 8.5 | |
| H32 | W12 | 1410 | 40.75 | 10.67 | 0.53 | 195 | 9.7 | |
| H33 | W10 | 1410 | 58.30 | 15.81 | 0.63 | 675 | 7.96 | |
| H34 | W14 | 1410 | 62.84 | 24.31 | 0.55 | 1507 | 7.65 | |
| H35 | W14 | 1410 | 61.72 | 27.51 | 0.47 | 1959 | 7.31 | 16.5 |

Honeycomb 2" ram extrusion batch with pre-fired alumina/silica particles

| Example No. | Batch | fully fired MOR (psi) | Normalized MOR (psi) on 50% P = (exp MOR × (0.5) (1 − exp P) | AT (%) | alumina (%) | Rutile (%) | SAS (%) | mullite (%) |
|---|---|---|---|---|---|---|---|---|
| H19 | W11 | | | 70.4 | 6.4 | 2.7 | 20.6 | 0 |
| H20 | W11 | 144 | 180 | 70.3 | 6.1 | 1.3 | 22 | 0 |
| H21 | W11 | 141 | 180 | 68.2 | 8.1 | 2.4 | 21.4 | 0 |
| H22 | W15 | | | 68.2 | 5.6 | 2.1 | 20.9 | 0 |
| H23 | W15 | 176 | 207 | 65.2 | 6.9 | 3.4 | 29.6 | 2.8 |
| H24 | W15 | 172 | 212 | 67.3 | 6.8 | 3.5 | 22.4 | 0 |
| H25 | W15 | | | 71.4 | 5.4 | 1.4 | 21.8 | 0 |
| H26 | W15 | 194 | 228 | 71.9 | 5.8 | 1.4 | 20.9 | 0 |
| H27 | W15 | 194 | 224 | 71.6 | 5.9 | 1.5 | 21 | 0 |
| H28 | W15 | 194 | 235 | 70.9 | 6 | 1.6 | 21.5 | 0 |
| H29 | W15 | 204 | 221 | 72.4 | 6 | 1 | 20.6 | 0 |
| H30 | W12 | 478 | 447 | 68.2 | 7 | 2.6 | 22.2 | 0 |
| H31 | W12 | | | | | | | |
| H32 | W12 | | | | | | | |
| H33 | W10 | 169 | 203 | | | | | |
| H34 | W14 | | | | | | | |
| H35 | W14 | | | | | | | |

For constant inorganic batch composition and use of spray-dried alumina/3% silica, it was shown that the use of organic additions in the spray-drying slurry had an impact on the spray-dried particle shape and the porosity of the pre-fired spray-dried particles. Table 14 shows that use of larger amount of organic binder in the spray-drying slurry produces fine porosity in the pre-fired spray-dried particles and contributes in the final batch to an increase in porosity. Type and quantity of the organic used in the spray-drying slurry do not only have an impact on the porosity in the final material, but also affect the microstructure. Porosity in the pre-fired spray-dried particles allows faster transport and matter exchange during the reaction so that different microstructures are obtained. Phase distribution and grain size in the reacted microstructures control the level of microcracking and the microcrack distribution and thus impact the thermal expansion of the final material. FIGS. 30A, 30B, 30C, and 30D summarize the impact of the organics on the final material CTE by illustrating a panoply of materials with a wide range of microcrack behavior indicated by differences in breadth of hysteresis.

TABLE 14

| AT batch with spray-dried alumina/silica Example No. | Particle Example No. | Firing conditions | Porosity of fired ware in % | Median pore diameter in fired ware in μm | CTE in $10^{-7}$ $K^{-1}$ from RT to 1000 K |
|---|---|---|---|---|---|
| H36 | 60 | 1410° C./15 hrs | 47.74 | 9.40 | |
| H37 | 61 | 1410° C./15 hrs | 54.44 | 22.44 | 18.3 |
| H38 | 62 | 1410° C./15 hrs | 43.64 | 8.66 | |
| H39 | 63 | 1410° C./15 hrs | 43.07 | 9.50 | |
| H40 | 64 | 1410° C./15 hrs | 46.42 | 16.72 | 21 |
| H41 | 65 | 1410° C./15 hrs | 42.64 | 9.41 | |
| H42 | 66 | 1410° C./15 hrs | 41.77 | 12.65 | |
| H43 | 67 | 1410° C./15 hrs | 53.05 | 21.38 | |
| H44 | 68 | 1410° C./15 hrs | 41.03 | 12.25 | |
| H45 | 69 | 1410° C./15 hrs | 42.95 | 8.41 | |
| H46 | 70 | 1410° C./15 hrs | 48.43 | 19.93 | 15 |
| H47 | 71 | 1410° C./15 hrs | 44.66 | 8.46 | |
| H48 | 72 | 1410° C./15 hrs | 38.04 | 4.38 | 14 |
| H49 | 73 | 1410° C./15 hrs | 58.47 | 22.72 | 13 |
| H50 | 74 | 1410° C./15 hrs | 33.81 | 6.97 | 13 |
| H51 | 75 | 1410° C./15 hrs | 46.01 | 10.53 | |
| H52 | 76 | 1410° C./15 hrs | 40.39 | 7.76 | |
| H53 | 77 | 1410° C./15 hrs | 43.78 | 10.52 | |

Material properties of Examples that were obtained by spray-drying and pre-firing close to full inorganic batch mixture are summarized in Tables 15 and 16. Table 15 shows 1" ram extrusions and Table 16 shows 2" ram extrusions. Comparative Example PDG of AT made from commercial, non-spray-dried batch materials is also presented.

TABLE 15

| | Fired (300/14) 1" honeycomb properties | | | | | | |
|---|---|---|---|---|---|---|---|
| | Honeycomb firing temperature | fully fired MOR (psi) | CTE (RT to 1000° C.) in $10^{-7}$ $K^{-1}$ | % porosity | d50 (μm) | (d50-d10)/d50 | permeability in mDarcy |
| Example No. | | | | | | | |
| H54 | 1410 | | | 48.5 | 11.6 | 0.29 | 348 |
| H55 | 1410 | | | 56.3 | 14.3 | 0.44 | 466 |
| H56 | 1410 | | | 55.7 | 12.9 | 0.51 | 392 |
| H57 | 1410 | 76 | 21.9 | 63.6 | 13.8 | 0.58 | 514.4 |
| H58 | 1410 | 154 | | 61.4 | 15.5 | 0.56 | 617.3 |
| H59 | 1410 | 98 | | 59.7 | 10.1 | 0.48 | 243.3 |
| H60 | | | | 66.6 | 23.3 | 0.42 | |
| H61 | | | | 61.3 | 19.8 | 0.38 | |
| H62 | | | | 53.9 | 16.4 | 0.48 | |
| H63 | | | | 41.6 | 6.2 | 0.30 | |
| H64 | | 55 | 17.7 | 39.9 | 11.2 | 0.32 | 225 |
| H65 | | 327 | 17.4 | 38.2 | 11.7 | 0.38 | 224 |
| H66 | | | | 32.4 | 22.3 | 0.27 | 852 |
| H67 | | | | 51.1 | 17.8 | 0.36 | 755 |
| Comparative Examples | | | | | | | |
| CW5 | 1410 | 112 | 31.9 | 62.4 | 10.6 | 0.57 | 283 |
| CW6 | 1410 | 76 | 33.2 | 58.5 | 9.4 | 0.46 | 207 |

| | Fired honeycomb phase composition in % | | | | | |
|---|---|---|---|---|---|---|
| | Tortuosity | AT | alumina | Rutile | SAS | mullite | $SrAl_8TiO_{19}$ |
| Example No. | | | | | | | |
| H54 | 10.77 | | | | | | |
| H55 | 12.2 | 68.5 | 9.6 | 0 | 21.4 | | |
| H56 | 9.86 | 72.2 | 4.2 | 0 | 23 | | |
| H57 | 11.28 | 65.5 | 10.9 | 0 | 21.6 | | 2 |
| H58 | 9.82 | 65.1 | 11.3 | 2.1 | 21.5 | | |
| H59 | 14.64 | 64.3 | 12.6 | 2.2 | 20.9 | | |
| H60 | | | | | | | |
| H61 | | | | | | | |
| H62 | | | | | | | |
| H63 | | | | | | | |
| H64 | 11.56 | 69.4 | 5.4 | 0 | 24.8 | | |
| H65 | 11.64 | 69.9 | 5.2 | 0 | 24.7 | | |
| H66 | 7.2 | 68.4 | | | 24.1 | 7.5 | |
| H67 | 7.39 | 66.1 | 2.4 | | 29.5 | 2 | |
| Comparative Examples | | | | | | | |
| CW5 | 8.5 | 68.6 | 8.1 | 2 | 21.3 | | |
| CW6 | 12.14 | 65.5 | 5.7 | 2.2 | 20.1 | 6.6 | |

TABLE 16

| | | Fired (300/14) 2" honeycomb properties | | | | | |
|---|---|---|---|---|---|---|---|
| Example No. | Honeycomb firing temperature | fully fired MOR (psi) | CTE (RT to 1000 C.) | % porosity | d50 (um) | (d50-d10)/d50 | perm |
| H68 | 1410 C. | | | 55.4 | 10.8 | 0.44 | 178 |
| H69 | 1410 C. | 321 | 21 | 52.7 | 9.1 | 0.41 | |
| H70 | 1410 C. | 319 | | 53.5 | 4.3 | 0.51 | |
| H71 | 1410 C. | | | 56.3 | 14.3 | 0.44 | 466 |
| H72 | 1410 C. | 180 | | 57.4 | 4.5 | 0.54 | |
| H73 | 1370 C. | | | | | | |
| H74 | 1410 C. | 70 | 23.5 | 62.3 | 14.9 | 0.59 | 585 |
| H75 | 1410 C. | | | 62.0 | 13.6 | 0.60 | 497 |
| H76 | 1427 C. | | | 63.9 | 13.9 | 0.57 | 513 |

TABLE 16-continued

| | | | | | | | |
|---|---|---|---|---|---|---|---|
| H77 | 1440 C. | 142 | 19.2 | 59.3 | 15.4 | 0.52 | 595 |
| H78 | 1410 C. | 48 | 28.9 | 64.0 | 13.7 | 0.62 | 481 |
| H79 | 1410 C. | 96 | 28.7 | 57.2 | 8.4 | 0.44 | 170 |
| H80 | 1410 C. | 104 | 37.2 | 60.7 | 11.9 | 0.54 | |
| H81 | 1410 C. | 129 | 33.3 | 60.6 | 12.0 | 0.49 | 336 |
| H82 | 1375 C. | 121 | 9.5 | 61.6 | 13.1 | 0.63 | |
| H83 | 1375 C. | 67 | 32.1 | 63.3 | 16.0 | 0.67 | |
| H84 | 1410 C. | 48 | 28.9 | 64.0 | 13.8 | 0.62 | |

| Example | Fired honeycomb phase composition in % | | | | | |
|---|---|---|---|---|---|---|
| No. | Tortuosity | AT | alumina | Rutile | SAS | mullite |
| H68 | 16 | | | | | |
| H69 | | 67.2 | 4.7 | 0.8 | 24.3 | |
| H70 | | 67.5 | 5.7 | 0 | 26.2 | |
| H71 | 12 | 72.2 | 4.2 | 0 | 23 | |
| H72 | | 68.9 | 4.3 | 0.7 | 26.1 | |
| H73 | | | | | | |
| H74 | 8 | | | | | |
| H75 | 7 | 68.7 | 7 | | 23.7 | |
| H76 | 9 | | | | | |
| H77 | 9 | 67 | 6.8 | | 25.8 | |
| H78 | 11 | 64.4 | 6.2 | 2.9 | 21 | 5.5 |
| H79 | 8 | 72.6 | 5.9 | | 21.5 | |
| H80 | | 68.8 | 4.2 | 1.2 | 20.8 | 5 |
| H81 | 12 | 68.7 | 4 | 1.5 | 19.7 | 6.2 |
| H82 | | 67.8 | 3.6 | 1.5 | 20.8 | 6.8 |
| H83 | | 63.8 | 5.4 | 2.9 | 20.8 | 7.2 |
| H84 | | 64.4 | 6.2 | 2.9 | 21 | 5.5 |

Table 17 presents exemplary Examples showing the evolution of honeycomb physical properties as function of honeycomb firing temperature for Batch including Particle Example No. 42 (Table 4, fired at 1300° C.), 15% potato starch (PS), and 8% graphite pore formers.

TABLE 17

| Example No. | Particle Example No. | Particle Description | CTE (RT to 1000° C.) | % porosity | d50 (μm) | (d50-d10)/d50 |
|---|---|---|---|---|---|---|
| H73 | 42 | 1300° C., 15% PS 8% Graphite A60 | | | | |
| H74 | 42 | 1300° C., 15% PS 8% Graphite A60 | 23.5 | 62.27 | 14.89 | 0.59 |
| H75 | 42 | 1300° C., 15% PS 8% Graphite A60 | | 61.97 | 13.63 | 0.60 |
| H76 | 42 | 1300° C., 15% PS 8% Graphite A60 | | 63.91 | 13.94 | 0.57 |
| H77 | 42 | 1300° C., 15% PS 8% Graphite A60 | 19.2 | 59.26 | 15.40 | 0.52 |

A comparison of Example 2″ filters made from pre-fired, spray-dried materials W11, W15, and W10 (Table 11) with Comparative Example AT (CW7) made with commercial raw materials was conducted. The fired honeycombs were plugged with cement to provide a bare filter. All filters had close geometries; for better comparison, data were normalized to common filter length 6″ (15.24 cm), diameter 2″ (5.1 cm), and wall thickness 13 mil (0.33 mm) in geometry (300/13). The three spray-dried Examples include normal and inverse porosity materials. The bare pressure drop of the Example filters made from spray-dried materials was found to be lower than the Comparative Example filter. Coated pressure drop was observed to follow this trend.

FIG. 31 is a graphical plot of data of pressure drop as function of soot loading for uncoated porous ceramic filter samples made with spray-dried pre-fired raw materials according to exemplary embodiments of the disclosure and a Comparative Sample made with commercial raw materials. Bare pressure drop shows an advantage of the filters made with spray-dried pre-fired batch materials.

FIG. 32 is a graphical plot of data of filtration efficiency as function of soot loading for uncoated porous ceramic filter samples made with spray-dried pre-fired raw materials according to exemplary embodiments of the disclosure and a comparative sample made with commercial raw materials. Filter efficiency of Example filters made from spray-dried pre-fired material, exhibiting porosity above 57% and in some cases inversed porosity (Example No. H33) was measured. These bare filtration efficiencies were compared with a Comparative Sample AT material made from normal batch powders and achieving only 50% porosity and a median pore size of 15-16 μm. FIG. 32 shows the comparison. Filtration efficiency of the Example filters with much higher porosity is in a similar range as the filtration efficiency of the 50% porosity Comparative Sample AT filter, suggesting that neither inversed porosity pore structures, nor microstructures as obtained with spray-dried batch materials provide any disadvantages for filtration.

According to exemplary embodiments of the disclosure, 8% gain in porosity were demonstrated over Comparative Samples having the same composition. Inverse porosity with 63% porosity and above and median pore size of 15 μm and more were demonstrated. Sinter-bonded, reaction-bonded materials show less microcracking than Comparative Samples, with little or no CTE hysteresis and CTE in the range of $20\text{-}30 \times 10^{-7} K^{-1}$. For certain embodiments of spray-dried compositions, pre-firing and firing conditions, enhanced microcracking and lower CTE were achieved. CTE<10×10$^{-7}$K$^{-1}$ was achieved for several materials. Example No. H7 made from alumina/6% silica spray-dried batch material produced CTE=7×10$^{-7}$K$^{-1}$ at 58% porosity and median pore size 15 μm; Example Nos. H20 and H21 with spray-dried alumina/silica showed CTE=13×10$^{-7}$K$^{-1}$ at 60% porosity and median pore size 19 μm. Example No. H82 with 60% porosity had a CTE of 9.5×10$^{-7}$K$^{-1}$.

Alumina with different levels of silica from 3%-18% or silica and lanthanum was spray-dried and pre-fired at various temperatures in the Examples. Materials with high porosity (55%-61%) and with pore size of 16-20 μm were obtained with CTE of 13-15×10$^{-7}$K$^{-1}$. While the porosity was unaffected by the silica level, the median pore size decreased with increasing silica content. The median pore size of the AT ware was affected by the spray-dried particle size, exhibiting a decrease for particle sizes below 15 μm.

Example articles were ram extruded as 2" parts and fired under low oxygen pressure for polymer burn out, followed by firing in air. Bare filter performance was tested. Pressure drop measurements of bare filters showed a 27% decrease in pressure drop compared to Comparative Examples of AT-type compositions with the same filter geometry. Filtration efficiency of parts with more than 60% porosity and large pore size was similar to that of Comparative Examples of AT-type compositions with 50% porosity and 15 μm median pore size.

Additional Examples of exemplary embodiments of the disclosure comprising cordierite spray-dried, pre-fired raw materials were made. FIGS. 33A, 33B, 33C, 33D and 33E show SEM images of Example Cor1 cordierite-type batch extruded and fired ware comprised of spray-dried Example No. 78, but pre-fired at 1410° C., the extruded material was fired at 1300° C. according to an exemplary embodiment of the disclosure. FIG. 33A shows a surface of a honeycomb wall indicating porosity shape and distribution. FIG. 33B shows a polished cross section through a honeycomb channel wall showing inverse porosity. FIG. 33C shows details of the solid phases. FIGS. 33D and 33E show details of surface porosity and material.

FIGS. 34A, 34B, 34C, and 34D show SEM images of Example Cor2 cordierite-type batch extruded and fired comprised of spray-dried Example No. 78, but pre-fired at 1410° C., the extruded material was fired at 1610° C. according to an exemplary embodiment of the disclosure. FIG. 34A shows a polished cross section through a honeycomb channel wall showing inverse porosity. FIG. 34B shows details of the solid phases, microcracking and inverse porosity. FIGS. 34C and 34D show details of surface porosity and material.

Table 18 shows material properties of Examples Cor1 and Cor2. The Examples showed very little microcracking. Example Cor1 had a CTE of 14×10$^{-7}$ K$^{-1}$ (RT to 800° C.) and Example Cor2 had a CTE of 16×10$^{-7}$ K$^{-1}$ (RT to 800° C.). The MOR of Example Cor1 was 740 psi and the MOR of Example Cor2 was 1130 psi.

TABLE 18

| Example | % Porosity | Median Pore Diameter d50 (μm) | (d50-d10)/d50 |
|---|---|---|---|
| Cor1 | 47.2674 | 30.7792 | 0.35 |
| Cor2 | 50.9072 | 22.7365 | 0.66 |

FIG. 35 shows the pore size distribution for Examples Cor1 and Cor2. FIG. 36 shows the thermal expansion of Examples Cor1 and Cor2.

Thus, exemplary embodiments of the disclosure provide higher porosity and larger pore size porous ceramic articles by use of pre-reacted particles compared to standard powder raw materials. Porosity above 55% or even above 65% can be achieved with median pore sizes in a range between 10 and 30 micrometers. The exemplary process provides filters with porosity of 60% and more, with median pore size of 20 μm or more, at relatively low cost and with control of raw material and pore former particle size and size distribution. Exemplary embodiments of the disclosure enable use of large size particles, narrow particle size distributions, mechanically robust, and combinations of one or more batch materials pre-reacted to obtain an advantageous batch material packing with large pores and high porosity that can be preserved during firing to result in higher porosity, larger pore size materials. The larger the particles and the more homogeneous in size, the larger are porosity and pore size in the porous ceramic article. Broad particle size distributions that have a negative impact on porous ceramic article properties by producing broad pore size distributions and thus low material strength can be avoided.

The exemplary embodiments of the disclosure enable high porosity and large pore size in porous ceramic articles at reasonable cost. For example, spray-dried porous alumina-based, pre-fired batch materials can be made at considerable cost savings with tailored property advantages over other sources of large particle size alumina with a narrow particle size distribution. Spray-dried particles of narrow particle size distribution produce a natural low density packing. Both spray-drying and rotary-calcining are high throughput, low cost industrial processes that can be used to engineer the required batch materials.

The exemplary embodiments of the disclosure enable the reduction in the levels of pore former for comparable porosity of a porous ceramic article and the probability of concomitant firing cracks. Generally, in articles made with powder batches, high porosity can be created only by use of high pore former levels, which require long firing cycles to accommodate the pore former burnout exothermic and endothermic events and also increase the risk of forming firing cracks. Thus, exemplary embodiments of the disclosure enable faster firing times.

The exemplary embodiments of the disclosure enable low levels of microcracking, low CTE, and high strength in porous ceramic articles. The exemplary embodiments of the disclosure enable inverse porosity having large pore necks and small material necks compared to general powdered batch reaction-sintered material that forms an interconnected pore structure with small necks. Small necks may limit permeability and gas flow and control the pressure drop. Materials with very large necks in the pore structure produce improved permeability and thus provide low pressure drop filters.

According to exemplary embodiments of the disclosure, pre-reacted particles can be made in a wide range of sizes and compositions that can contain single or several batch components. According to exemplary embodiments of the disclosure, when several components are combined as a tight mixture in spray-dried particles and pre-fired, the spray-dried powder mixture can be reacted to an intermediate product or product mixture during pre-firing that, during firing of the extruded batch, promotes another reaction path and different final phase distribution, grain size or, in short, different microstructure than a mixed powder batch of the same composition.

The exemplary embodiments of the disclosure enable the structuring of the extruded batch with mixed spray-dried particles not fully reacted to intermediates during pre-firing to act as small batch reactors and induce different reaction paths and yield different engineered microstructures than a mixed powder batch of the same composition.

The exemplary embodiments of the disclosure enable the use of pre-reacted batch constituents to control the final microstructure, its coarseness and phase distribution. Exemplary embodiments of the disclosure enable the use of pre-reacted materials to better control firing and fired properties. Exemplary embodiments of the disclosure also enable the contribution of reaction-related thermal events to be suppressed or decreased, and reaction-related shrinkage events to also be suppressed or decreased, for example, when using fully reacted spray-dried, pre-fired batch materials.

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments. In the description, numerous specific details are provided, such as examples of controls, structures, processes, compositions, articles, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

It will be apparent to those skilled in the art that various modifications and variations can be made in the present disclosure without departing from the spirit or scope of the claimed invention. Thus, it is intended that the present claimed invention cover the modifications and variations of this disclosure provided they come within the scope of the appended claims and their equivalents.

What is claimed is:

1. A method of making a porous ceramic article comprising pre-reacted particles, the method comprising:
    forming green particles of at least 10 μm diameter;
    calcining the green particles to form pre-reacted particles wherein the pre-reacted particles have a multiphase composition comprising two or more of silica, alumina, titania, cristobalite, mullite, rutile, $SrTi_3Al_8O_{19}$, feldspar, aluminum titanate, and aluminum titanate solid solution pseudobrookite;
    mixing the pre-reacted particles and a liquid vehicle to form a paste;
    forming the paste into a wet green body;
    drying the wet green body to form a dried green body; and
    firing the dried green body to form the porous ceramic article, wherein
    the pre-reacted particles comprise at least one of dense, porous, or hollow spheroidal particles.

2. The method of claim 1, wherein forming green particles, comprises:
    mixing at least two inorganic fine powders with liquid vehicle to make a slurry wherein the slurry comprises between 15% and 40% solids loading, and
    spray-drying the slurry, and
    wherein the inorganic fine powders comprise an average particle diameter in a range of $1\times10^{-9}$ to $5.0\times10^{-6}$ meters.

3. The method of claim 2, wherein the inorganic fine powders comprise an average particle diameter in a range of $3.0\times10^{-8}$ to $2.0\times10^{-6}$ meters.

4. The method of claim 2, wherein mixing fine powders comprises:
    further adding organic additives, including at least one of binders, surfactants, and dispersants.

5. The method of claim 2, wherein a first inorganic fine powder of the at least two inorganic fine powders comprises a source of alumina, silica, magnesia, titania, strontium oxide, barium oxide, calcium oxide, lanthanum oxide, boron oxide, cerium oxide, yttrium oxide, or other rare earth oxides, zirconium oxide, an alkali oxide, or iron oxide.

6. The method of claim 5, wherein a second inorganic fine powder of the at least two inorganic fine powders comprises a source of alumina, silica, magnesia, titania, strontium oxide, calcium oxide, lanthanum oxide, boron oxide, cerium oxide, yttrium oxide, or other rare earth oxides, zirconium oxide, or an alkali oxide different from the first inorganic fine powder.

7. The method of claim 1, wherein calcining green particles comprises forming the multiphase composition of the pre-reacted particles with phase combinations comprising:
    alumina and silica,
    alumina and mullite,
    alumina and cristobalite,
    alumina, cristobalite, and mullite,
    aluminum titanate, alumina, and feldspar,
    aluminum titanate, feldspar, and mullite,
    aluminum titanate, alumina, feldspar, and mullite,
    aluminum titanate, alumina, rutile, and feldspar,
    aluminum titanate, alumina, titania, and feldspar,
    aluminum titanate, alumina, rutile, feldspar, and mullite,
    aluminum titanate, alumina, rutile, feldspar, and $SrTi_3Al_8O_{19}$,
    aluminum titanate, alumina, rutile, feldspar, mullite, and $SrTi_3Al_8O_{19}$, or
    aluminum titanate, alumina, rutile, feldspar, mullite, $SrTi_3Al_8O_{19}$, and quartz.

8. The method of claim 1, wherein calcining green particles to form pre-reacted particles comprises forming at least one of sintered, partially reacted, and fully reacted particles.

9. The method of claim 1, wherein forming the paste comprises extruding, casting, rolling, or pressing, the paste into a green honeycomb log, green trough log, or green disks.

10. The method of claim 1, further comprising cutting the dried green body into a section and plugging the section before or after firing.

11. The method of claim 1, wherein forming the paste comprises:
mixing the pre-reacted particles with at least one of an inorganic powder, organic powder, and inorganic binder, wherein
the liquid vehicle comprises at least one of water, alcohol, and an organic solvent.

12. The method of claim 1, wherein forming green particles comprises at least one of spray-drying the slurry, spin drying the slurry, atomizing the slurry, breaking up a mix of inorganic fine powders with a polymer binder slurry, breaking up a dried cake of the slurry.

13. The method of claim 1, wherein the spheroidal particles comprise at least one of spherical, toroidal, prolate spheroidal, and oblate spheroidal particles.

14. The method of claim 1, further comprising:
before mixing is completed, adding to the pre-reacted particles and the liquid vehicle at least one of a source of alumina, silica, magnesia, titania, strontium oxide, calcium oxide, lanthanum oxide, boron oxide, cerium oxide, yttrium oxide, or other rare earth oxide, zirconium oxide, and one or more alkali oxides.

15. The method of claim 1, wherein the porous ceramic article comprises a dominant phase (greater than 50 vol %) of AT solid solution pseudobrookite phase.

16. The method of claim 1, wherein the mixing the pre-reacted particles and the liquid vehicle to form the paste further comprises adding a pore former having a particle size to match a particle size of the pre-reacted particles.

17. The method of claim 1, wherein the mixing the pre-reacted particles and the liquid vehicle to form a paste further comprises adding a pore former comprising polymer beads.

18. The method of claim 1, wherein the pre-reacted particles comprise alumina, 3% silica, and lanthanum oxide.

19. The method of claim 1, wherein the calcining of the pre-reacted particles comprises rotary calcination at 1000° C. and 1650° C.

20. The method of claim 1, wherein inorganic particles in the paste comprise:
pre-reacted particles having a composition comprising aluminum titatnate-feldspar , and
fine alumina particles having a particle size less than 1 µm.

21. A method of making a porous ceramic article, comprising:
forming green particles comprising a d50 of at least 14.84 µm and less than 53.05 µm;
calcining the green particles to form pre-reacted particles wherein the pre-reacted particles have a multiphase composition comprising two or more of silica, alumina, titania, cristobalite, mullite, rutile, $SrTi_3Al_8O_{19}$, feldspar, aluminum titanate, and aluminum titanate solid solution pseudobrookite;
mixing the pre-reacted particles and a liquid vehicle to form a paste;
forming the paste into a wet green body;
drying the wet green body to form a dried green body; and
firing the dried green body to form the porous ceramic article comprising pores formed by spaces between the pre-reacted particles, wherein
the pre-reacted particles comprise at least one of dense, porous, or hollow spheroidal particles, and
the porous ceramic article comprises a porosity of at least 50% and a median pore size (d50) of 10 µm to 30 µm.

22. The method of claim 21, wherein the pre-reacted particles comprise at least two constituents of a complete porous ceramic article pre-cursor batch,
the at least two constituents are at least partially reacted, and
a first portion of the pre-reacted particles comprise a first composition and a second portion of the pre-reacted particles comprise a second composition different from the first composition.

23. The method of claim 21, wherein the pre-reacted particles comprise a complete porous ceramic article precursor batch, and
the pre-reacted particles are fully reacted.

* * * * *

UNITED STATES PATENT AND TRADEMARK OFFICE
CERTIFICATE OF CORRECTION

PATENT NO. : 9,908,260 B2
APPLICATION NO. : 14/250524
DATED : March 6, 2018
INVENTOR(S) : Monika Backhaus-Ricoult et al.

It is certified that error appears in the above-identified patent and that said Letters Patent is hereby corrected as shown below:

On the Title Page

On page 2, in Column 2, item (56), other publications, Line 4, delete "alunimum" and insert -- aluminum --, therefor.

Signed and Sealed this
Twenty-fifth Day of February, 2020

Andrei Iancu
*Director of the United States Patent and Trademark Office*